US012151321B2

(12) United States Patent
Dekker et al.

(10) Patent No.: US 12,151,321 B2
(45) Date of Patent: Nov. 26, 2024

(54) WIRE FEEDER

(71) Applicant: ESAB AB, Gothenburg (SE)

(72) Inventors: Jeroen Dekker, Olofstorp (SE); Mattias Glädt, Alingsås (SE); Arne Lagerkvist, Gothenburg (SE); Fredrik Stjernlöf, Torslanda (SE); Johan Johansson, Vedum (SE)

(73) Assignee: ESAB AB, Gothenburg (SE)

( * ) Notice: Subject to any disclaimer, the term of this patent is extended or adjusted under 35 U.S.C. 154(b) by 778 days.

(21) Appl. No.: 17/244,161

(22) Filed: Apr. 29, 2021

(65) Prior Publication Data

US 2021/0245288 A1 Aug. 12, 2021

Related U.S. Application Data

(63) Continuation of application No. PCT/IB2019/059145, filed on Oct. 24, 2019.

(Continued)

(51) Int. Cl.
*B23K 9/10* (2006.01)
*B23K 9/12* (2006.01)
(Continued)

(52) U.S. Cl.
CPC ............ *B23K 9/1087* (2013.01); *B23K 9/122* (2013.01); *B23K 9/323* (2013.01); *B23K 37/003* (2013.01); *B23K 9/125* (2013.01)

(58) Field of Classification Search
CPC ...... B23K 9/1087; B23K 9/122; B23K 9/323; B23K 37/003; B23K 9/125; B23K 37/0282; B23K 9/10
See application file for complete search history.

(56) References Cited

U.S. PATENT DOCUMENTS 5,059,765 A 10/1991 Laing
5,486,044 A * 1/1996 Bennett ................. A47F 3/0486
312/129

(Continued)

FOREIGN PATENT DOCUMENTS

CN 201807821 U 4/2011
CN 102958637 A 3/2013
(Continued)

OTHER PUBLICATIONS

Notice of Reason for Rejection from the Japanese Patent Office for Japanese Patent Application No. 2021-52372 mailed Dec. 19, 2023 with machine translation, 13 pages.

(Continued)

*Primary Examiner* — Robert G Bachner
(74) *Attorney, Agent, or Firm* — Edell, Shapiro & Finnan, LLC

(57) ABSTRACT

A wire feeder includes an exterior housing and in interior housing that creates an interstitial spaced that is disposed between the exterior and interior housing. This housing structure reduces weight of the wire feeder while maintaining the structural rigidness required of a wire feeder. This housing structure also promotes improved cooling features for the wire feeder and the components disposed within the wire feeder. The exterior housing may be constructed of a materials that reduces the likelihood of being damaged. The wire feeder may be further equipped with a strain relief device for the incoming supply cables, and an interchangeable cable connector. The wire feeder may also be equipped with removable wire guides for the wire feeder mechanism that are toolless. The wire feeder may be equipped with accessory storage and attachment features, as well as a cost reduced repositionable control panel.

15 Claims, 52 Drawing Sheets

Related U.S. Application Data

(60) Provisional application No. 62/754,853, filed on Nov. 2, 2018.

(51) Int. Cl.
*B23K 9/32* (2006.01)
*B23K 37/00* (2006.01)

(56) References Cited

U.S. PATENT DOCUMENTS

| | | | | |
|---|---|---|---|---|
| 6,479,795 | B1* | 11/2002 | Albrecht | B23K 9/124 219/136 |
| 7,427,726 | B2 | 9/2008 | Enyedy et al. | |
| 9,649,714 | B2 | 5/2017 | Enyedy et al. | |
| 10,478,912 | B2 | 11/2019 | Evans et al. | |
| 2007/0295522 | A1 | 12/2007 | Bohne et al. | |
| 2009/0166345 | A1* | 7/2009 | Enyedy | B23K 9/1006 242/157 R |

FOREIGN PATENT DOCUMENTS

| | | |
|---|---|---|
| CN | 204183124 U | 3/2015 |
| CN | 205039650 U | 2/2016 |
| CN | 105583496 A | 5/2016 |
| CN | 105583554 A | 5/2016 |
| CN | 106028757 A | 10/2016 |
| CN | 106287259 A | 1/2017 |
| CN | 106392253 A | 2/2017 |
| CN | 107208415 A | 9/2017 |
| CN | 207205531 U | 4/2018 |
| CN | 207205535 U | 4/2018 |
| CN | 207239511 U | 4/2018 |
| CN | 207386760 U | 5/2018 |
| CN | 207414569 U | 5/2018 |
| DE | 102006027774 A1 | 12/2007 |
| EP | 3048866 A1 | 7/2016 |
| KR | 101738859 B1 | 5/2017 |
| RU | 2343052 C2 | 1/2009 |
| SU | 356067 A1 | 10/1972 |
| SU | 566432 A1 | 12/1978 |
| SU | 721935 A1 | 3/1980 |
| WO | 2012058676 A2 | 5/2012 |
| WO | 2015178983 A1 | 11/2015 |

OTHER PUBLICATIONS

Notification of Transmittal of International Search Report and the Written Opinion for International Application No. PCT/IB2019/059145 dated Mar. 13, 2020, 18 pages.

Official Action by the Patent Office of the Russian Federation for Russian Patent Application No. 2021115597 dated Mar. 21, 2023 with English translation, 14 pages.

Search Report by the Patent Office of the Russian Federation for Russian Patent Application No. 2021115597 dated Mar. 9, 2023 with English translation, 4 pages.

First Office Action by the State Intellectual Property Office for Chinese Patent Application No. 201980081803.5 dated Dec. 30, 2022 with English translation, 20 pages.

Notice of Preliminary Rejection for Korean Patent Application No. 10-2021-7014695 dated May 16, 2024 with English machine translation, 21 pages.

Office Action for European Patent Application No. 19795325.4 dated Mar. 29, 2023, 3 pages.

* cited by examiner

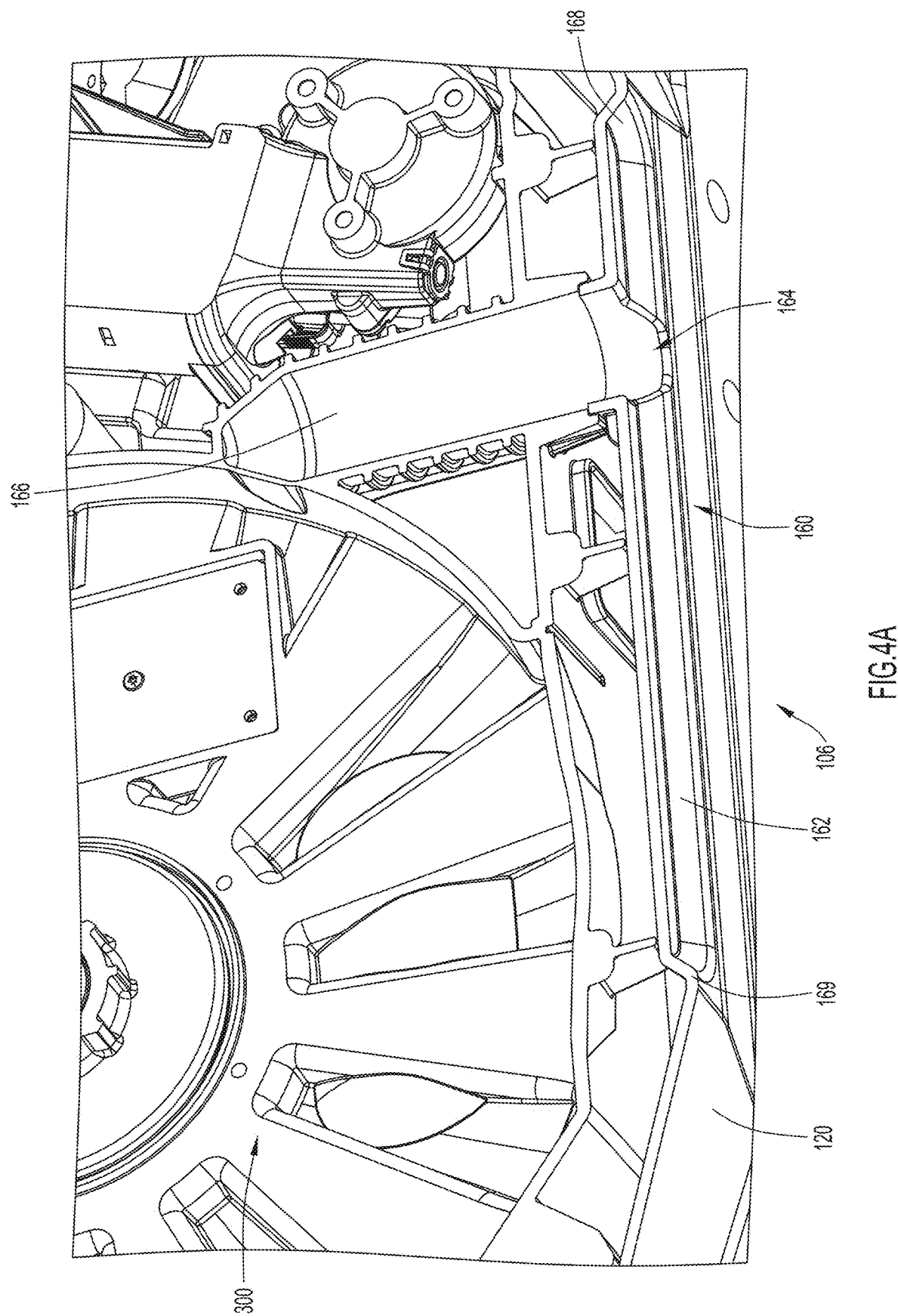

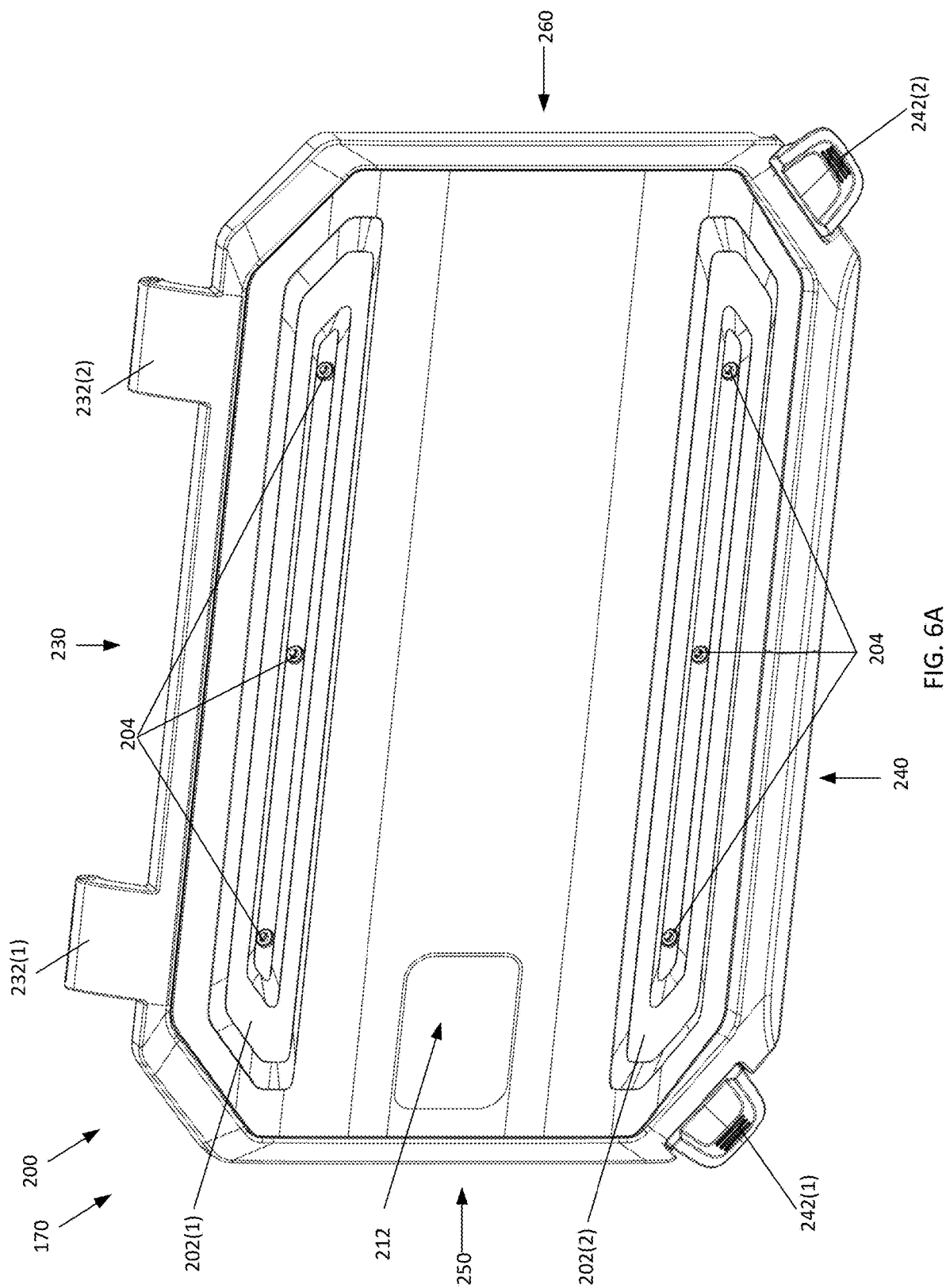

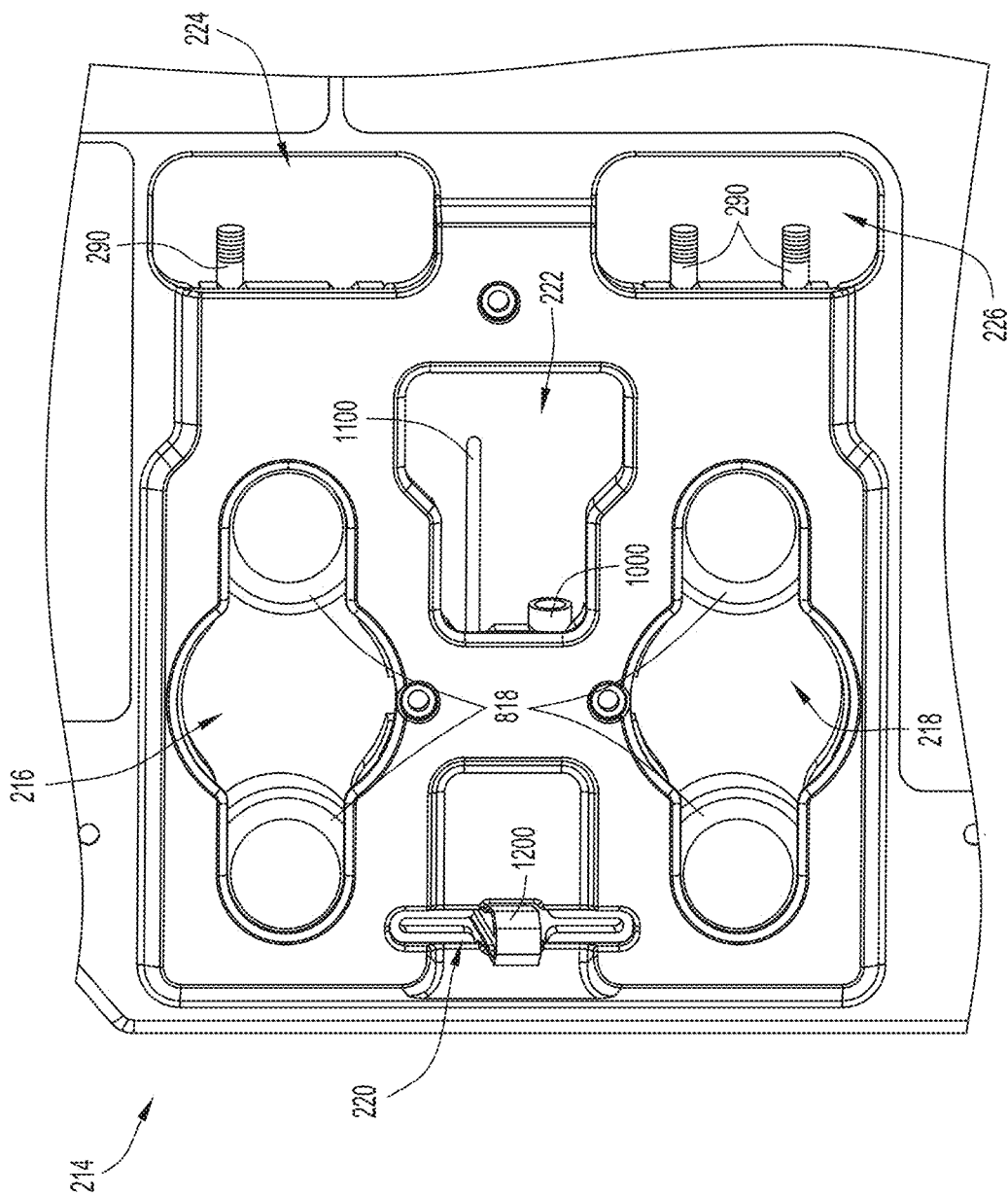

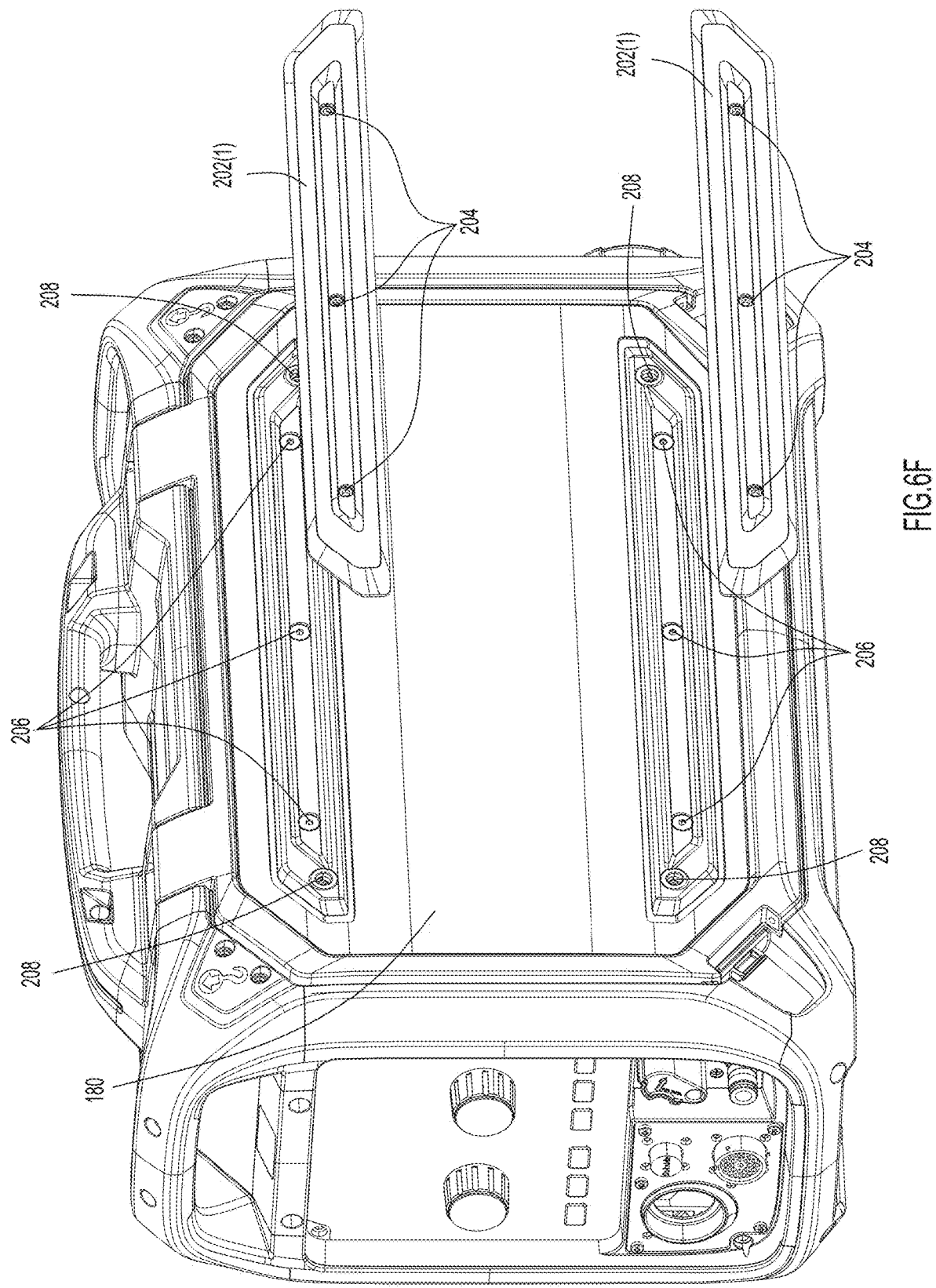

WIRE FEEDER

CROSS-REFERENCE TO RELATED APPLICATION

This application continuation of International al Application No. PCT/IB2019/059145, filed Oct. 24, 2019, which claims priority to provisional U.S. Application No. 62/754,853, filed Nov. 2, 2018, the entire contents of which are incorporated herein by reference.

FIELD OF THE INVENTION

The present invention relates to a wire feeder, and more specifically, a portable wire feeder for feeding welding wire and delivering power to a welding torch.

BACKGROUND OF THE INVENTION

Portable welding devices (e.g., a welding power supply, a wire feeder, etc.) are known, and are often embodied in a case. Such portable welding devices find use in applications where it is not practical or convenient to send a work-piece to a shop for repair or fabrication. Examples of applications for such portable welding devices include petroleum and chemical fabrication, shipboard installation and repair, and the like. Because of the portability of these welding devices, they have found wide-spread use and popularity. Of the various types of welding, portable welding devices are often used in gas metal arc welding. Gas metal arc welding has several advantages over other types of welding including, deposition rates, speed, excellent weld quality, minimal distortion of the work piece, and no stub loss. In conventional metal inert gas (MIG) welding, a MIG weld apparatus includes a torch and a welding wire electrode continuously fed from a supply reel or other source by an electrode wire feeder mechanism to the welding torch. An arc between the torch and the workpiece continuously melts the welding wire electrode to form the weld puddle.

One issue with known portable welding devices is that they are not sufficiently rugged to withstand the harsh treatment and harsh environments that the portable welding devices experience during transport and use. When the welding devices are sufficiently rugged, the welding devices are heavy, which reduces their portability. In addition, known portable welding devices are incapable of operating efficiently in the harsh environment in which the portable welding devices are utilized. Due to the nature of the environment in which such portable welding devices are used, they may become damaged and may require repair at shorter than desired intervals. The nature of the environment in which such portable welding devices are used also poses problems for cooling the components within the portable welding device, as external air presents problems when used to cool internal components. The environment in which portable welding devices are utilized often contains various pollutants and contaminates that can damage and compromise the components (both internal and external) of the portable welding device. In addition, cooling the internal components within a portable welding device requires inlet and outlet openings in the case of the portable welding device that may enable water to enter the interior of the portable welding device and compromise the internal components. Another issue with known portable welding devices is that they may not be designed to be sufficiently easy for grasping, lifting, and carrying. Some of this may be due to the heavy nature of the welding devices. In addition, known portable welding devices may not be designed in a manner that enables easy repair/replacement of individual pieces of the portable welding device should they become damaged during or after use of the welding device.

Electrode wire feeders may be one embodiment of the portable welding devices described above. These electrode wire feeders contain wire feeder mechanisms that include opposed feed rolls which exert a pressure on the welding wire passing therebetween and are driven by meshing gears to feed the electrode wire to and through the torch. In some instances, a single pair of opposed feed rolls is used, while in other instances two pairs of feed rolls are utilized in spaced relation along the feed path of the wire. Wire feeders also receive welding power from a power source and deliver that welding power to a welding torch. Thus, wire feeders also contains various current bars running internally through the wire feeder. Wire feeders may also be configured to control the flow of shielding gas to the welding torch, as well as control the various welding operational parameters for performing a welding operation. Given the complex nature of the wire feeder and its internal components, the wire feeder's role in facilitating MIG welding operations, and the known problems of conventional portable welding devices detailed above, current portable welding wire feeders are not viable long term solutions for performing portable welding operations.

SUMMARY OF THE INVENTION

The present invention relates to a robust and portable wire feeder for facilitating a welding operation. The wire feeder contains multiple features that provide advantages over conventional wire feeders. The housing of the wire feeder mechanism includes an interior housing structure and an exterior housing structure that are coupled to one another. This creates a double walled housing with an interstitial space disposed between the exterior housing structure and the interior housing structure. The exterior housing structure may be constructed from a more flexible and resilient material when compared to the interior housing structure. Moreover, the interior housing structure may be more rigid than the exterior housing structure. This construction enables the exterior housing structure to withstand being damaged from the harsh environments in which wire feeders are utilized. The double-wall structure also enables the housing to be rigid without being constructed from heavy and bulky materials, such as heavy metals. This reduces the weight of the wire feeder, making it more portable.

In addition, as previously explained, the double-wall structure creates an interstitial space between the exterior housing structure and the interior housing structure. This interstitial space may be utilized to reduce the amount of heat that builds up within the interior cavity of the wire feeder. The current bars that delivers welding power while also powering the various components of the wire feeder may be primarily routed through the interstitial space. This allows the heat generated by the current bars to be more easily dissipated through the exterior housing structure, while the interior housing structure serves to insulate the interior cavity from the heat generated by the current bars. Moreover, a circulation fan or pump may be configured to circulate air from within the interior cavity of the wire feeder in a closed-loop circulation path through the interstitial space. This closed-loop circulation path serves multiple purposes. The heat absorbed by the circulation air may be dissipated more easily through the exterior housing structure when the air is pumped through the interstitial space. Furthermore, circulating air through the interstitial space, and ultimately over the current bars routed through the interstitial space, serves to further cool the current bars by convection. In addition, by having a closed-loop circulation path, polluted air from the exterior of the wire feeder is never pumped into the wire feeder, where the polluted air may contaminate the components disposed within the wire feeder.

The access doors of the wire feeder may also be equipped with storage compartments disposed on the interior side of the access doors. These storage compartments may be configured to receive consumable components of the wire feeder and welding torch (e.g., drive wheels, wire guides, contact tips, gas nozzles, gas diffusers, etc.) so that they are stored and secured in a convenient and easily accessible location. The access doors may also be equipped with wear plates on the exterior surface of the access doors. The wear plates may be removably coupled to the access doors, and may enable the wire feeder to be positioned horizontally on its side (i.e., on one of the access doors) without the exterior surfaces of the access doors being in contact with the support surface. This reduces the likelihood that the access doors become damaged (e.g., scratched, scuffed, dented, etc.), while the wear plates can be easily replaced when needed. Moreover, a wheeled cart may be coupled to the access doors when the wear plates are removed, enabling the wire feeder to be oriented on its side and wheeled into position. Positioning the wire feeder horizontally on its side is more stable for the wire feeder, and reduces the likelihood the wire feeder tips over. This position also makes it easier for an operator to position the wire feeder underneath obstacles, and is more ergonomic for changing the welding wire spool.

The wire feeder disclosed herein further includes a strain relief device that reduces the strain placed on the cables run into the wire feeder, as well as the connectors that the cables connect to within the wire feeder.

In addition, the wire feeder is equipped with an interchangeable cable connector that may easily be swapped out for a different type of cable connector depending on what type of connector is compatible with the torch cable used for a welding operation.

The wire feeder is equipped with a cost-efficient control panel that may be easily repositioned depending on the orientation in which the wire feeder it utilized.

Additionally, the wire feeder is equipped with a wire feeding mechanism that contains wire guides that are easily removable from the wire feeding mechanism. More specifically, the wire guides may be quickly and easily removed from the wire feeding mechanism without the use of a tool. The wire guides may also be securely retained within the wire feeder mechanism without the use of a tool. This enables the wire guides to be replaced when they become worn, or for the wire guides to be swapped for another wire guide that is better suited for the gauges, type, and/or material of welding wire intended to be used by a welding operator.

BRIEF DESCRIPTION OF THE DRAWINGS

FIG. 4A illustrates a cross-sectional view of the mounting structure of the wire feeder illustrated in FIG. 2A.

FIG. 6A illustrates a perspective view of the exterior of the first access door illustrated in FIG. 4A.

FIG. 6E illustrates an elevational view of the door storage compartment of the first access door illustrated in FIG. 6A.

FIG. 6F illustrates a perspective view of the second side of the wire feeder illustrated in FIG. 2A where the wear plates are removed from the second access door.

Like reference numerals have been used to identify like elements throughout this disclosure.

DETAILED DESCRIPTION OF THE INVENTION

Figure 1:
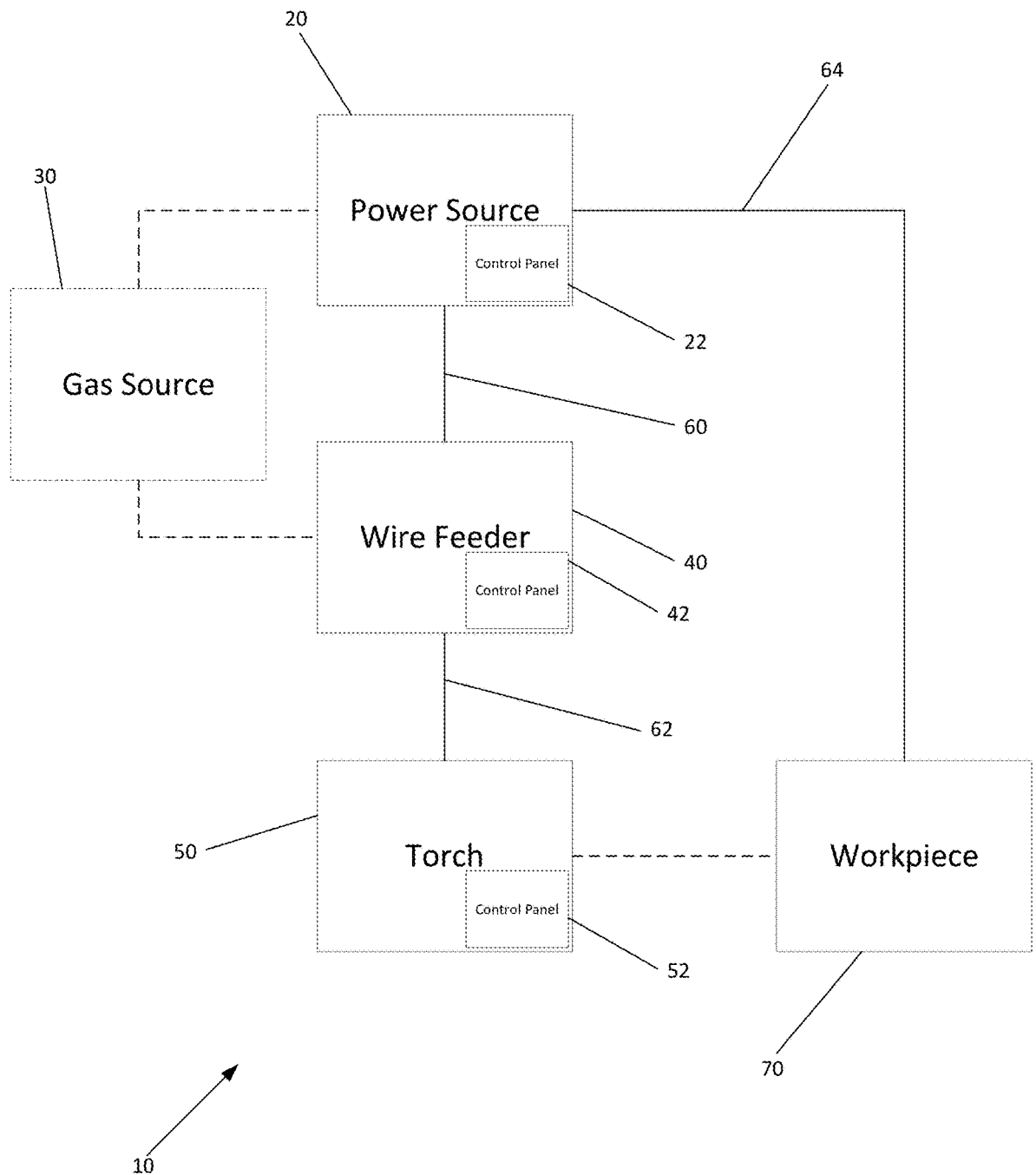
FIG. 1 illustrates a schematic diagram of a welding apparatus.

Turning to the drawings, FIG. 1 illustrates a schematic drawing of an embodiment of a welding system 10 which powers, controls, and provides supplies for a welding operation. The welding system 10 includes power source 20 having a control panel 22 through which a welding operator may control the welding output voltage, welding current, gas flow, and/or other welding parameters for the welding operation. The control panel 22 may include input or interface devices that the welding operator may use to adjust the welding parameters (e.g., voltage, current, etc.). The power source 20 may be connected to a gas source 30, which may be either external to the power source 20 (as shown in FIG. 1), or internal to the power source 20. The gas source 30 may provide the shielding gas for the welding operation.

As FIG. 1 illustrates, the welding system 10 also includes a wire feeder 40 that is connected to the power source 20 via at least one interconnection cable 60. The interconnection cable 60 may at least provide welding power (i.e., voltage and current) to the wire feeder 40. In embodiments where the gas source 30 is coupled to the power source 20, the interconnection cable 60 may be further configured to provide shielding gas to the wire feeder 40. In even further embodiments, the interconnection cable 60 may be configured to provide bidirectional communication (e.g., control and feedback signals) and/or coolant water between the power source 20 and the wire feeder 40.

The wire feeder 40 may be configured to provide welding wire to the welding gun or welding torch 50 for use in the welding operation via the torch cable 62. The wire feeder 40 may also be configured to deliver welding power and shielding gas to the welding torch 50 via the torch cable 62. Like the interconnection cable 60, the torch cable 62 may also enable bidirectional communication (e.g., control and feedback signals) between the welding torch 50 and the wire feeder 40. In some embodiments, the wire feeder 40 may also include a control panel 42 that allows the user to set one or more wire feed parameters, such as wire feed speed. In some embodiments, where the interconnection cable 60 is configured to provide bidirectional communication (e.g., control and feedback signals) between the power source 20 and the wire feeder 40, the control panel 42 may enable the welding operator to control other welding parameters (e.g., voltage, current, etc.) typically controlled at the power source 20. As further illustrated in FIG. 1, in some embodiments, the gas source 30 may be directly connected to the wire feeder 40 rather than the power source 20. In presently contemplated embodiments, the wire feeder 40 houses a variety of internal components, including those described herein in further detail.

The welding torch 50 is configured to perform a welding operation on the workpiece 70 when operated by a welding operator. As illustrated, the welding torch 50 may include a control panel 52 that may include input or interface devices that the operator may use to perform a welding operation on the workpiece 70 with the welding torch 50. In embodiments where the torch cable 62 is configured to provide bidirectional communication (e.g., control and feedback signals) between the wire feeder 40 and the welding torch 50, the control panel 52 enables a welding operator to control welding parameters (e.g., voltage, current, etc.) and wire feed parameters (e.g., wire feed speed, etc.) typically controlled at the power source 20 and the wire feeder 40, respectively.

Continuing with FIG. 1, the power source 20 is also connected to the work piece 70 via a return cable 64. The return cable 64 completes the circuit between the power source 20 and the welding torch 50 during a welding operation performed on the work piece 70.

It should be noted that although the illustrated embodiments are described in the context of a MIG welding system, the features of the invention may be utilized with a variety of other suitable welding systems and processes that utilize continuously fed wires.

Turning to FIGS. 2A, 2B, 3A, 3B, 3C, 3D, 3E, and 3F, illustrated is an example embodiment of the wire feeder 40. The wire feeder 40 may have an overall shape that is a substantially rectangular parallelepiped with a front side 100, a rear side 102 opposite the front side 100, a top side 104 spanning from the front side 100 to the rear side 102, and a bottom side 106 that is opposite of the top side 104 and that also spans from the front side 100 to the rear side 102. The wire feeder 40 further includes a first side 108 spanning between the front and rear sides 100, 102, as well as the top and bottom sides 104, 106. The wire feeder 40 also includes a second side 110 that is opposite of the first side 108, the second side 110 also spanning between the front, rear, top, and bottom sides 100, 102, 104, 106. The front side 100, rear side 102, top side 104, bottom side 106, first side 108, and second side 110, as described and illustrated herein, collectively form a housing 120 that houses the various components of the wire feeder 40.

Figure 2A:
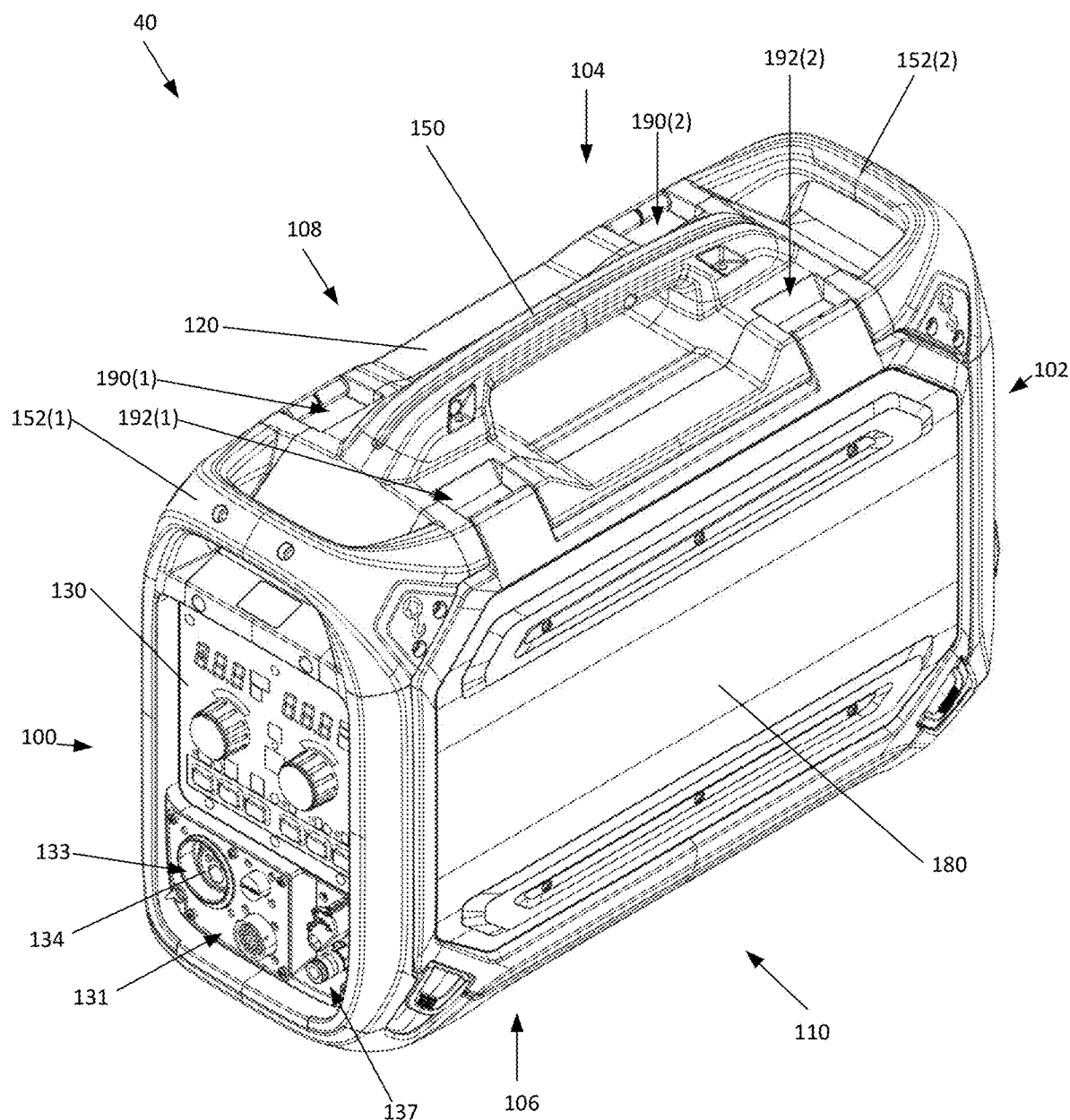
FIG. 2A illustrates a front perspective view of a wire feeder of the welding apparatus illustrated in FIG. 1.
Figure 3A:
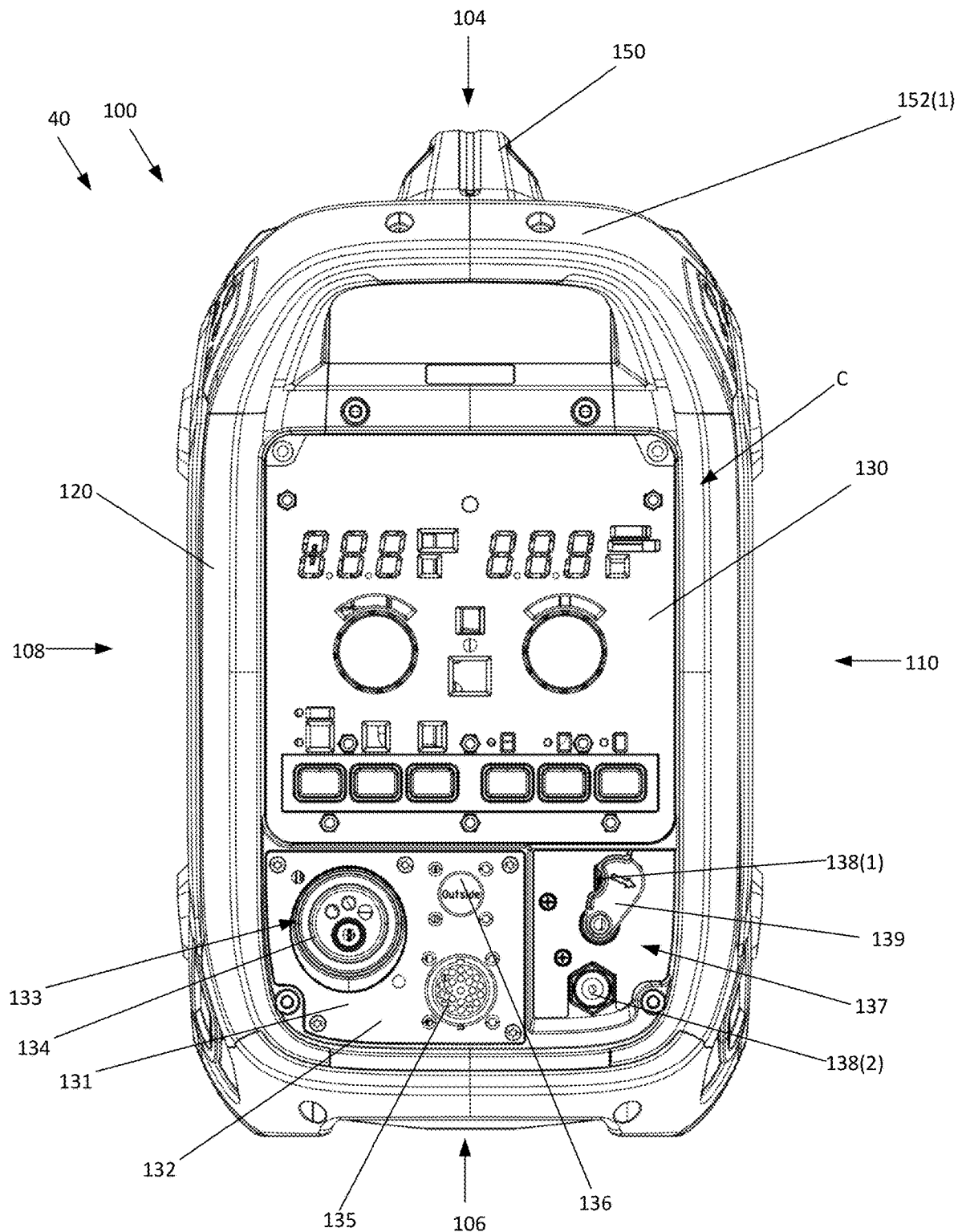
FIG. 3A illustrates a front elevational view of the wire feeder illustrated in FIG. 2A.

As best illustrated in FIGS. 2A and 3A, the front side 100 of the wire feeder 40 includes a control panel 130, a first connection panel 131, and a second connection panel 137. The control panel 130 is configured to control the various wire feed parameters of the wire feeder 40. In some embodiments, the control panel 130 may also be configured to control and display various welding parameters (e.g., voltage, current, wire feed speed, etc.), including those that are typically set and controlled at the power source 20 of conventional welding systems. The control panel 130 may also be configured to display memory settings, various warnings and error codes, and gas flow management parameters. The first connection panel 131, as is further detailed below, contains a removable cover panel 132 and an opening 133 for receiving the connector of a torch cable 62 to connect a welding torch 50 to the wire feeder 40. More specifically, and as further detailed below, an interchangeable cable connector 134 is disposed within the opening 133 of the removable cover panel 132 where the interchangeable cable connector 134 may be configured to operatively connect to a torch cable 62. The first connection panel 131 may also contain an accessory connector 135 and a supplemental connector 136. The accessory connector 135 may be configured to accept a connector of an accessory device (e.g., a push-pull welding torch) and send/receive communication and command signals to/from the accessory device. The supplemental connector 136 may be connected to an accessory cable that may provide an electrical signal (e.g., a trigger signal to engage/stop welding) when, as explained in further detail below, the installed interchangeable cable connector 134 is a TWECO connector. The second connection panel 137 of the front side 100 of the wire feeder 40 contains a pair of water connectors 138(1), 138(2) that may be configured as cooling water supply and cooling water return connectors, respectively, for water-cooled MIG torches. As illustrated, the second connection panel 137 may also contain a rotatable detector unit 139, where rotation of the rotatable detector unit 139 may be used to detect whether a hose is connected to the outgoing cooling water supply connector 138(1). In some embodiments, the rotatable detector unit 139 may be used to measure the cooling output flow requirements of an attached accessory, where the output flow requirements may be determined by the amount of rotation of the rotatable detector unit 139.

Figure 2B:
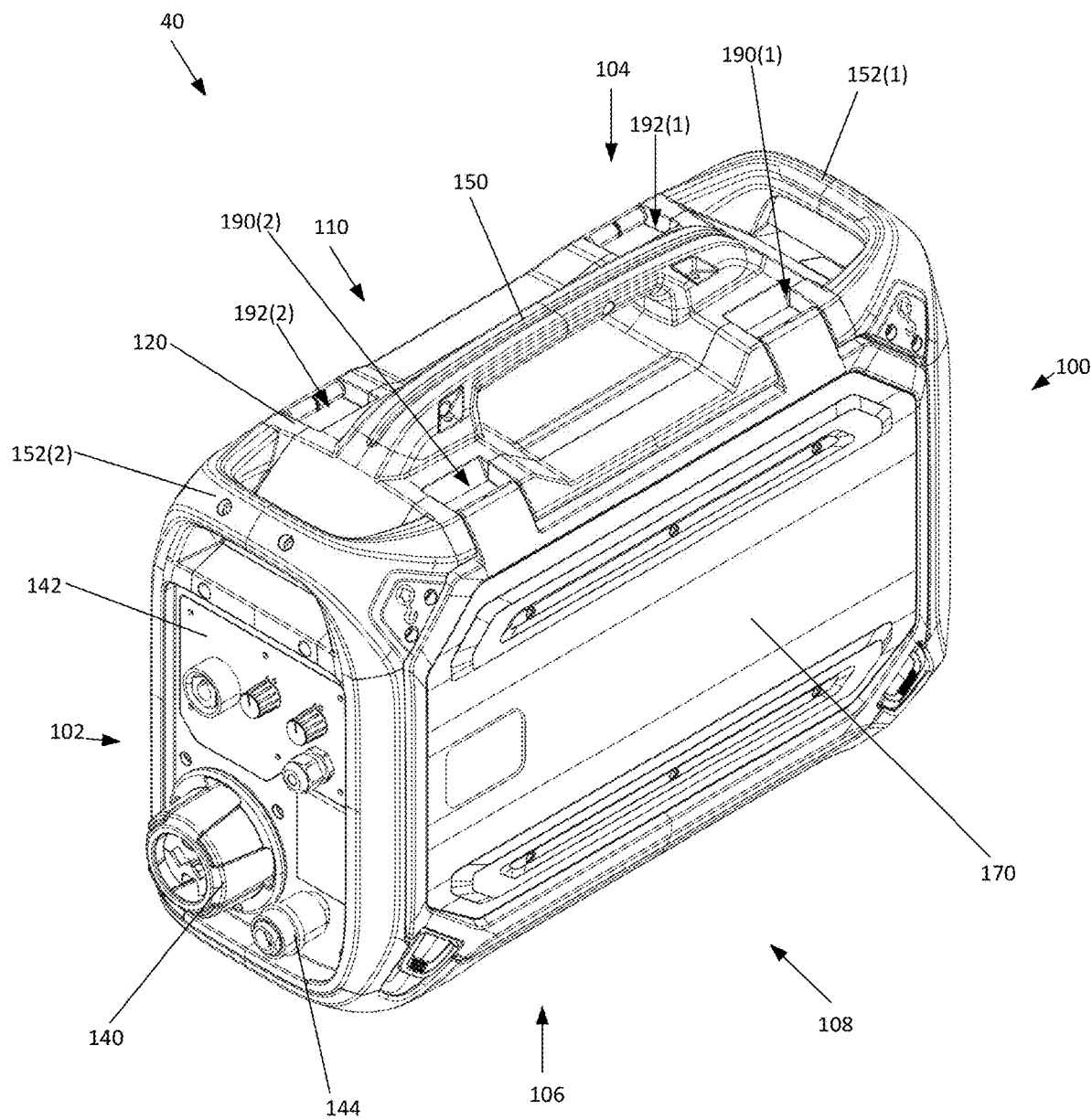
FIG. 2B illustrates a rear perspective view of the wire feeder illustrated in FIG. 2A.
Figure 3B:
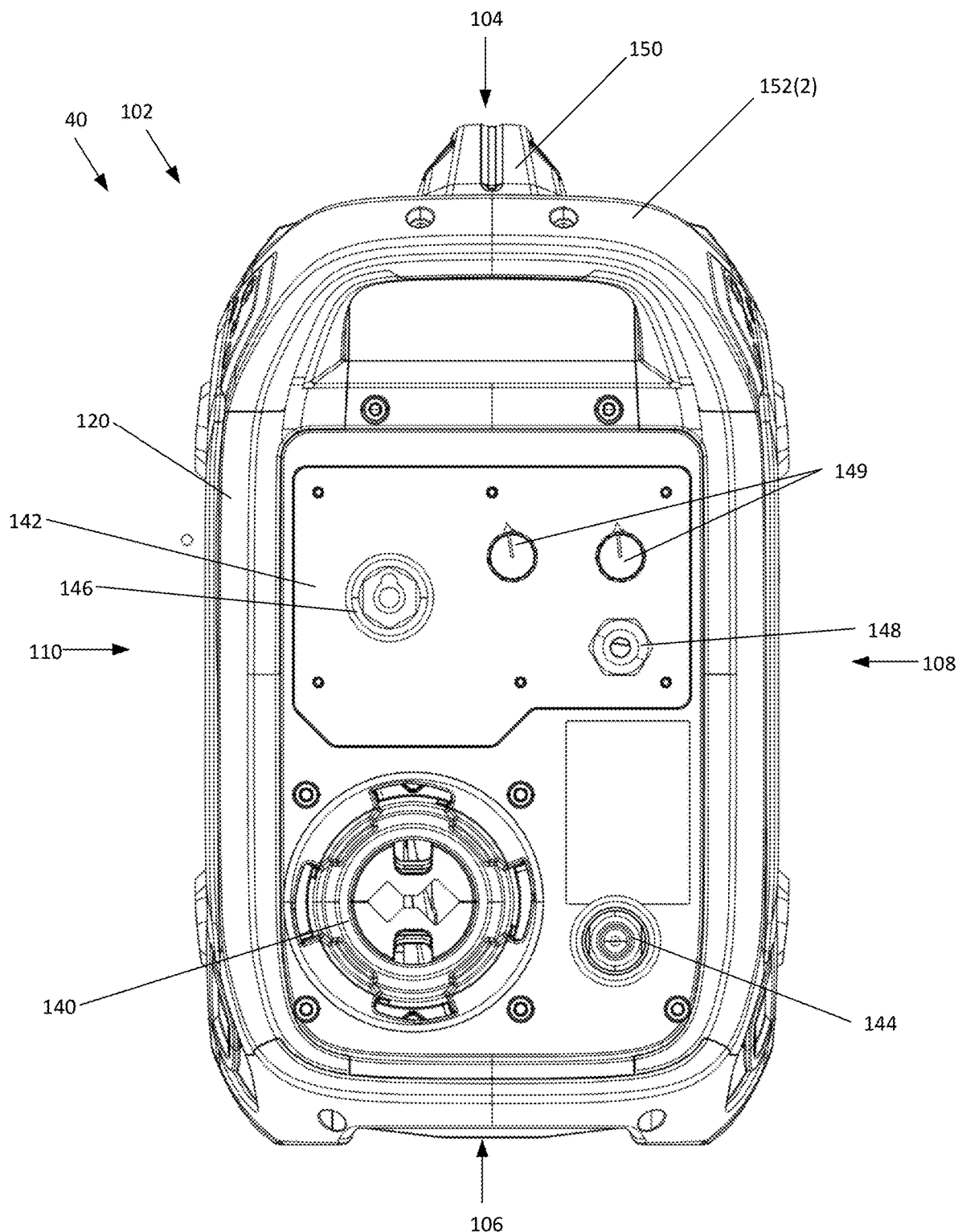
FIG. 3B illustrates a rear elevational view of the wire feeder illustrated in FIG. 2A.

As best illustrated in FIGS. 2B and 3B, the rear side 102 of the wire feeder 40 includes a strain relief device 140, a rear control and interface panel 142, and a rear inlet wire connector 144. The strain relief device 140 extends outwardly from the rear side 102 proximate to the bottom side 106 and the second side 110. As further detailed below, the strain relief device 140 may be configured to relieve the strain placed on the interconnection cable 60, which may internally comprises a weld power cable, a communication signal cable, a shielding gas cable, a cooling water supply cable, and cooling water return cable, as further detailed below. As illustrated, the rear control and interface panel 142 may be positioned proximate to the top side 104 of the wire feeder 40, and may include an accessory outlet 146 that may be configured to be connected to, and provide power to an accessory (e.g., a shielded metal arc welding or manual metal arc welding accessory torch) of the welding operator, a secondary outlet 148 that may serve as a ground for the wire feeder 40 for specific welding operations, and a pair of dials 149 that may be configured to control power to the accessories connected to the outlets 146, 148 or other optional accessories disposed within the wire feeder 40 (e.g., an internal heater disposed within the wire feeder 40). The rear inlet wire connector 144 extends outwardly from the rear side 102 of the wire feeder 40 proximate to the bottom side 106 and the first side 108 of the wire feeder 40. The rear inlet wire connector 144 may be configured to be connected to an external welding wire spool to enable the wire feeder 40 to deliver welding wire from the external welding wire spool to the welding torch 50.

As best illustrated in FIGS. 2A, 2B, 3C, 3D, and 3E, the top side 104 of the wire feeder 40 is equipped with a primary handle 150 and two secondary handles 152(1), 152(2). The primary handle 150 may extend upwardly from the surface of the top side 104 and may span longitudinally along the wire feeder 40 between the front side 100 and the rear side 102. Moreover, the primary handle 150 may be disposed on the top side 104 such that the primary handle 150 is spaced equidistant from the first side 108 and the second side 110 of the wire feeder 40. Secondary handle 152(1) may be disposed on the top side 104 of the wire feeder 40 at the connection or intersection of the top side 104 and the front side 100, while secondary handle 152(2) may be disposed on the top side 104 of the wire feeder 40 at the connection or intersection of the top side 104 and the rear side 102. While the primary handle 150 may extend generally upward from the top side 104 of the wire feeder 40, the secondary handles 152(1), 152(2) may extend both upward from the top side 104 and outward from the front and rear sides 100, 102, respectively. The primary handle 150 and the secondary handles 152(1), 152(2) make the wire feeder 40 portable by collectively enabling a welding operator to more easily transport the wire feeder 40, as well as position the wire feeder 40 into different orientations.

Figure 3C:
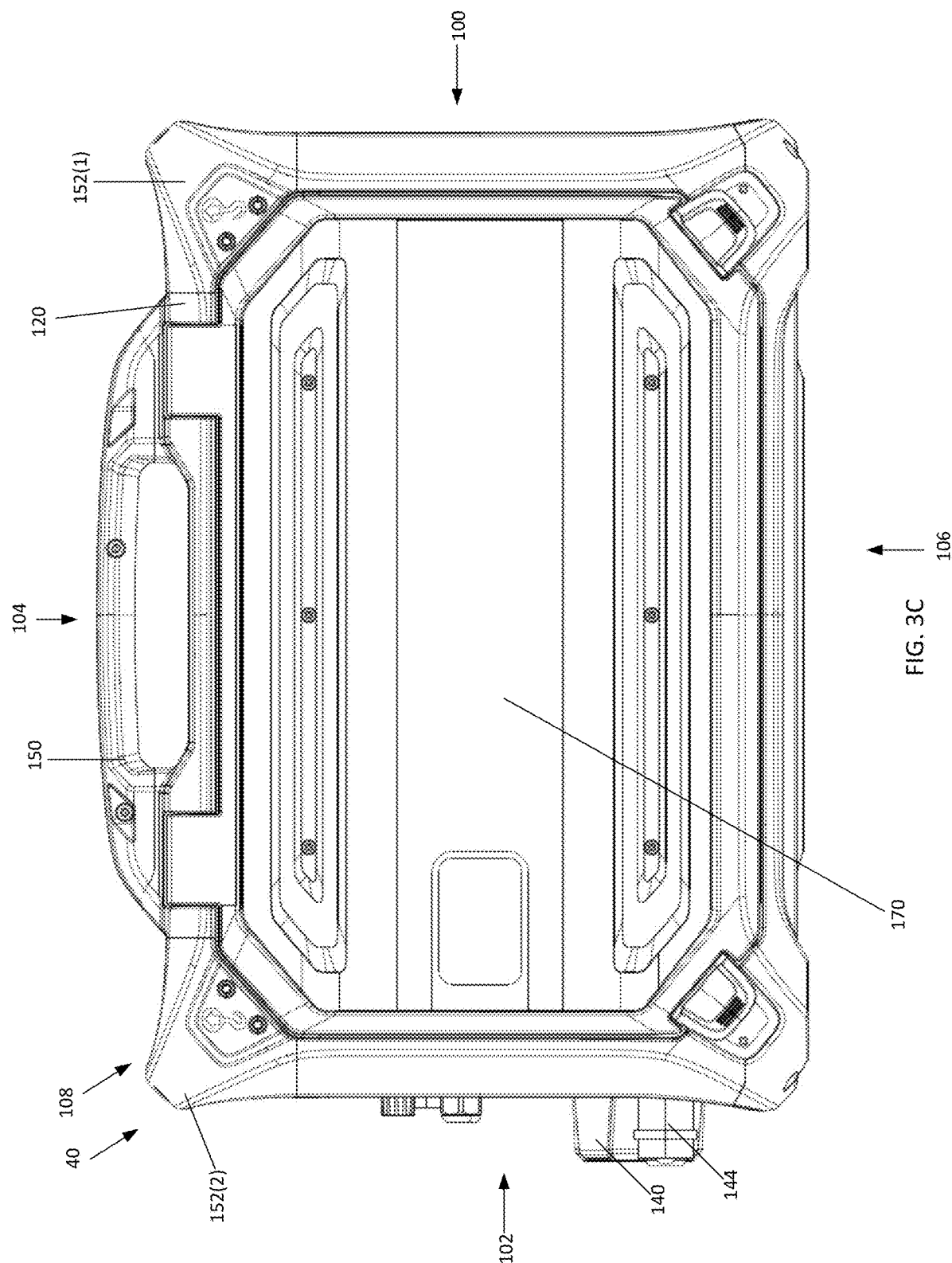
FIG. 3C illustrates an elevational view of a first side of the wire feeder illustrated in FIG. 2A.
Figure 3D:
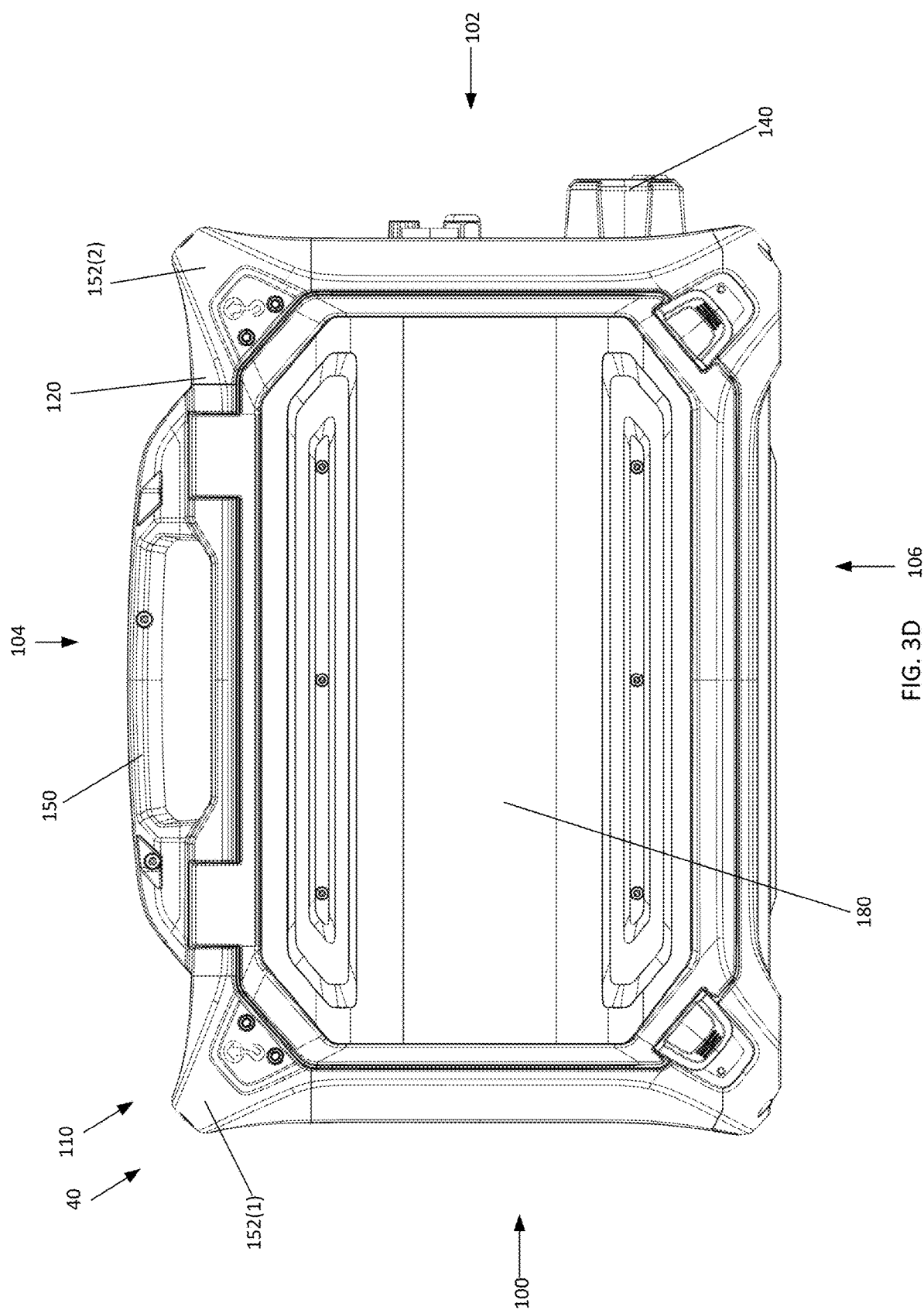
FIG. 3D illustrates an elevational view of a second side of the wire feeder illustrated in FIG. 2A.
Figure 3E:
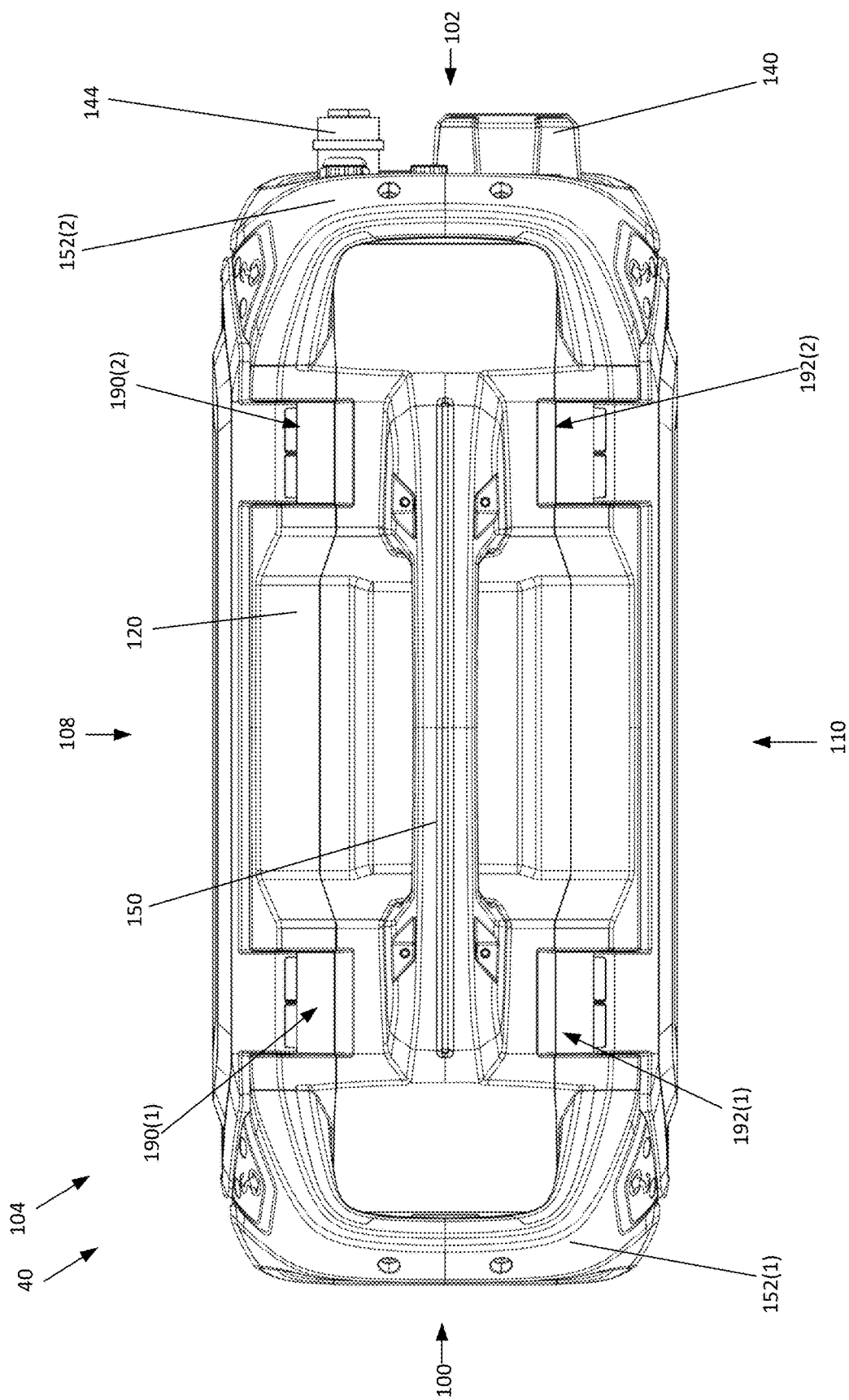
FIG. 3E illustrates a top view of the wire feeder illustrated in FIG. 2A.
Figure 3F:
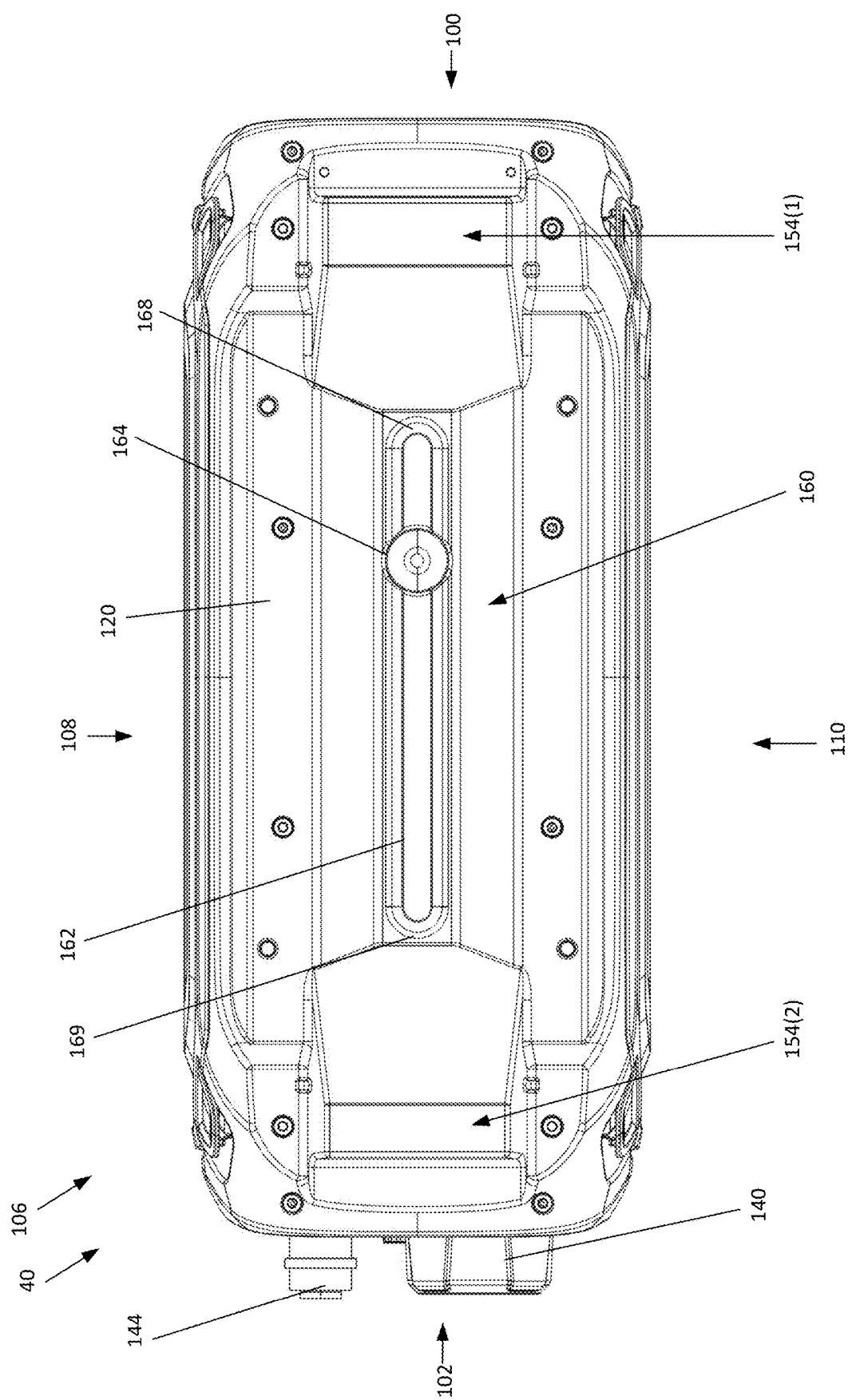
FIG. 3F illustrates a bottom view of the wire feeder illustrated in FIG. 2A.

As further illustrated in FIG. 3F, the bottom side 106 of the wire feeder 40 is equipped with grips 154(1), 154(2). The first grip 154(1) may be disposed within the surface of the housing 120 on the bottom side 106 of the wire feeder 40 proximate to the front side 100 of the wire feeder 40. The second grip 154(2) may be disposed within the surface of the housing 120 on the bottom side 106 of the wire feeder 40 proximate to the rear side 102 of the wire feeder 40. The grips 154(1), 154(2) may be recesses disposed within the bottom side 106 of the wire feeder 40. The grips 15491), 154(2), in combination with the primary handle 150 and the secondary handles 152(1), 152(2), facilitate easy transportation and repositioning of the wire feeder 40 by a welding operator.

Continuing with FIG. 3F and turning also to FIG. 4A, the wire feeder 40 contains a mounting structure 160 that may be primarily disposed on the bottom side 106 of the wire feeder 40 and enables the wire feeder 40 to be more easily mounted on a mounting platform or post. As illustrated, the mounting structure 160 includes an elongated channel 162 (illustrated in FIGS. 3F and 4A), an opening 164 (illustrated in FIGS. 3F and 4A), and a vertical receptacle 166 (illustrated in FIG. 4A) that extends from the opening 164 into the interior 300 of the housing 120. The elongated channel 162 is disposed within the surface of the housing 120 on the bottom side 106 and spans longitudinally along the bottom side 106. The elongated channel 162 includes a first end 168 and a second end 169, where the first end 168 is disposed more proximate to the front side 100 of the wire feeder 40 and the second end 169 is disposed more proximate to the rear side 102 of the wire feeder 40. As illustrated in FIG. 3F, the elongated channel 162 is disposed in the surface of the housing 120 on the bottom side 106 such that the elongated channel 162 is spaced equidistant from the first and second sides 108, 110 of the wire feeder 40. The elongated channel 162 may have sidewalls that gradually transition via rounded edges from the elongated channel 162 to the surface of the housing 120 on the bottom side 106 of the wire feeder 40. Moreover, the opening 164 may be disposed in the surface of the housing 120 on the bottom side 106 such that the opening 164 is at least partially aligned with the elongated channel 162. The opening 164 may be in fluid communication with the vertical receptacle 166 that extends upwardly from the bottom side 106 and into the interior cavity 300 of the wire feeder 40. The opening 164 and the vertical receptacle 166 may be sized and shaped to receive an end of a mounting post or other mounting structure. In some embodiments, the opening 164 may be substantially circular and the vertical receptacle 166 may be substantially cylindrical. In other embodiments, the opening 164 and vertical casing 166 may be of other shapes.

Figure 4B:
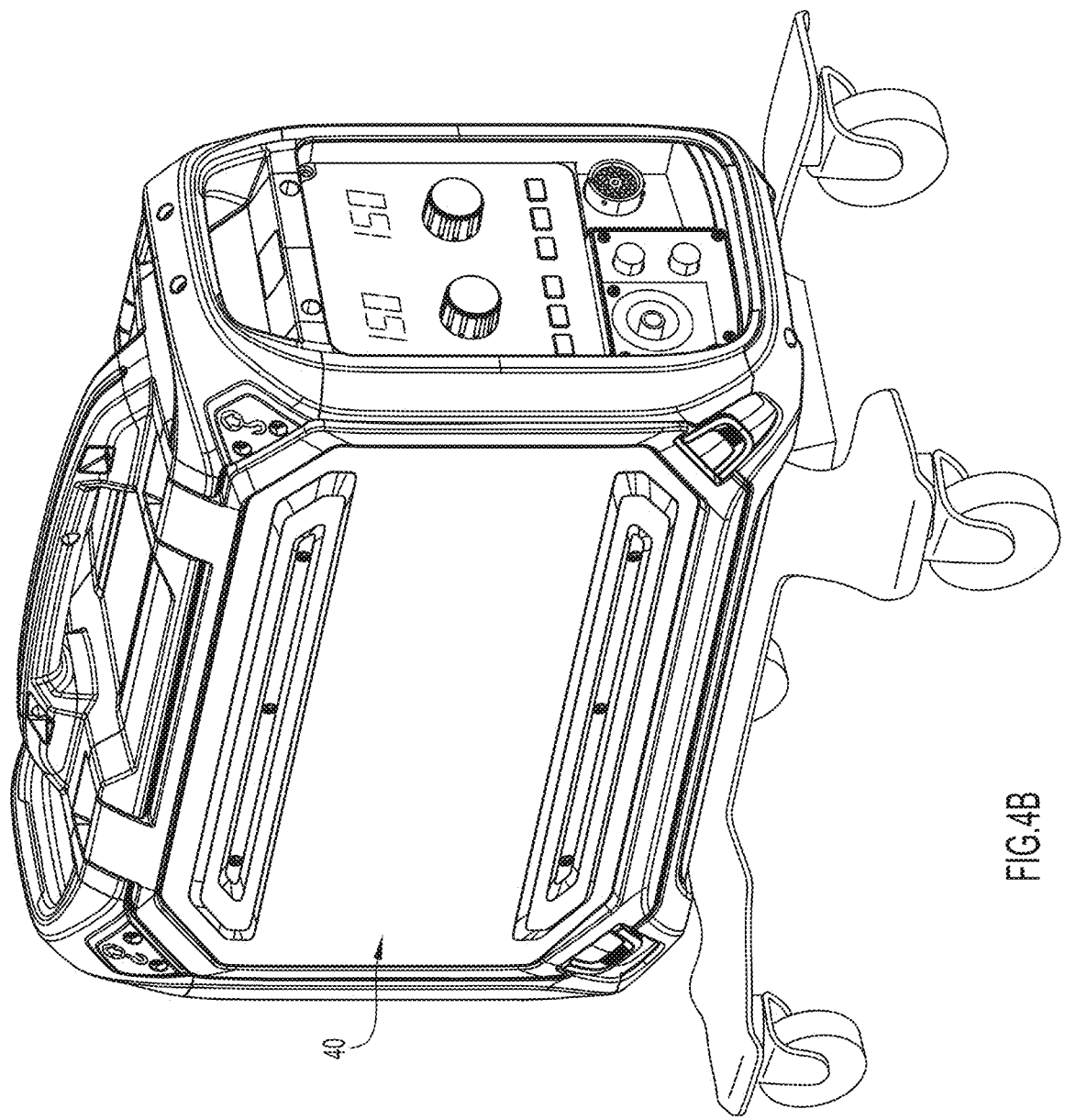
FIG. 4B illustrates a perspective view of the wire feeder being mounted on a cart via the mounting structure.

The mounting structure 160 may enable a welding operator to easily and efficiently mount a wire feeder 40 onto a mounting structure (e.g., a wheeled cart having a mounting post like that illustrated in FIG. 4B). A welding operator may lift the wire feeder 40 onto the end of a mounting post such that the bottom side 106 of the wire feeder 40 rests on the end of the mounting post. The welding operator may then laterally slide the wire feeder 40 with respect to the end of the mounting post, such that the end of the mounting post slides across the bottom side 106 of the wire feeder 40 toward either of the first side 108 or the second side 110. The welding operator may laterally slide the wire feeder 40 from side to side until the end of the mounting post slides into the elongated channel 162. Once the end of the mounting post has slid into the elongated channel 162, the welding operator may then longitudinally slide the wire feeder 40 with respect to the end of the mounting post such that the end of the mounting post slides along the elongated channel 162 between the first end 168 and the second end 169 of the elongated channel 162. The welding operator may longitudinally slide the wire feeder 40 until the end of the mounting post is aligned with the opening 164. Once the end of the mounting post has aligned with the opening 164, the end of the mounting post may be inserted into the vertical receptacle 166 via the opening 164 as the wire feeder 40 is lowered onto the mounting post. The insertion of the end of the mounting post into the vertical receptacle 166 secures the wire feeder to the mounting post. Thus, the mounting structure 160 enables a welding operator to efficiently and effectively mount the wire feeder onto a mounting post based on feel (i.e., whether the end of the mounting post is disposed in the elongated channel 162 or aligned with the opening 164), rather than having to estimate the alignment of an opening on the bottom of the wire feeder 40 with the end of the mounting post.

Figure 5A:
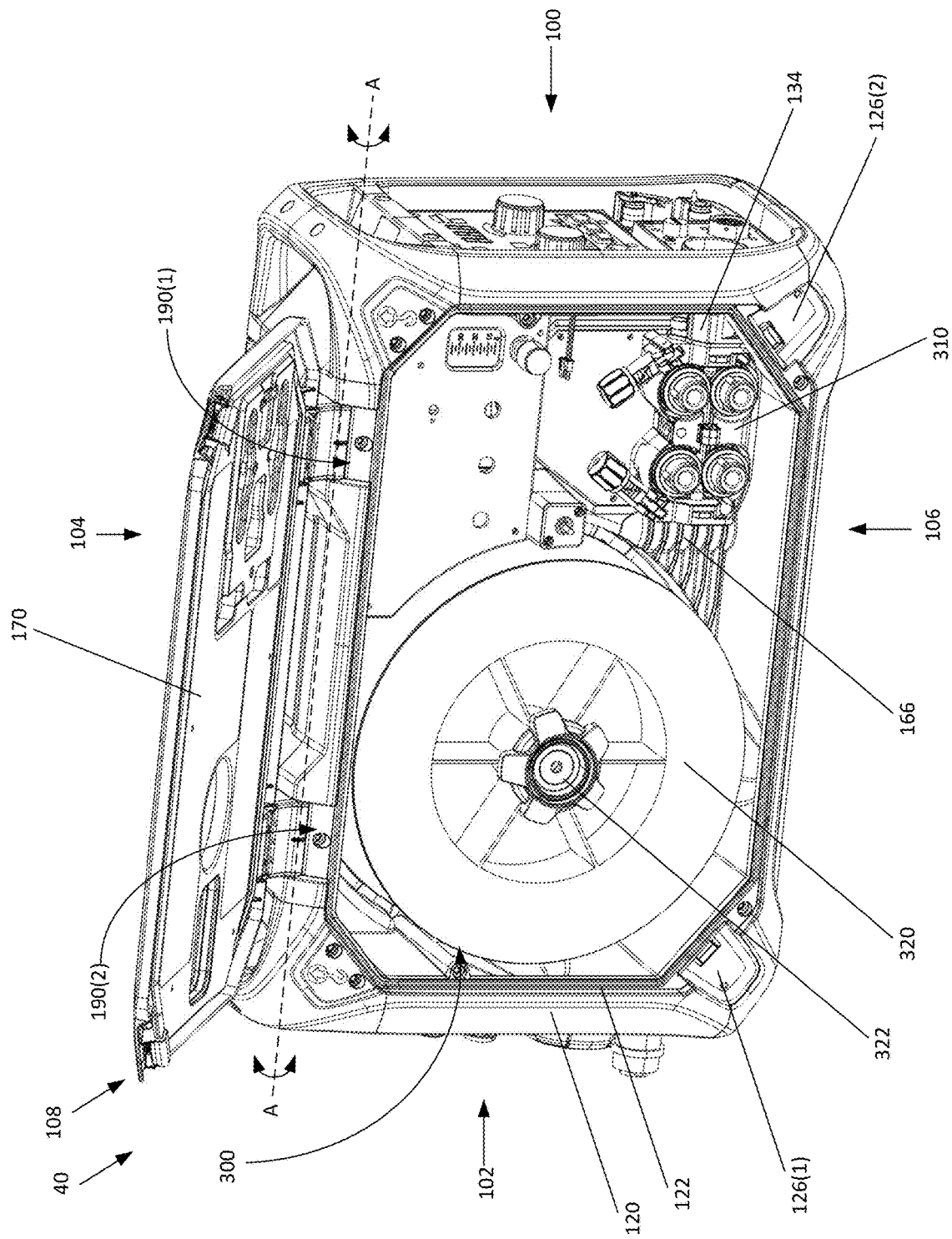
FIG. 5A illustrates a perspective view of the first side of the wire feeder illustrated in FIG. 2A where the first access door is in the open position and providing access to the components proximate to the first side of the wire feeder.

As illustrated in FIGS. 2A, 2B, 3C, 3D, 5A, and 5B, the wire feeder 40 includes a first access door 170 and a second access door 180. The first access door 170 is disposed on the first side 108 of the wire feeder 40 and the second access door 180 is disposed on the second side 110 of the wire feeder 40. As best illustrated in FIG. 5A, the first access door 170 is rotatably coupled to the wire feeder 40 proximate to the intersection of the first side 108 and the top side 104, and configured to rotate about axis A-A between a closed position (illustrated in FIGS. 2B and 3C) and an open position (illustrated in FIG. 5A). Similarly, the second access door 170 is rotatably coupled to the wire feeder 40 proximate to the intersection of the second side 110 and the top side 104, where the second access door 170 is configured to rotate about axis B-B between a closed position (illustrated in FIGS. 2A and 3D) and an open position (illustrated in FIG. 5B). When the access doors 170, 180 are in their open positions, the access doors 170, 180 provide access to the interior cavity 300 of the wire feeder 40. More specifically, the first access door 170 in the open position reveals a first opening 122 in the housing 120 on the first side 108 of the wire feeder 40, while the second access door 180 in the open position reveals a second opening 124 in the housing 120 on the second side 110 of the wire feeder 40.

Figure 6B:
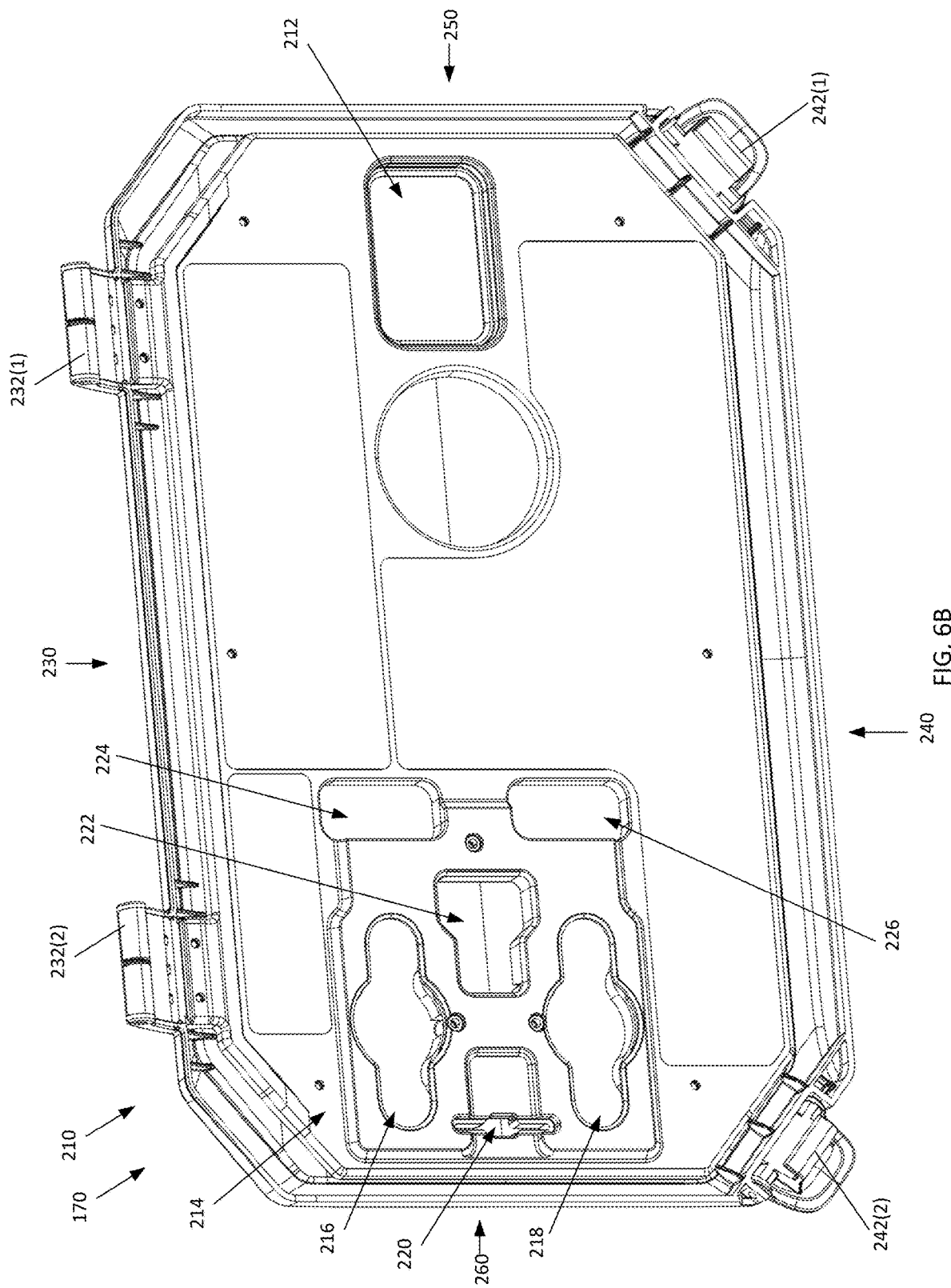
FIG. 6B illustrates a perspective view of the interior of the first access door illustrated in FIG. 6A.

Turning to FIGS. 6A, 6B, 6C, 6D, 6E, and 6F, illustrated are isolated views of the first access door 170 (FIGS. 6A, 6B, 6C, 6D, and 6E) as well as a perspective view of the wire feeder 40 showing the second access door 180 (FIG. 6F). While FIGS. 6A, 6B, 6C, 6D, and 6E illustrate the first access door 170, the discussion of FIGS. 6A, 6B, 6C, 6D, and 6E also applies to the second access door 180 as the two access doors 170, 180 may be nearly identical to one another. Similarly, while FIG. 6F illustrates the second access door 180, the discussion of FIG. 6F also applies to the first access door 170.

Figure 5B:
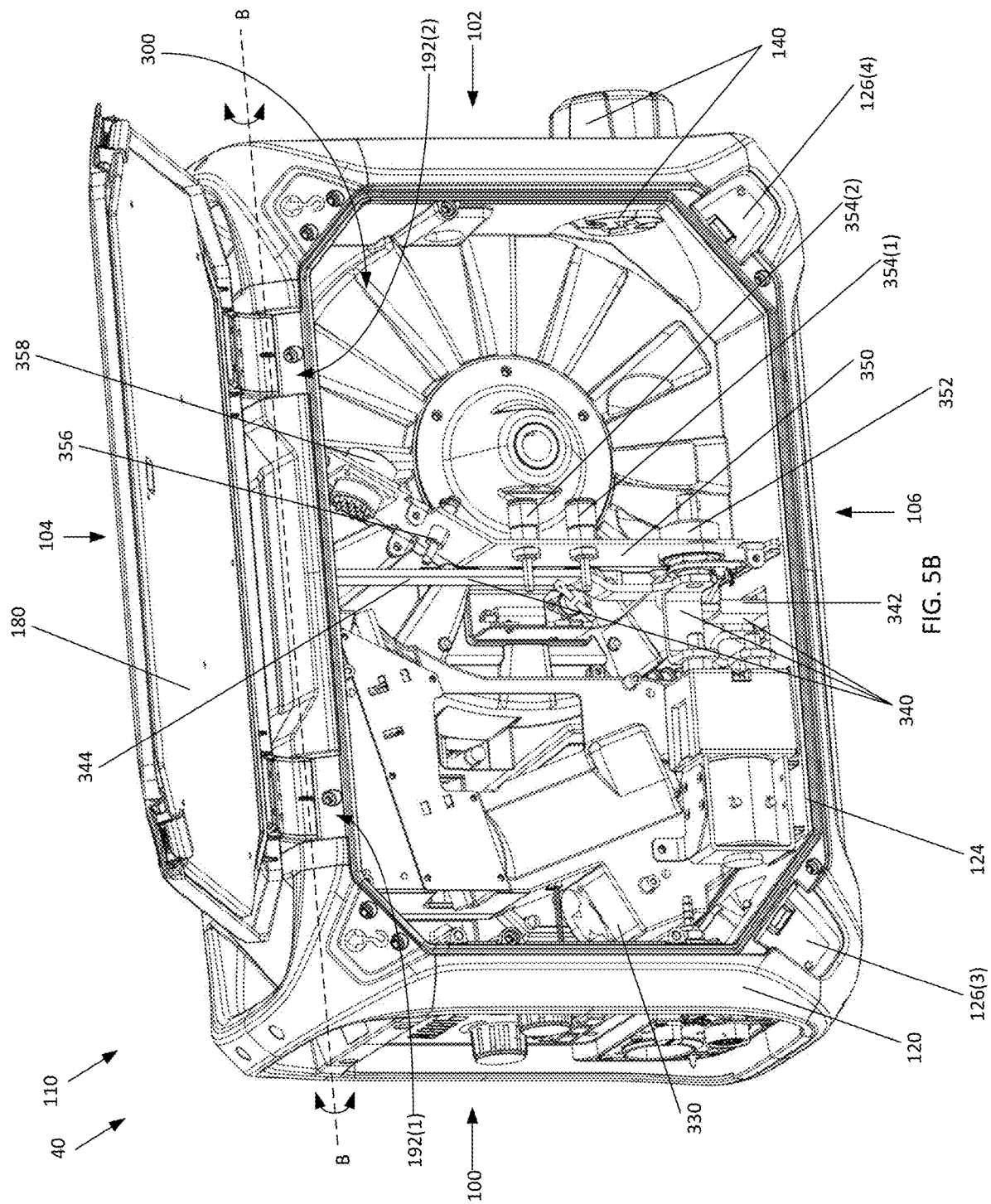
FIG. 5B illustrates a perspective view of the second side of the wire feeder illustrated in FIG. 2A where the second access door is in the open position and providing access to the components proximate to the second side of the wire feeder.

As illustrated in FIGS. 6A, 6B, 6C, 6D, and 6E, the first access door 170 contains an exterior side 200 that forms most of the first side 108 of the wire feeder 40 and an opposite interior side 210. The first access door 170 also includes a top edge 230, a bottom edge 240 opposite the top edge 230, a first side edge 250 that spans from the top edge 230 to the bottom edge 240, and a second side edge 260 that spans from the top edge 230 to the bottom edge 240 opposite the first side edge 250. As illustrated, the top edge 230 includes a pair of hinge members 232(1), 232(2) that extend from the top edge 230. The hinge members 232(1), 232(2) are spaced from one another across the top edge 230, with the first hinge member 232(1) being disposed more proximate to the first side edge 250 and the second hinge member 232(2) being disposed more proximate to the second side edge 260. Returning to FIGS. 2A, 2B, 3E, 5A, and 5B, the hinge members 232(1), 232(2) may be received in recesses 190, 192 that are disposed in the housing 120 primarily on the top side 104 of the wire feeder 40. The recesses 190(1), 190(2) may be disposed on the top side 104 of the wire feeder 40 proximate to the first side 108, while, as best illustrated in FIG. 5A, extending at least partially down the first side 108 of the housing 120 of the wire feeder 40. Similarly, the recesses 192(1), 192(2) may be disposed on the top side 104 of the wire feeder 40 proximate to the second side 110, while, as best illustrated in FIG. 5B, extending at least partially down the second side 110 of the housing 120 of the wire feeder 40. As best illustrated in FIGS. 2B and 5A, the recesses 190(1), 190(2) be spaced from one another such that the recesses 190(1), 190(2) receive the hinge members 232(1), 232(2) of the first access door 170. The hinge members 232(1), 232(2) enable the first access door 170 to be rotatably coupled to the housing 120 of the wire feeder 40 at the intersection of the first side 108 and the top side 104 of the wire feeder 40. Moreover, the rotatable axis A-A about which the first access door 170 rotates extends through the recesses 190(1), 190(2) and the hinge members 232(1), 232(2).

As best illustrated in FIG. 2B, the recesses 190(1), 190(2) are dimensioned such that when the first access door 170 is in the closed position, the hinge members 232(1), 232(2) are disposed within the portion of the recesses 190(1), 190(2) that are disposed on the first side 108 of the housing 120 of the wire feeder such that the hinge members 232(1), 232(2) are flush with the portion of the housing 120 surrounding the recesses 190(1), 190(2). The hinge members 232(1), 232(2) being flush with the housing 120 when the first access door 170 is in the closed position provides protection for the hinge members 232(1), 232(2) by making the hinge members 232(1), 232(2) less susceptible to being directly impacted.

In addition, as illustrated best in FIGS. 2A and 2B, the recesses 190(1), 190(2) extend toward the center of the top side 104 of the housing 120 of the wire feeder 40 from the hinge members 232(1), 232(2) (i.e., the recesses 190(1), 190(2) extend partially across the top side 104 of the housing 120 toward the second side 110). These portions of the recesses 190(1), 190(2) enable the first access door 170 to be rotated more than 180 degrees about axis A-A from the closed position to the open position, where, in the open position, the exterior side 200 of the first access door 170 rests against the primary handle 150 disposed on the top surface 108 of the wire feeder 40. In addition, when the wire feeder 40 is disposed on the second side 110 in a horizontal configuration (i.e., the second side 110 placed against a support surface), the first access door 170 may be rotated more than 180 degree about axis A-A from the closed position to the open position, where, in the open position, the bottom edge 240 of the first access door 170 rests against the support surface. By having the first access door 170 rest against objects (e.g., the primary handle 150 or the support surface) when in the open position, the amount of stress and strain placed on the hinge members 232(1), 232(2) is reduced.

The recesses 192(1), 192(2), may be substantially similar to recesses 190(1), 190(2), and may provide the same features to the second access door 180 as those provided to the first access door 170 by recesses 190(1), 190(2).

As best illustrated in FIGS. 6A and 6B, the first access door 170 also includes a pair of latches 242(1), 242(2) that may be configured to secure the first access door 170 in the closed position illustrated in FIGS. 2B and 3C. The first latch 242(1) is disposed at the intersection or coupling of the bottom edge 240 with the first side edge 250, while the second latch 242(2) is disposed at the intersection or coupling of the bottom edge 240 with the second side edge 260. Thus, the latches 242(1), 242(2) are spaced on opposite sides of the bottom edge 240 from one another. The latches 242(1), 242(2) may be rotatably coupled to the first access door 170. In addition, the latches 242(1), 242(2) may be configured to align with receptacles 126(1), 126(2), respectively, of the housing 120 of the wire feeder 40 (receptacles 126(1), 126(2) being illustrated in FIG. 5A). Thus, when the first access door 170 is in the closed position, the first latch 242(1) may be received within the first receptacle 126(1) and may be configured to operatively interlock to the first receptacle 126(1). Similarly, the second latch 242(2) may be received within the second receptacle 126(2) and may be configured to operatively interlock to the second receptacle 126(2) when the first access door 170 is in the closed position. When the latches 242(1), 242(2) are disposed within, and interlocked with, the receptacles 126(1), 126(2), respectively, the first access door 170 is secured in the closed position. In some embodiments, the first access door 170 may forms a substantially airtight or hermetic seal with the opening 122 of the housing 120 when in the closed position. A welding operator may rotate the latches 242(1), 242(2) about the first access door 170 to unlock the latches 242(1), 242(2) from the receptacles 126(1), 126(2), respectively, which then enables the first access door 170 to be rotated from the closed position to the open position about axis A-A.

As best illustrated in FIG. 6A, the exterior side 200 of the first access door 170 includes two raised wear plates 202(1), 202(2) that are removably coupled to the first access door 170 and extend outwardly from the surface of the exterior side 200. The first wear plate 202(1) may be disposed proximate to the top edge 230, while the second wear plate 202(2) may be dispose proximate to the bottom edge 240. The wear plates 202(1), 202(2) may both extend substantially across the exterior side 200 of the first access door 170 from proximate the first side edge 250 to proximate the second side edge 260. When the first access door 170 is in the closed position, the wire feeder 40 may be placed on a support surface with the first side 108 facing the support surface and the wear plates 202(1), 202(2) providing a structure that contacts the support surface and supports the wire feeder 40 on the support surface. Thus, when the wire feeder 40 is placed first side 108 down on the support surface, the wear plates 202(1), 202(2) space the exterior side 200 from the support surface. The wear plates 202(1), 202(2) may reduce the wear experienced by the first access door 170 by spacing the exterior side 200 of the first access door 170 from the support surface when the wire feeder 40 it positioned in a horizontal orientation with the first access door 170 facing downward toward the support surface. Moreover, the wear plates 202(1), 202(2) may be constructed of a composite material that enables the wear plates 202(1), 202(2) to be wear resistant (i.e., resistant to scuffs, dents, scratches, etc.). In some embodiments, the composite material may also enable the wear plates 202(1), 202(2) to serve as low friction surfaces that the welding operator can use to slide the wire feeder 40 over support surfaces.

The wear plates 202(1), 202(2) may be removably coupled to the exterior side 200 of the first access door 170 via a set of fasteners (e.g., screws) inserted into the fastening openings 204 disposed in the wear plates 202(1), 202(2). FIG. 6F illustrates the wear plates 202(1), 202(2) being removed from the exterior side 200 of the second access door 180. As illustrated, removal of the wear plates 202(1), 202(2) from either the first access door 170 or the second access door 180 reveals a set of exterior side fasteners 206, which are configured to align with the fastener openings 204 of the wear plates 202(1), 202(2), and a set of attachment openings 208. As explained in further detail below, a cart 1500 may be coupled to either of the access door panels 170, 180 via the attachment openings 208 when the wear plates 202(1), 202(2) are removed.

Returning to FIGS. 6A and 6B, the first access door 170 further includes a view window 212. The view window 212 extends through the first access door 170 from the exterior side 200 to the interior side 210. The view window 212 may be disposed proximate to the first side edge 250 and may be spaced from the top edge 230 and the bottom edge 240. Furthermore, the view window 212 may be at least partially translucent to enable a welding operator to view inside the interior cavity 300 of the wire feeder 40 when the first access door 170 is disposed in the closed position. (i.e., a welding operator may view the interior cavity 300 without having to reposition the first access door 170 to the open position). More specifically, the view window 212 provides a view of the weld wire and/or weld wire spool 320 so that a welding operator can easily and quickly determine the amount of welding wire that remains within the wire feeder 40.

Figure 6C:
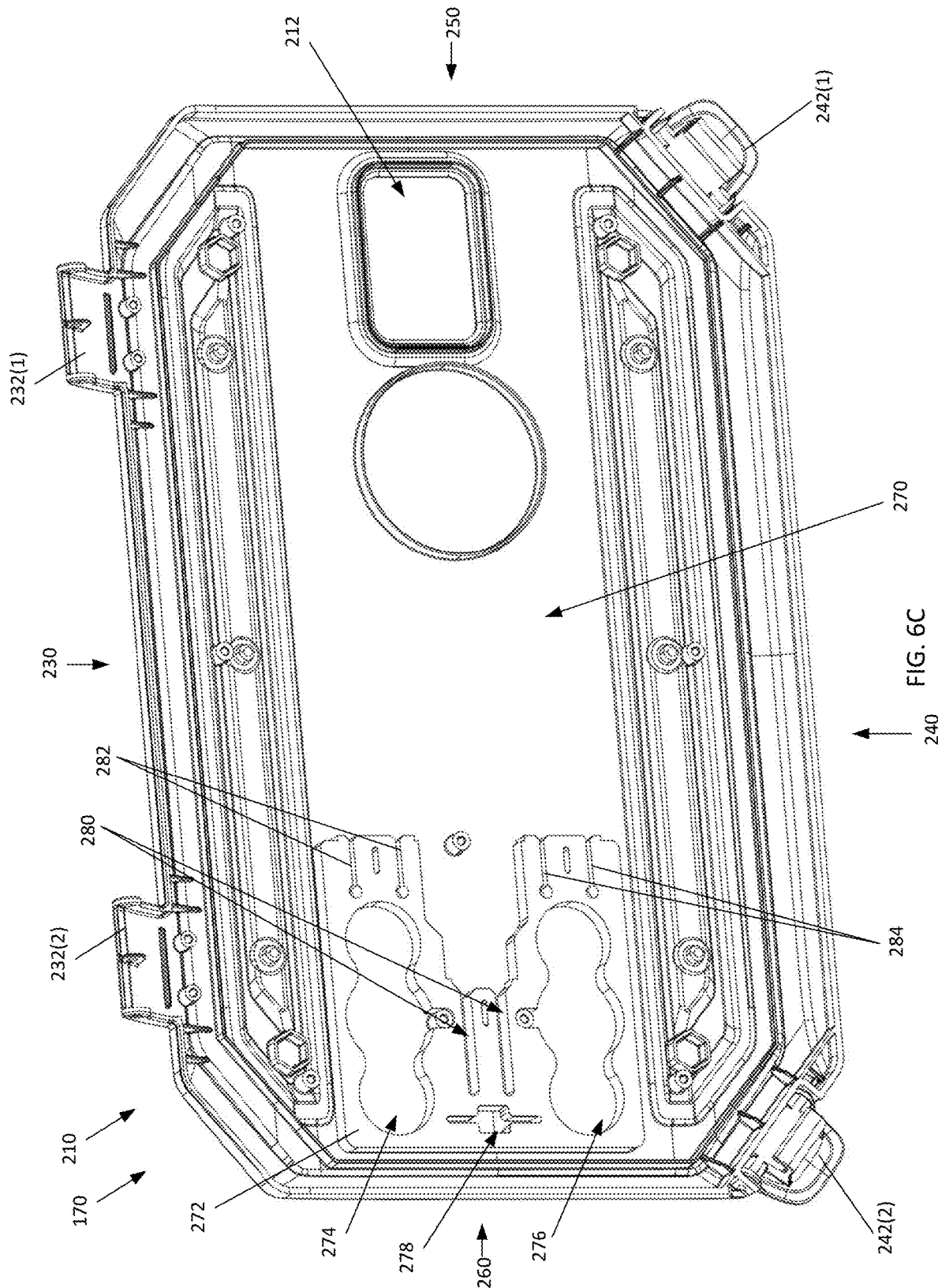
FIG. 6C illustrates a perspective view of the interior of the first access door illustrated in FIG. 6B where the interior panel of the first access door is removed.
Figure 6D:
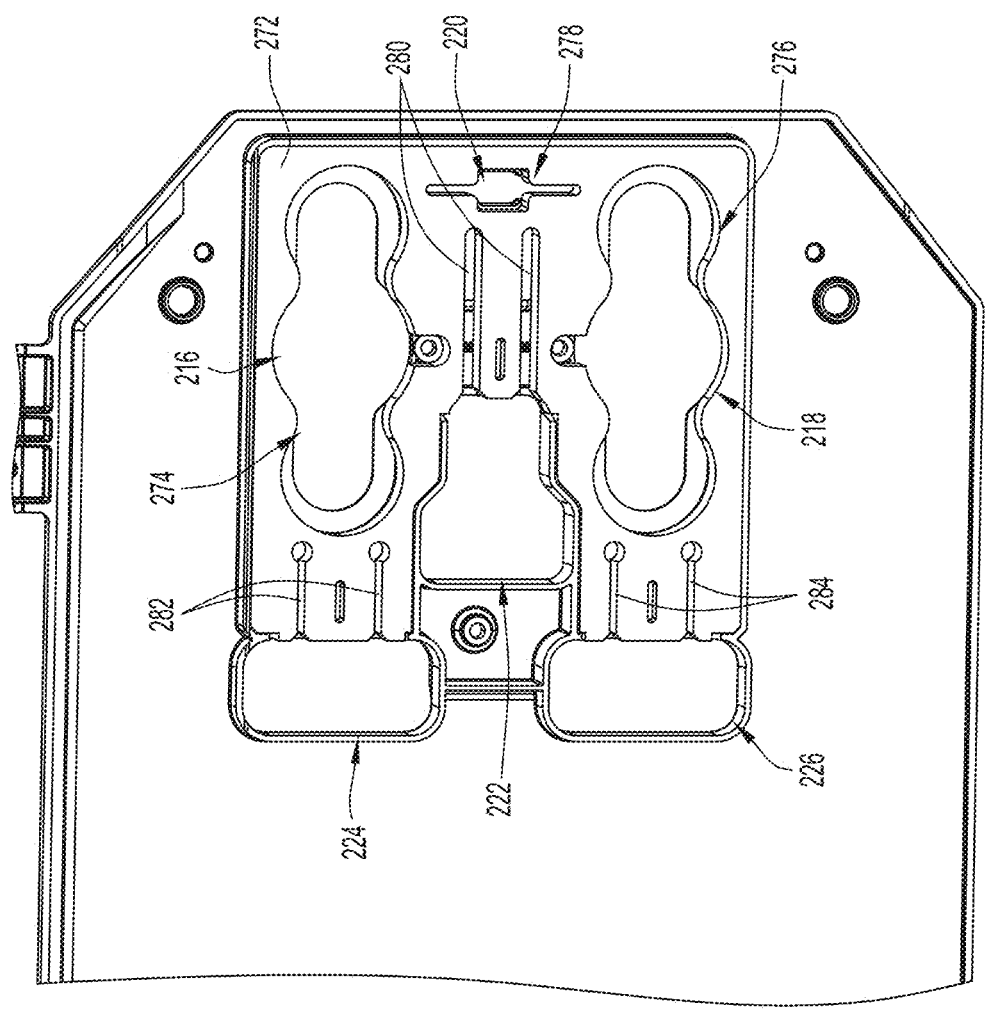
FIG. 6D illustrates an elevational interior view of an interior side of the interior panel removed from the first access door illustrated in FIG. 6A.

As best illustrated in FIGS. 6B, 6C, and 6D, the first access door 170 contains an interior door storage compartment 214 proximate to the second side edge 260. The interior door storage compartment 214 may include a series of openings 216, 218, 220, 222, 224, 226 disposed in the surface of the interior side 210 of the first access door 170, and an intermediate storage organizer 272 disposed in the intermediate space 270 that is disposed between the exterior side 200 and the interior side 210 of the first access door 170. As illustrated in FIG. 6B, the interior door storage compartment 214 includes six storage openings 216, 218, 220, 222, 224, 226 that are oriented in close proximity to one another. The first and second door storage openings 216 and 218 may configured to receive and store replacement drive wheels 818 (see, e.g., FIGS. 6E and 10A) of the wire feeder mechanism 310, as further detailed below. As illustrated, the first and second door storage openings 216, 218 may be elongated horizontal openings that are widest in the middle or central portion of the door storage openings 216, 218. In addition, the third and fourth door storage openings 220, 222 may be at least partially disposed between the first and second door storage openings 216, 218, and may be configured to store the wire feed tube guides 1000, 1100, 1200, as further detailed below (See, e.g., FIGS. 6E, 10A-10C, 11, and 12A-12D). The third door storage opening 220 may be an elongated vertical opening with a middle or central portion that is wider than the end portions, while the fourth door storage opening 222 may contain two portions, the leftmost portion being shorter in height than the rightmost portion. The fifth and sixth door storage openings 224, 226 may be disposed substantially adjacent to the first and second door storage openings 216, 218, and may be configured to receive and store contact tips 290 of the welding torch 50, as shown in FIG. 6E. As illustrated, the fifth and sixth door storage openings 224, 226 may be substantially rectangular in shape.

As best illustrated in FIG. 6C, where the panel on the interior side 210 of the first access door 170 is removed to expose the intermediate space 270 of the first access door 170 and the intermediate storage organizer 272, and as illustrated in FIG. 6D, where the intermediate storage organizer 272 is placed against the inner surface of the panel disposed on the interior side 210 of the first access door 170, the intermediate storage organizer 272 is equipped with a series of cutouts and slots. More specifically, the intermediate storage organizer 272 includes three cutouts and six slots. The first and second cutouts 274, 276 may be elongated horizontal cutouts having rounded and wave-like sidewalls that create three segmented areas of the cutouts 274, 276 configured to receive the drive wheels 818. The third cutout 278 may be a vertically oriented cutout disposed between the first and second cutouts 274, 276. The third cutout 278 may have a rectangular shaped middle portion with elongated slits extending upwardly and downwardly from the rectangular shaped middle portion. A first pair of slots 280 may be disposed in the intermediate storage organizer 272 proximate to the third cutout 278 and between the first and second cutouts 274, 276. A second pair of slots 282 may be disposed in the intermediate storage organizer 272 proximate to the first cutout 274, while a third pair of slots 284 may be disposed in the intermediate storage organizer 272 proximate to the second cutout 276. Furthermore, the intermediate storage organizer 272 may be constructed from a deformable foam or foam-like material.

As best illustrated in FIG. 6D, the intermediate storage organizer 272 is shaped such that the cutouts and slots 274, 276, 278, 280, 282, 284 align with the openings 216, 218, 220, 222, 224, 226 of the interior door storage compartment 214 to facilitate the insertion of objects into the openings 216, 218, 220, 222, 224, 226 and the storage of those objects in the cutouts and slots 274, 276, 278, 280, 282, 284 of the intermediate storage organizer 272. As FIG. 6D illustrates, the first and second cutouts 274, 276 are aligned with the first and second openings 216, 218, respectively. Moreover, the middle segmented area of the first cutout 274 aligns with the wider central portion of the first door storage opening 216, while, similarly, the middle segmented area of the second cutout 276 aligns with the wider central portion of the second door storage opening 218. This enables the drive wheels 818 to be inserted into the middle or central portion of the first and/or second door storage openings 216, 218, and then slid to one of the ends of the first and second door storage openings 216, 218 for storage. The drive wheels 818 may have a diameter that is larger than the width of the end portions of the first and second door storage openings 216, 218, but the end segmented areas of the first and second cutouts 274, 276 may be dimensioned to receive the drive wheels 818. The combination of the width of the end portions of the first and second door storage openings 216, 218 being thinner than the diameter of the drive wheels 818 and the wave-like sidewalls of the first and second cutouts 274, 276 creating segmented areas secures the drive wheels 818 in the ends of the first and/or second door storage openings 216, 218. In other words, the panel forming the interior side 210 of the first access door 170 retains the drive wheels 818 in the interior door storage compartment 214 in a direction that is perpendicular to the plane in which the panel forming the interior side 210 is disposed. Simultaneously, the segmented areas of the intermediate storage organizer 272 retains the drive wheels 818 in the interior door storage compartment 214 in a direction that is parallel to the plane in which the panel forming the interior side 210 is disposed. This combination is effective at preventing the drive wheels 818 from falling out of the interior door storage compartment 214, especially when the first access door 170 is swung into the closed position. The storage of the drive wheels 818 is illustrated in FIG. 6E.

Figure 10A:
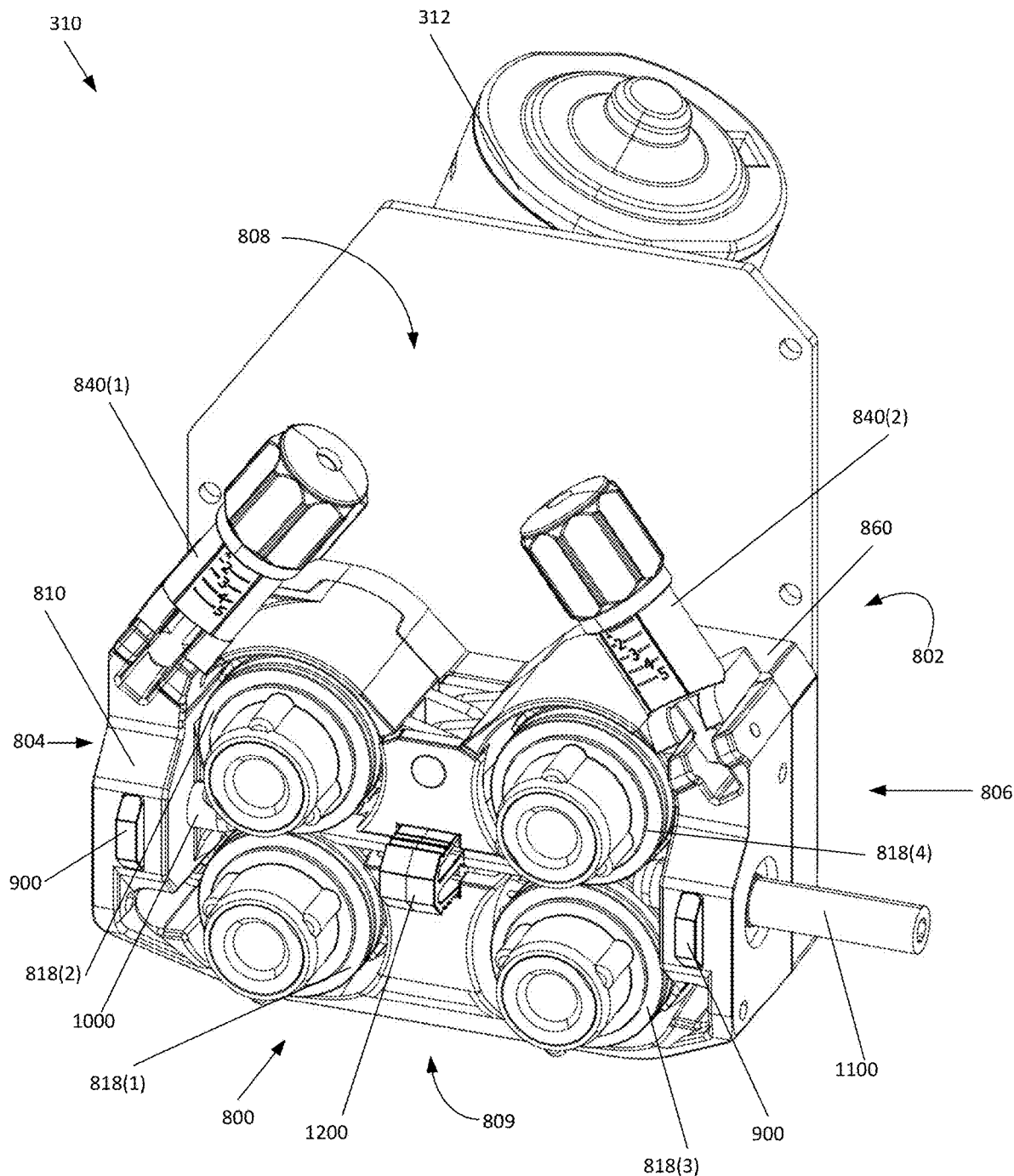
FIG. 10A illustrates a perspective view of the wire feeder mechanism of the wire feeder illustrated in FIG. 2A.

As further illustrated in FIG. 6D, the third cutout 278 of the intermediate storage organizer 272 is substantially equal in size and shape to that of the third door storage opening 220. The third door storage opening 220 is configured to receive the intermediate wire guide 1200 (best illustrated in FIGS. 12A, 12B, 12C, and 12D, and discussed in more detail below) of the wire feeder mechanism 310 (FIG. 10A). As illustrated in FIG. 6E, the intermediate wire guide 1200 may be retained within the third door storage opening 220 by interaction of tabs disposed on living hinges of the intermediate wire guide 1200 with the edges of the third door storage opening 220. In other words, interaction of the tabs of the intermediate wire guide 1200 with the edges forming the third door storage opening 220 retains the wire guide 1200 in the interior door storage compartment 214 in a direction that is perpendicular to the plane in which the panel forming the interior side 210 is disposed. Simultaneously, shape of third cutout 278 of the intermediate storage organizer 272 retains the intermediate wire guide 1200 in the interior door storage compartment 214 in a direction that is parallel to the plane in which the panel forming the interior side 210 is disposed. This combination is effective at preventing the intermediate wire guide 1200 from falling out of the interior door storage compartment 214, especially when the first access door 170 is swung into the closed position.

FIG. 6D also illustrates that the first pair of slots 280 may be offset from the fourth door storage opening 222, but still in fluid communication with the fourth door storage opening 222. More specifically, when the intermediate storage organizer 272 is aligned with the openings 216, 218, 220, 222, 224, 226 of the door storage compartment 214, the slots 280 extend from the leftmost portion of the fourth door storage opening 222 behind the panel forming the interior side 210 of the first access door 170. Thus, the inlet and outlet wire guide tubes 1000, 1100 (best illustrated in FIG. 11, and discussed in more detail below) may be inserted into the fourth door storage opening 222 via the rightmost portion of the fourth door storage opening 222, and then slid into the slots 280. The first pair of slots 280 may be sized and shaped to frictionally receive and retain the inlet and outlet wire guide tubes 1000, 1100 as illustrated in FIG. 6E. In other words, with the inlet and outlet wire guide tubes 1000, 1100 being disposed primarily behind the panel forming the interior side 210 of the first access door 170, the panel forming the interior side 210 retains the inlet and outlet wire guide tubes 1000, 1100 in the interior door storage compartment 214 in a direction that is perpendicular to the plane in which the panel forming the interior side 210 is disposed. Simultaneously, the first pair of slots 280 frictionally receiving the inlet and outlet wire guide tubes 1000, 1100 serves to retain the inlet and outlet wire guide tubes 1000, 1100 in the intermediate storage organizer 272 in a direction that is parallel to the plane in which the panel forming the interior side 210 is disposed. This combination is effective at preventing the inlet and outlet wire guide tubes 1000, 1100 from falling out of the interior door storage compartment 214, especially when the first access door 170 is swung into the closed position.

Similar to the first pair of slots 280, FIG. 6D further illustrates that the second and third pairs of slots 282, 284 may be offset from the fifth and sixth door storage openings 224, 226, respectively, but still in fluid communication with the fifth and sixth door storage openings 224, 226, respectively. Like the first pair of slots 280, when the intermediate storage organizer 272 is aligned with the openings 216, 218, 220, 222, 224, 226 of the door storage compartment 214, the second pair of slots 282 extends from the fifth door storage opening 224 behind the panel forming the interior side 210 of the first access door 170. Similarly, the third pair of slots 284 extends from the sixth door storage opening 226 behind the panel forming the interior side 210 of the first access door 170. In order to store contact tips 290 within the fifth and sixth door storage openings 224, 226, the contact tips 290 may be inserted into the fifth and/or sixth door storage openings 224, 226, and then slid into the second and/or third pairs of slots 282, 284, respectively. Like the first pair of slots 280 and the wire guide tubes 1000, 1100, the second and third pairs of slots 282, 284 may be sized and shaped to frictionally receive and retain the contact tips 290. In other words, with the contact tips 290 being disposed primarily behind the panel forming the interior side 210 of the first access door 170, the panel forming the interior side 210 retains the contact tips 290 in the interior door storage compartment 214 in a direction that is perpendicular to the plane in which the panel forming the interior side 210 is disposed. Simultaneously, the second and third pairs of slots 282, 284 frictionally receiving the contact tips 290 serves to retain the contact tips 290 in the intermediate storage organizer 272 in a direction that is parallel to the plane in which the panel forming the interior side 210 is disposed. This combination is effective at preventing the contact tips 290 from falling out of the interior door storage compartment 214, especially when the first access door 170 is swung into the closed position.

Returning to FIGS. 5A and 5B, disposed within the interior cavity 300 of the housing 120 of the wire feeder 40 are various components. Some of these components include the wire feeder mechanism 310, the welding wire spool 320, the circulation/cooling fan 330, the current bars 340, and other components that are discussed in detail below. As illustrated, the wire feeder mechanism 310 and the welding wire spool 320 are disposed more proximate to the first side 108 of the wire feeder 40, and are accessible when the first access door 170 is in the open position. The wire feeder mechanism 310 is disposed within the interior cavity 300 proximate to the front side 100 and bottom side 106 of the wire feeder 310, and may be directly coupled to the interchangeable cable connector 134 which is at least partially disposed within the opening 133 of the first connection panel 132, as previously described. The welding wire spool 320 may contain welding wire for performing a welding operation, and may be disposed proximate to the rear side 102 of the wire feeder 40. The welding wire spool 320 may be rotatably mounted on an axle 322 within the interior cavity 300 of the wire feeder 40 such that the welding wire spool 320 can rotate to unwind welding wire that is then fed to the wire feeder mechanism 310. The wire feeder mechanism 310, as described in further detail below, may be configured to propel welding wire received from the welding wire spool 320 or an external wire spool to the welding torch 50 via the torch cable 62.

As illustrated in FIG. 5B, disposed within the wire feeder 40 and accessible via the second side opening 124 when the second access door 180 is in the open configuration is a connector panel 350 that comprises a series of connectors. The connector panel 350 includes a power connector 352, a pair of water connectors 354(1), 354(2), a gas connector 356, and a communications connector 358. While not illustrated in FIG. 5B, a weld power cable may enter the interior cavity 300 of the housing 120 of the wire feeder 40 via the strain relief device 140 and may be coupled to the power connector 352. Similarly, cooling water supply and return cables that enter the interior cavity 300 of the wire feeder 40 via the strain relief device 140 and may be connected to the water connectors 354(1), 354(2), while a gas supply cable that enters the interior of the cavity 300 of the wire feeder 40 via the strain relief device 140 may be connected to the gas connector 356. The communications cable that enters the interior cavity 300 of the wire feeder 40 via the strain relief device 140 may be connected to the communications connector 358 of the connector panel 350.

With respect to the power connector 352, FIG. 5B illustrates that a set of current bars 340 is coupled to the power connector 352 such that the current bars 340 receive power from the power source 20 via the weld power cable that is ultimately coupled to the power connector 352. As FIG. 5B illustrates, the set of current bars 340 includes at least a lower current bar 342 and an upper current bar 344. The lower current bar 342 extends downwardly from the power connector 352 of the connector panel 350, while the upper current bar 344 extends upwardly from the power connector 352 of the connector panel 350. As further detailed below, the set of current bars 340 is coupled to various components within the wire feeder 40 and is configured to deliver welding power to the welding torch 50, as well as power components of the wire feeder 40 and accessories coupled to the wire feeder 40.

While not illustrated in FIG. 5B, each of the other connectors 354(1), 354(2), 356, 358 of the connector panel 350 may also be connected to devices or other connectors within the wire feeder 40 to enable a welding operation to be performed. For example, the water connectors 354(1), 354(2) may be connected to the water connectors 138(1), 138(2) of the second connection panel 137 disposed on the front side 100 of the wire feeder 40 (See FIG. 3A). In addition, the gas connector 356 may be connected to the interchangeable cable connector 134, so that gas may be delivered to the welding torch 50 when the torch cable 62 is connected to the interchangeable cable connector 134 in the opening 133 of the first connection panel 131 disposed on the front side 100 of the wire feeder 40. The communications connector 358 may be connected to the control panel 130 of the wire feeder 40, and, more specifically, the PCB 720 of the control panel 130 (see FIG. 9C).

Figure 7A:
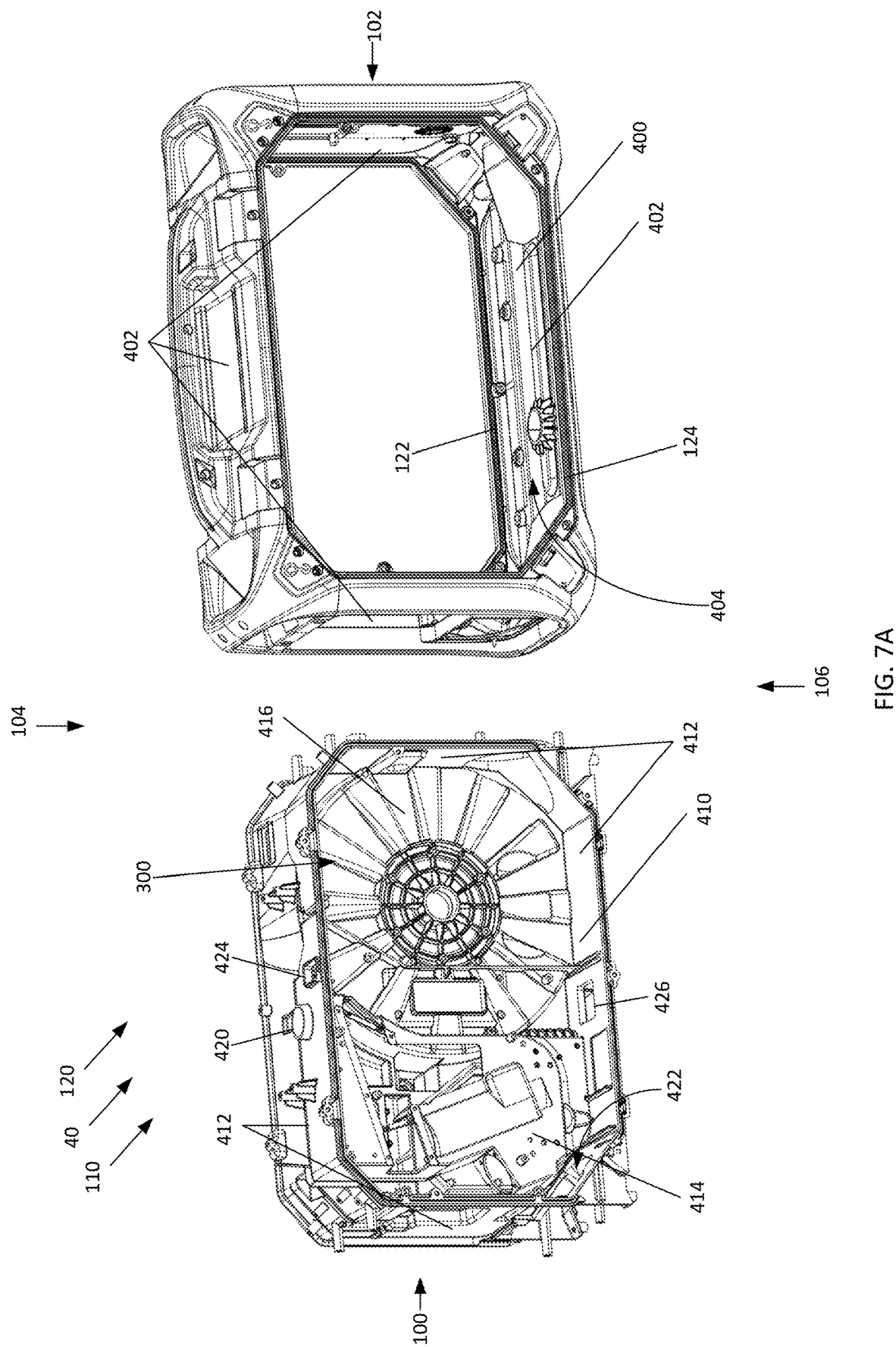
FIG. 7A illustrates an exploded perspective view of the housing portions of the wire feeder illustrated in FIG. 2A.
Figure 7B:
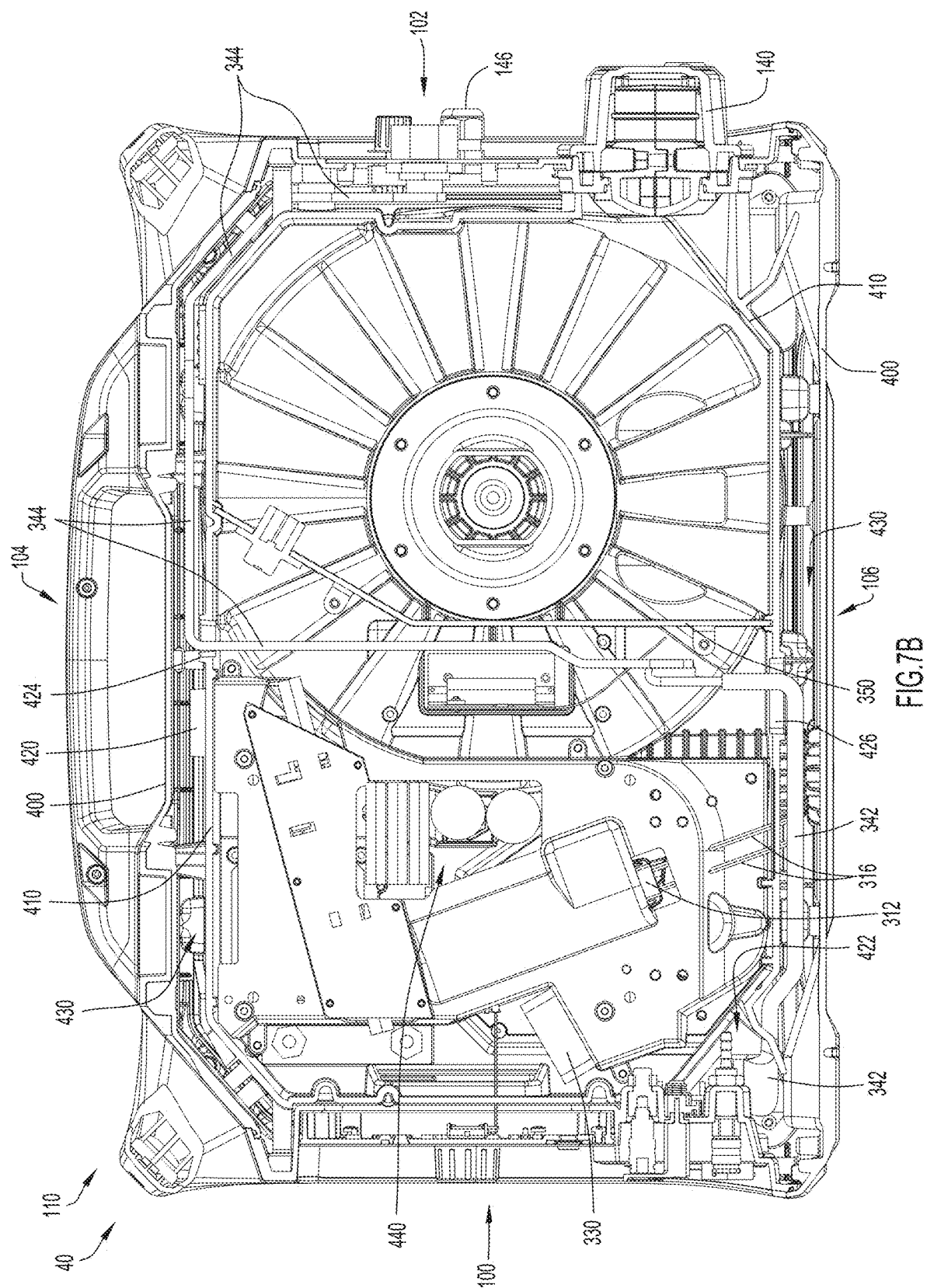
FIG. 7B illustrates a cross-sectional view of the second side of the wire feeder illustrated in FIG. 2A.
Figure 7C:
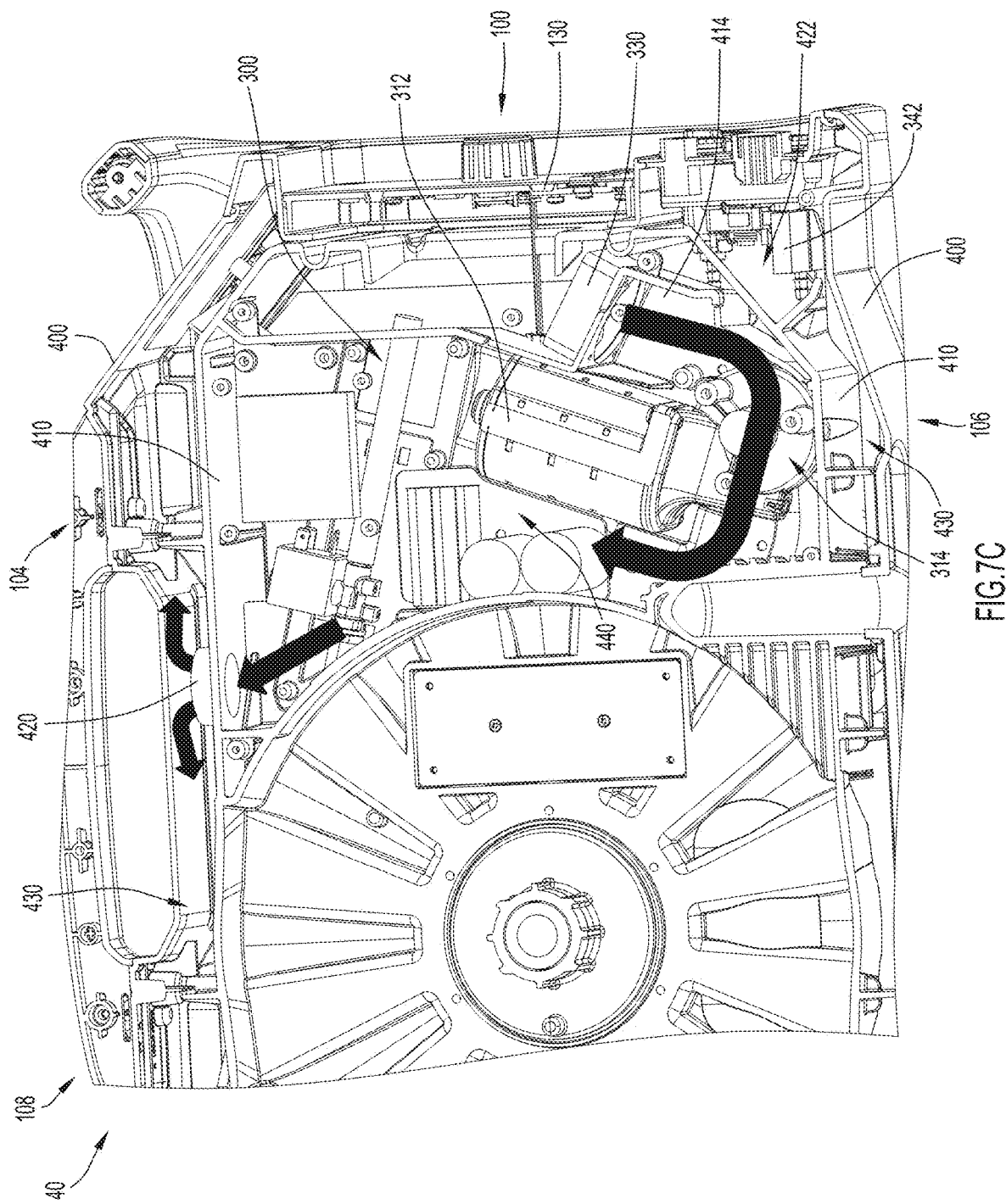
FIG. 7C illustrates a perspective view of a cross-section of the first side of the wire feeder illustrated in FIG. 2A.

Turning to FIG. 7A, illustrated is an exploded view of the housing 120 of the wire feeder 40. The housing 120 includes an exterior housing or framing 400 and an interior housing or framing 410. The interior housing 410 may be shaped and designed to fit entirely within the exterior housing 400, as illustrated in FIGS. 7B and 7C. The interior housing 410 may be constructed of materials that differ from those of the exterior housing 400, such that the interior housing 410 is more rigid than the exterior housing 400, while the exterior housing 400 may be more flexible and/or resilient than the interior housing 410. In one embodiment, interior housing 400 may be constructed from a glass fiber reinforced and impact modified polyamide compound. In this same embodiment, the exterior housing 400 may be constructed from a combination of materials, including, but not limited to, different types of polyamides and polycarbonate compounds. One variation of a polyamide compound forming part of the exterior housing 400 may be a glass reinforced, heat stabilized, flame retardant, and halogen and red phosphorus free polyamide compound. Another polyamide compound that may form a portion of the exterior housing 400 may be similar to the polyamide compound forming the interior housing 410, where the polyamide compound is a glass fiber reinforced and impact modified polyamide compound. The polycarbonate compound that may form part of the exterior housing 400 may be a UV stabilized, flame retardant, and impact modified polycarbonate compound. Both the exterior housing 400 and the interior housing 410 may be formed by an injection molding process. This construction enables the wire feeder 40 to better withstand the harsh welding environments it may be exposed to, where the more flexible exterior housing 400 is less prone to being damaged (i.e., less susceptible to cracks, dents, and scratches), while the more rigid interior housing 410 provides the rigidity needed for the housing 120 of the wire feeder 40 to retain its shape. Furthermore, this construction eliminates the need for the housing 120 to be formed from heavier materials (e.g., steel) that are both rigid and durable enough to withstand being damaged, which reduces the weight of the wire feeder 40 and enables the wire feeder 40 to be portable.

As illustrated in FIG. 7A, the exterior housing 400 contains sidewalls 402 that form the front side 100, rear side 102, top side 104, and bottom side 106 of the wire feeder 40. Moreover, these four sidewalls 402 of the exterior housing 400 collectively form the first opening 122 on the first side 108 of the housing 120 of the wire feeder 40 and the second opening 124 on the second side 110 of the housing 120 of the wire feeder 40. The four sidewalls 402 also collectively define a cavity 404 which is sized and shaped to receive the interior housing 410.

FIG. 7A further illustrates that the interior housing 410, like that of the exterior housing 400, includes four sidewalls 412 that are oriented proximate to the front side 100, the rear side 102, the top side 104, and the bottom side 106 of the wire feeder 40. When the interior housing 410 is disposed within the cavity 404 of the exterior housing 400, the four sidewalls 412 may collectively define, along with the first and second access doors 170, 180, the interior cavity 300 of the wire feeder 40 where the majority of the components of the wire feeder 40 are disposed.

As further illustrated in FIG. 7A, the interior housing 410 may include a pair of central panels 414, 416 that substantially divides the interior housing 410, and ultimately the interior cavity 300 of the wire feeder 40 into two interior regions. The first interior region (i.e., the region that contains the wire feeder mechanism 310, the welding wire spool 320, etc.) is disposed proximate to the first side 108 of the wire feeder 40 and accessible to a welding operator when the first access door 170 is in the open position. The second interior region (i.e., the region that contains the circulation fan 330, a portion of the current bars 340, the connector panel 350, etc.) is disposed proximate to the second side 110 of the wire feeder and accessible to a welding operator when the second access door 180 is in the open position. The first central panel 414 may be disposed proximate to the front side of the interior housing 410, while the second central panel 416 may be disposed proximate to the rear side of the interior housing 410. The first central panel 414 may be a panel that is coupled or fastened to the interior housing 410 via fasteners, while the second central panel 416 may be integrally formed with the sidewalls 412 on at least the rear, top, and the bottom sides of the interior housing 410. In addition to dividing the interior cavity 300 into two interior regions, both central panels 414, 416 may provide rigid structural support to the interior housing 410, and ultimately the housing 120 of the wire feeder 40. The central panels 414, 416, and especially the integrally formed second central panel 416, may also provide torsional rigidity to the interior housing 410.

The sidewalls 412 of the interior housing 410 further include a series of openings. These openings include an inlet opening 420 disposed on the sidewall 412 at the top of the interior housing 410, and an outlet opening 422 disposed at the intersection of the sidewalls 412 of the front side and bottom side of the interior housing 410. FIG. 7A further illustrates that the sidewall 412 at the top side of the interior housing 410 also includes an upper current bar opening 424, while the sidewall 412 disposed on the bottom side of the interior housing 410 includes a lower current bar opening 426.

Figure 7D:
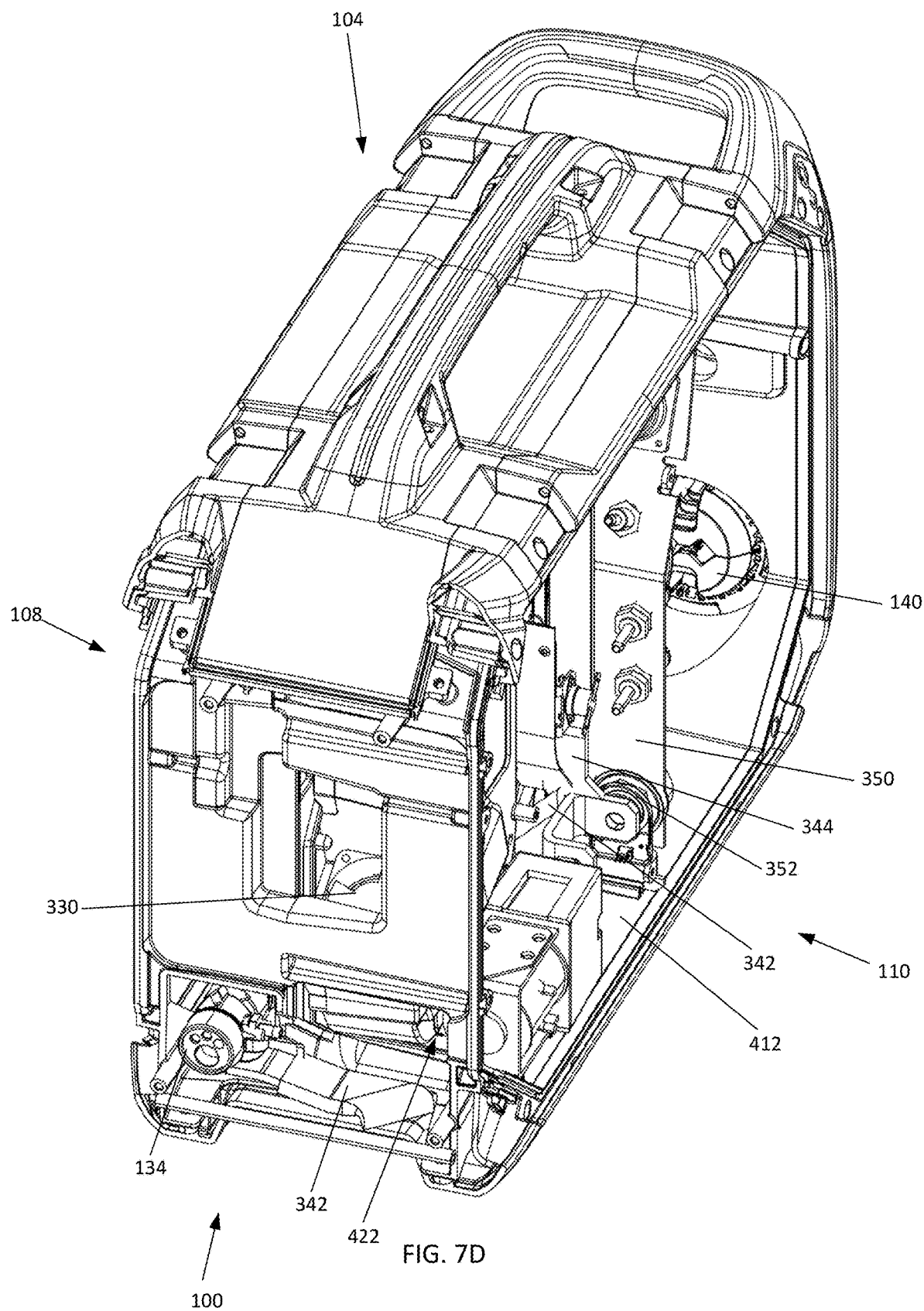
FIG. 7D illustrates a perspective view of a cross-section of the front side of the wire feeder illustrated in FIG. 2A.

As best illustrated in FIGS. 7B, 7C, and 7D, when the interior housing 410 is disposed within the cavity 404 of the exterior housing 400, an interstitial space 430 is disposed between the exterior housing 400 and the interior housing 410. This interstitial space 430 may surround the interior housing 410 such that the interstitial space 430 is disposed proximate to the front side 100, the rear side 102, the top side 104, and the bottom side 106 of the wire feeder 40. The interstitial space 430 may extend continuously around the interior housing 410. The inlet and outlet openings 420, 422 may provide access to the interstitial space 430 from the interior cavity 300 of the wire feeder 40. The upper and lower current bar openings 424, 426 may also provide access to the interstitial space 430 from the interior cavity 430.

As best illustrated in FIGS. 7B and 7D, the lower current bar 342 extends from the power connector 352 of the connector panel 350 downwardly through the lower current bar opening 426 of the interior housing 410 and into the interstitial space 430 disposed proximate to the bottom side 106 of the wire feeder 40. The lower current bar 342 then extends forward toward the front side 100 of the wire feeder 40 through the interstitial space 430. As illustrated in FIGS. 7C and 7D, the lower current bar 342 also extends across the front side 100 of the wire feeder 40 within the interstitial space 430 to connect to the interchangeable cable connector 134. Thus, the lower current bar 342 is configured to deliver power to the interchangeable cable connector 134 so that, when a torch cable 62 is connected to the interchangeable cable connector 134, welding power may be delivered to the welding torch 50 for a welding operation.

Continuing with FIG. 7B, the upper current bar 344 extends upwardly from power connector 352 of the connector panel 350, through the upper current bar opening 424 of the interior housing 410 and into the interstitial space 430 disposed proximate to the top side 104 of the wire feeder 40. The portion of the upper current bar 344 disposed within the interstitial space 430 extends rearwardly from the upper current bar opening 424 and down the interstitial space 430 proximate to the rear side 102 of the wire feeder 40 to connect with the accessory outlet 146 of the rear control and interface panel 142. Thus, the upper current bar 344 is configured to deliver welding power to the accessory outlet 146 so that, when a welding accessory (e.g., a shielded metal arc welding or manual metal arc welding accessory torch) is connected to the accessory outlet 146, welding power may be delivered to the welding accessory.

By running the current bars 342, 344 primarily through the interstitial space 430, the heat generated by the current bars 342, 344 is mainly contained to the interstitial space 430, where the generated heat may be more easily dissipated through the exterior housing 400 to the exterior of the wire feeder 40. The interior housing 410 may further serve to insulate the interior cavity 300 from the heat generated by the current bars 342, 344 in the interstitial space 430. Thus, running the current bars 342, 344 primarily through the interstitial space 430 reduces the amount of heat that is generated and disposed within the interior cavity 300 of the wire feeder 40, which reduces the chance that the other wire feeder components disposed within the interior cavity 300 overheat.

As best illustrated in FIG. 7C, the interstitial space 430 is further utilized as a portion of a closed looped circulation air pathway that may be employed to cool various components of the wire feeder 40. The circulation fan 330 may be coupled to the first central panel 414 proximate to the front side 100 of the wire feeder 40. The circulation fan 330 is configured to draw in circulated air from the second interior region and propel the circulated air past the motor 312 and the gearbox 314 of the wire feeder mechanism 310 in the first interior region. The circulated air from the second interior region may be cooler in temperature than the ambient air residing around the motor 312 and the gearbox 314 of the wire feeder mechanism 310, because the motor 312 and the gearbox 314 of the wire feeder mechanism 310 may generate heat as they operate to propel welding wire to the welding torch 50 via the wire feeder mechanism 310. As the circulated air is propelled past and around the motor 312 and the gearbox 314, the circulated air cools the motor 312 and the gearbox 314 of the wire feeder mechanism 310 via convection. Thus, as the circulated air is propelled past the motor 312 and the gearbox 314 of the wire feeder mechanism 310, the temperature of the circulated air may be at least slightly raised by absorbing some of the heat generated by the motor 312 and the gearbox 314. This warmed circulated air may continue to travel upward from the motor 312 and the gearbox 314 of the wire feeder mechanism 310 towards the inlet opening 420 in the top sidewall 412 of the interior housing 410, as indicated by the arrows in FIG. 7C. Prior to entering the interstitial space 430 via the inlet opening 420, some of the warmed circulated air may pass through the opening 440 in the first central panel 414, and thus into the second interior region. The remaining amount of warmed circulated air, as illustrated in FIG. 7C, may travel through inlet opening 420 and into the interstitial space 430. The circulated air may travel through the interstitial space 430 past the upper current bar opening 424, the lower current bar opening 426, and out of the interstitial space 430 via the outlet opening 422 located proximate to the front side 100 of the wire feeder 40. Some of the circulated air traveling through the interstitial space 430 may exit into the second interior region as the circulated air passes the upper current bar opening 424 and the lower current bar opening 426. The remaining amount of circulated air 430 exits the interstitial space 430, and enters the second interior region via the outlet opening 422.

As the cooling air travels through the interstitial space 430, the heat of the warmed circulated air may be more easily dissipated through the exterior housing 400 to the exterior of the wire feeder 40. Moreover, the closed loop path of the circulated air described above enables the circulation fan 330 to pump the circulated air within the housing 120 of the wire feeder 40 without drawing in air external to the wire feeder 40. The closed loop circulation path eliminates the need for the housing 120 of the wire feeder 40 to contain inlets and outlets to enable airflow into and out of the housing 120 of the wire feeder 40. This serves to prevent the use of polluted air that is external to the wire feeder 40 and often present in the locations in which wire feeders are utilized from being used to cool the components of the wire feeder 40. By eliminating the use of polluted air to cool the components of the wire feeder 40, the contamination of the interior cavity 300 of the wire feeder 40 and the components of the wire feeder 40 is also minimized, which improves the life of the wire feeder 40. The elimination of air circulation inlets and outlets being disposed on the housing 120 of the wire feeder 40 further serves to prevent water from entering the interior 300 of the wire feeder 40 and damaging the components of the wire feeder 40. Furthermore, by pumping the circulated air through the interstitial space 430 that contains the lower and upper current bars 342, 344, the circulated air passes around the lower and upper current bars 342, 344 and cools the lower and upper current bars 342, 344 via convection.

Figure 8A:
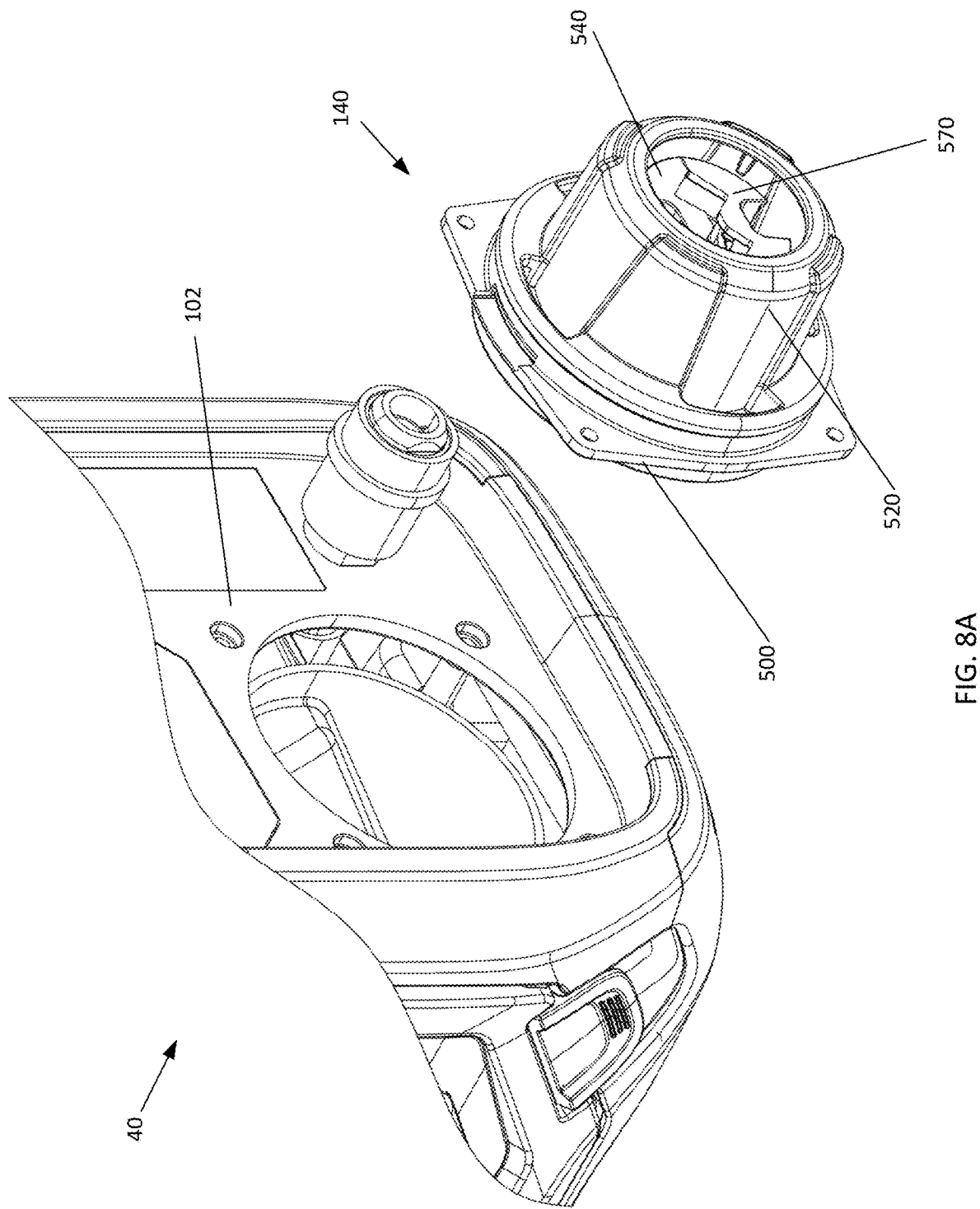
FIG. 8A illustrates a perspective view of the strain relief device in relation to the rear side of the wire feeder illustrated in FIG. 2A.
Figure 8B:
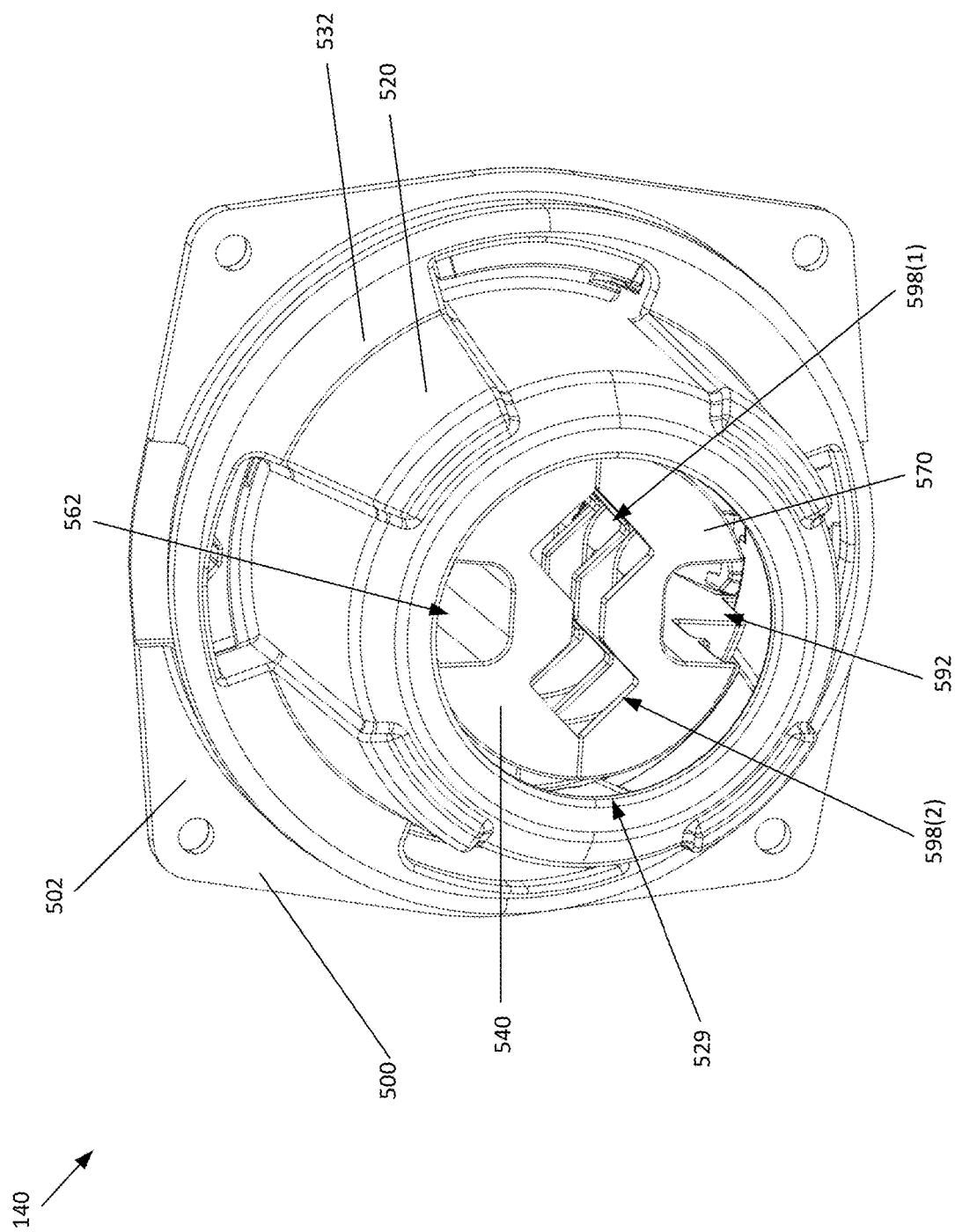
FIG. 8B illustrates a front perspective view of the strain relief device illustrated in FIG. 8A.
Figure 8C:
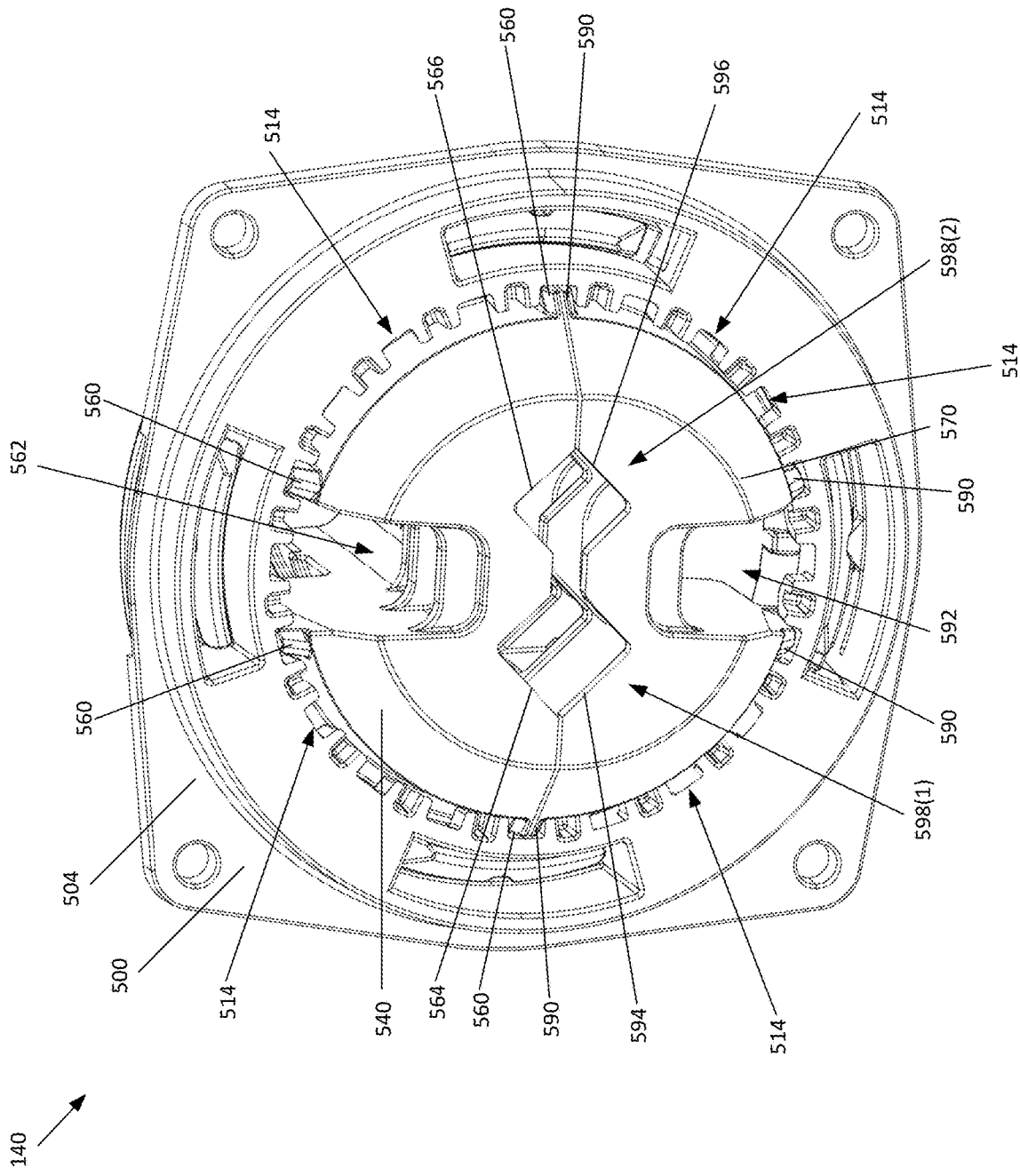
FIG. 8C illustrates a rear perspective view of the strain relief device illustrated in FIG. 8A.
Figure 8D:
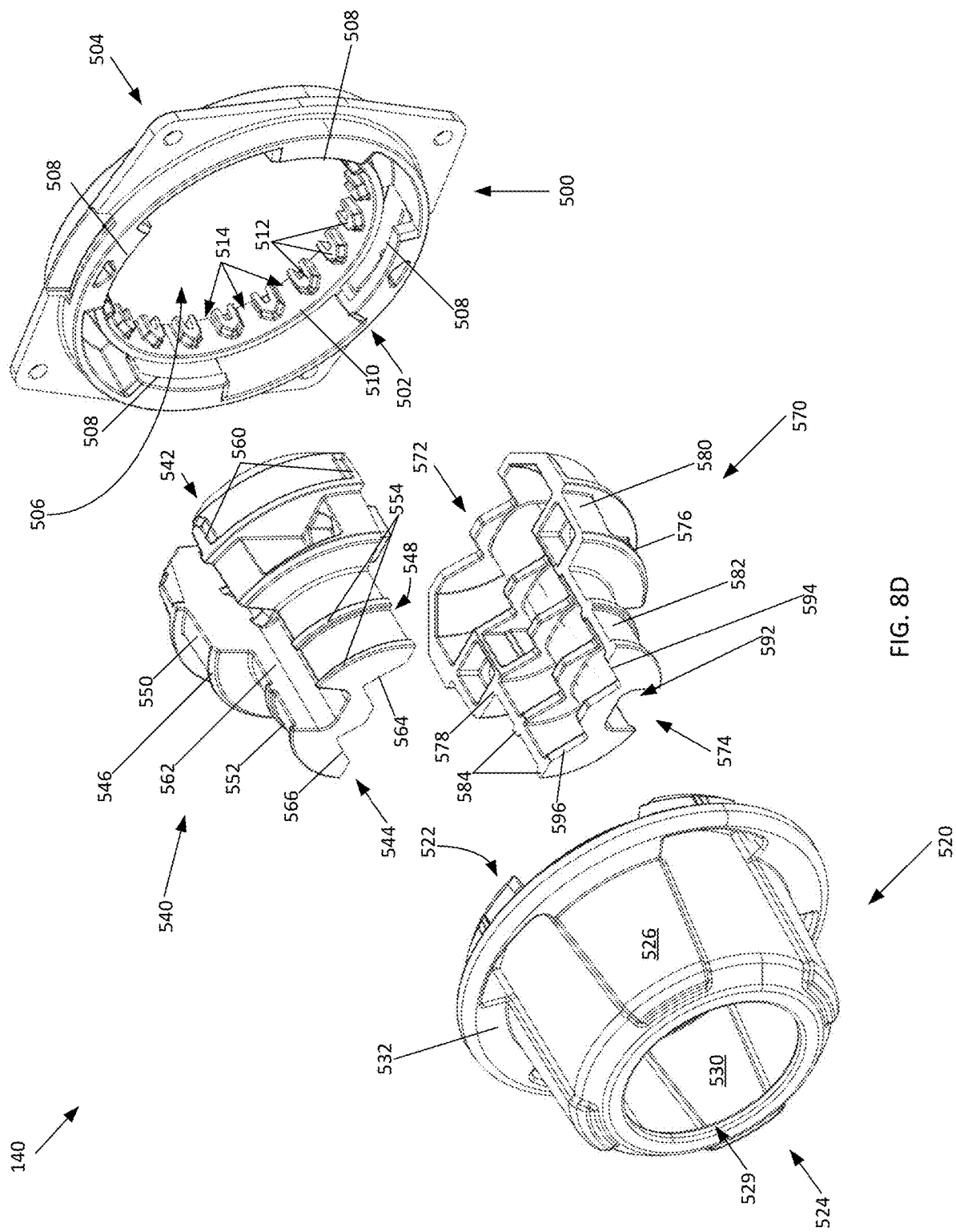
FIG. 8D illustrates an exploded view of the front side of the components of the strain relief device illustrated in FIG. 8A.
Figure 8E:
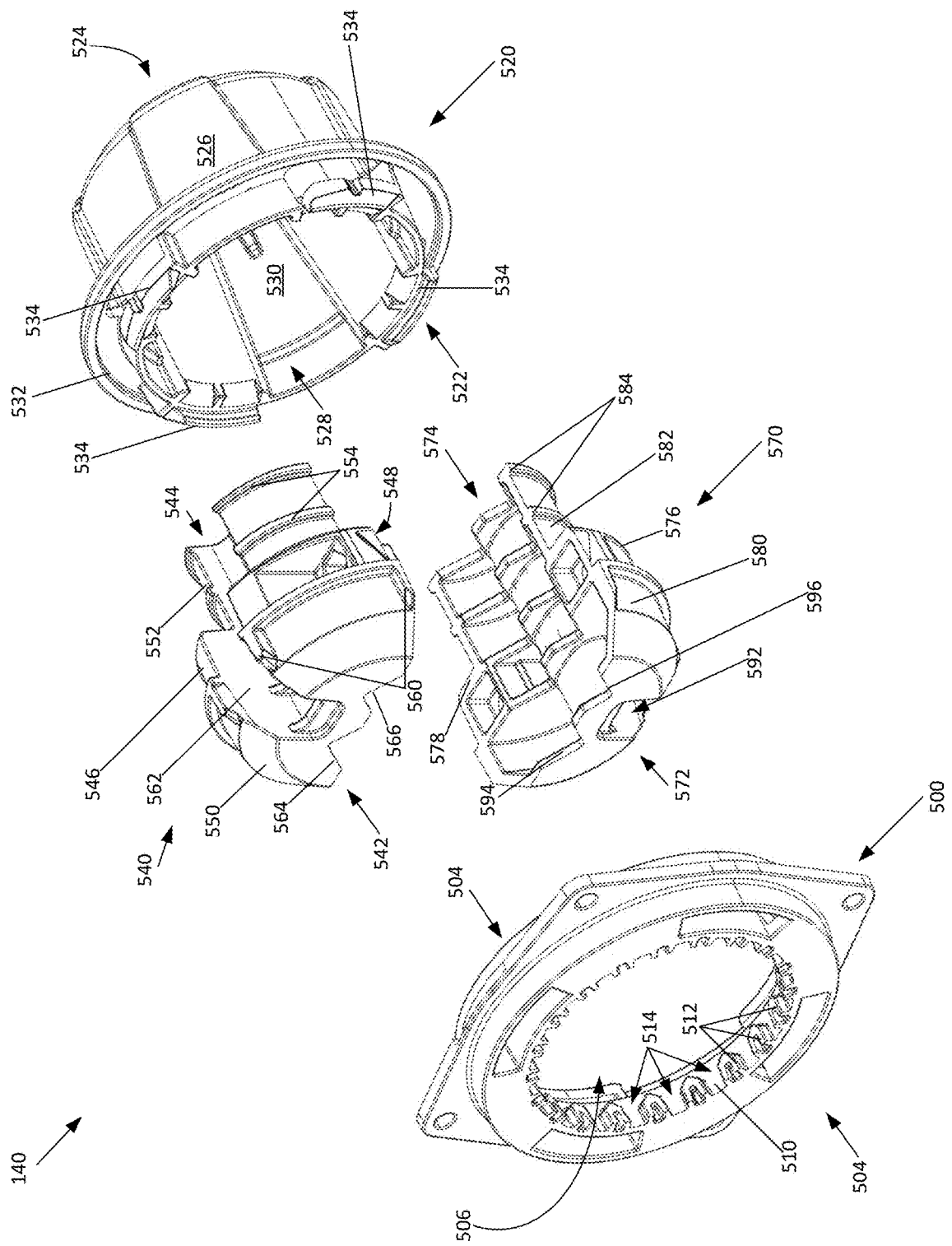
FIG. 8E illustrates an exploded view of the front side of the components of the strain relief device illustrated in FIG. 8A.
Figure 8F:
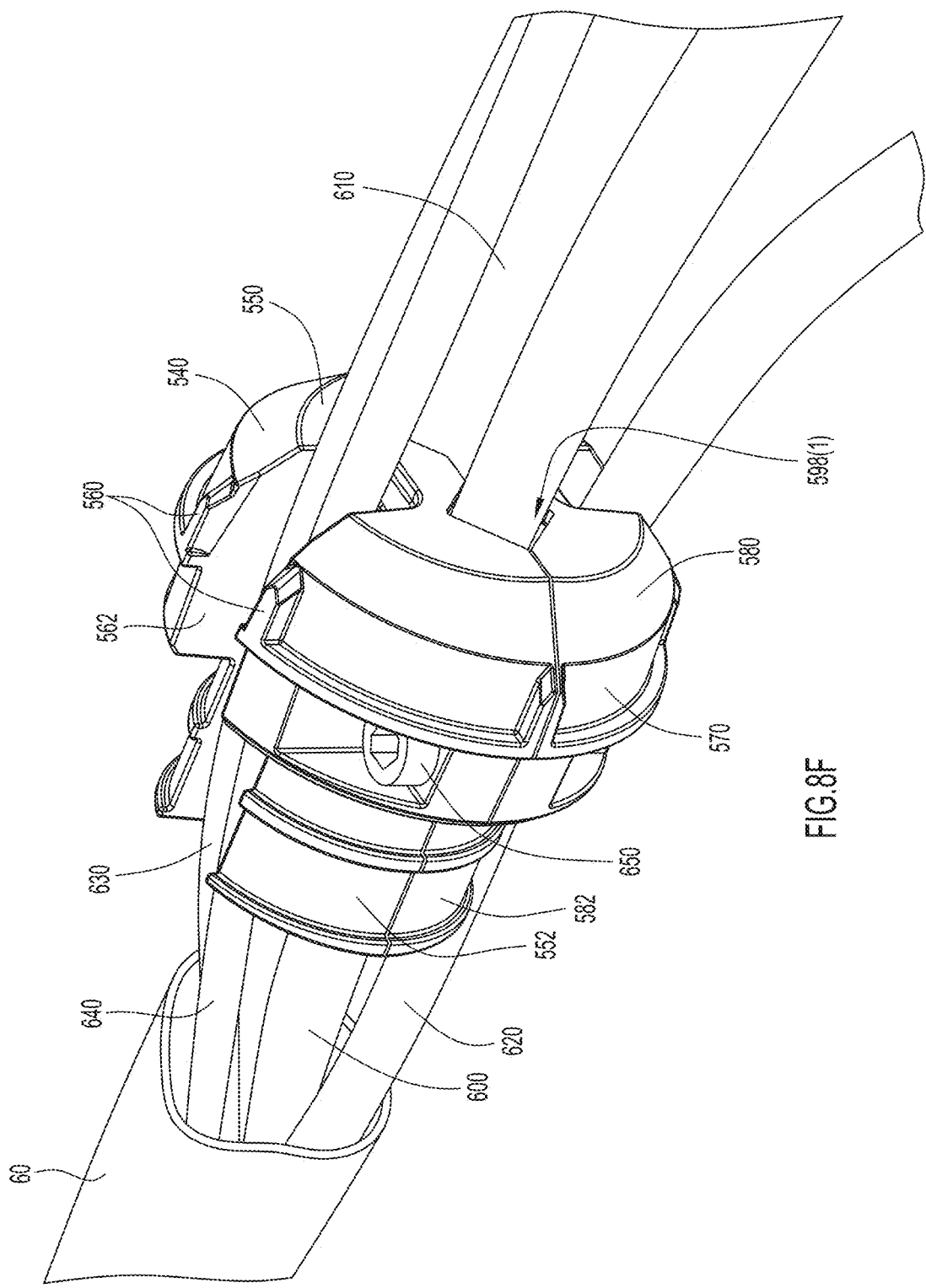
FIG. 8F illustrates a perspective view of the strain relief device illustrated in FIG. 8A being coupled to the interconnection cable.

Turning to FIGS. 8A, 8B, 8C, 8D, 8E, and 8F, illustrated is the strain relief device 140. As previously explained, the strain relief device 140 is disposed on the rear side 102 of the wire feeder 40. The strain relief device 140 extends outwardly from the rear side 102 proximate to the bottom side 106 and the second side 110 of the wire feeder 40. The strain relief device 140 may be configured to relieve the strain placed on the interconnection cable 60, which, as illustrated in FIG. 8F, may be a single cable that internally comprises a weld power cable 600, a communication signal cable 610, a shielding gas cable 620, a cooling water supply cable 630, and cooling water return cable 640.

The strain relief device 140 comprises a housing adapter 500, a locking nut 520, a first inner cable clamp 540, and a second inner cable clamp 570. The housing adapter 500 is configured to be attached or coupled to the rear side 102 of the housing 120 of the wire feeder 40 via a set of fasteners. As best illustrated in FIGS. 8B, 8C, 8D, and 8E, the housing adapter 500 is substantially rectangular with an exterior side 502 and an interior side 504. When coupled to the rear side 102 of the housing 120 of the wire feeder 40, the interior side 504 is disposed against the surface of the rear side 102 of the housing 120 of the wire feeder 40. The housing adapter 500 includes a central opening 506 that extends through the housing adapter 500 from the exterior side 502 to the interior side 504. Disposed in the exterior side 502 of the housing adapter 500 around the central opening 506 is a series of channels 508. In the embodiment illustrated, four channels 508 are equally spaced from one another around the central opening 506. In other embodiments, any number of channels may be disposed around the central opening 506.

As best illustrated in FIG. 8D, the central opening 506 contains an inner surface 510. Disposed on the inner surface 510 of the central opening 506 are a series of protrusions or guide 512 that serve as alignment teeth. The series of protrusions 512 are equally spaced from each other around the inner surface 510 of the central opening 506 such that each pair of adjacent protrusions forms a slot or gap 514. Because the series of protrusions 512 are equally spaced from one another, each of the slots 514 are equal in size (i.e., width).

Continuing with FIGS. 8A, 8B, 8C, 8D, 8E, and 8F, the locking nut 520 is substantially cylindrical and contains a first end 522, an opposite second end 524, and a sidewall 526 that extends from the first end 522 to the second end 524. In some embodiments, the locking nut 520 may be tapered, where the first end 522 has a larger diameter than the second end 524. Disposed in the first end 522 of the locking nut 520 is a first opening 528, while a second opening 529 is disposed in the second end 524 of the locking nut 520. The sidewall 526 may define a conduit 530 that extends from the first opening 528 to the second opening 529. As illustrated, the first opening 528 may have a larger diameter than the second opening 529. The locking nut 520 further includes a flange 532 extending from the sidewall 526 proximate to the first end 522 of the locking nut 520. A set of tabs 534 are disposed on the side of the flange 532 that faces the first end 522 of the locking nut 520. In the embodiment illustrated, the flange 532 contains four tabs 534 that are equally spaced around the flange 532, and thus, around the first opening 528. The four tabs 534 may be sized, shaped, and spaced from one another to be received by the channels 508 disposed on the exterior side 502 of the housing adapter 500.

As previously explained, the strain relief device 140 further includes a first inner cable clamp 540 and a second inner cable clamp 570. The first inner cable clamp 540 may contain a half cylindrical shape with a first end 542 and an opposite second end 544. The first cylindrical cable clamp 540 may also contain an exterior side 546, which may be substantially rounded, and an opposite interior side 548, which may be substantially planar. As further illustrated in FIGS. 8D and 8E, the first inner cable clamp 540 may contain a first portion 550 and a second portion 552, where the first portion 550 has a greater diameter than the second portion 552. The first portion 550 may be disposed proximate to the first end 542 of the first inner cable clamp 540, while the second portion 552 may be disposed proximate to the second end 544 of the first inner cable clamp 540. Disposed on the surface of the exterior side 546 of the first inner cable clamp 540 is a series of protuberances 560. Moreover, these protuberances 560 are disposed on the surface of the exterior side 546 of the first inner cable clamp 540 proximate to the first end 542 of the first inner cable clamp 540. Disposed on the surface of the second portion 552 on the exterior side 546 may be ribs 554. The exterior side 546 of the first inner cable clamp 540 may also contain a central passageway 562 that spans through both the first and second portions 550, 552 between the first end 542 and the second end 544. As further illustrated, the interior side 548 includes two channels 564, 566 that are disposed in the interior side 548 and spanning from the first end 542 to the second end 544 of the first inner cable clamp 540. In some embodiments, the first channel 564 of the interior side 548 may be wider and deeper than the second channel 566 of the interior side 548.

As best illustrated in FIGS. 8D and 8E, the second inner cable clamp 570 is substantially similar to the first inner cable clamp, in that the second inner cable clamp 570 may be a mirror image of the first inner cable clamp 540. Like the first inner cable clamp 540, the second inner cable clamp 570 may contain a half cylindrical shape with a first end 572 and an opposite second end 574. The second cylindrical cable clamp 570 may also contain an exterior side 576, which may be substantially rounded, and an opposite interior side 578, which may be substantially planar. As illustrated, the first inner cable clamp 540 and the second inner cable clamp 570 are configured to abut one another, where the interior side 548 of the first inner cable clamp 540 and the interior side 578 of the second inner cable clamp 570 are in abutment. When the interior sides 548, 578 are in abutment, the exterior side 546 of the first inner cable clamp 540 and the exterior side 576 of the second inner cable clamp 570 collectively form a substantially cylindrical structure.

As further illustrated in FIGS. 8D and 8E, the second inner cable clamp 570 may contain a first portion 580 and a second portion 582, like that of the first inner cable clamp 540, where the first portion 580 has a greater diameter than the second portion 582. The first portion 580 may be disposed proximate to the first end 572 of the second inner cable clamp 570, while the second portion 582 may be disposed proximate to the second end 574 of the second inner cable clamp 570. Disposed on the surface of second portion 582 on the exterior side 546 may be ribs 584. When the first and second inner cable clamps 540, 570 are in abutment with one another, the first portions 550, 580 are aligned with one another, the second portions 552, 582 are aligned with one another, and the ribs 554, 584 are aligned with one another.

Also like the first inner cable clamp 540, disposed on the surface of the exterior side 576 of the second inner cable clamp 570 is a series of protuberances 590 (see FIG. 8C). These protuberances 590 are disposed on the surface of the exterior side 576 of the second inner cable clamp 570 proximate to the first end 572 of the second inner cable clamp 570. The protuberances 590 may be equal in size and shape to the protuberances 560 of the first inner cable clamp 540. The exterior side 576 of the second inner cable clamp 570 may also contain a central passageway 592 that spans through both the first and second portions 580, 582 between the first end 572 and the second end 574.

As further illustrated, the interior side 578 of the second inner cable clamp 570, like that of the first inner cable clamp 540, includes two channels 594, 596 that are disposed in the interior side 578 and span from the first end 572 to the second end 574 of the second inner cable clamp 570. In some embodiments, the first channel 594 of the interior side 578 may be wider and deeper than the second channel 596 of the interior side 578. The first channel 594 of second inner cable clamp 570 the may be equal in width and shape to the first channel 564 of the first inner cable clamp 540, while the second channel 596 of second inner cable clamp 570 the may be equal in width and shape to the second channel 566 of the first inner cable clamp 540. Moreover, when the first and second inner cable clamps 540, 570 are in abutment with one another, the first channel 594 of the second inner cable clamp 570 may be aligned with the first channel 564 of the first inner cable clamp 540 such that the first channels 564, 594 collectively form a first conduit 598(1). In addition, the second channel 596 of the second inner cable clamp 570 may also be aligned with the second channel 566 of the first inner cable clamp 540 such that the second channels 566, 596 collectively form a second conduit 598(2).

Turning to FIG. 8F, the first and second inner cable clamps 540, 570 are configured to be connected to the interconnection cable 60 of the power source 20. Prior to connecting the interconnection cable 60 to the first and second inner cable clamps 540, 570, the end of the interconnection cable 60 may be inserted through the locking nut 520 such that the end of the interconnection cable 60 passes through the second opening 529, the conduit 530, and the first opening 528. Once the locking nut 520 has been slid over the end of the interconnection cable 60, the interconnection cable 60 may be connected to the first and second inner cable clamps 540, 570. As illustrated in FIG. 8F, the interconnection cable 60 may contain a single sheathing that internally comprises a weld power cable 600, a communication signal cable 610, a shielding gas cable 620, a cooling water supply cable 630, and cooling water return cable 640.

Prior to abutting the first and second cable clamps 540, 570 to one another, a portion of the weld power cable 600 that is spaced from the connector of the weld power cable 600 may be seated into the first channel 594 of the second inner cable clamp 570. Similarly, a portion of the communication signal cable 610 that is spaced from the connector of the communication signal cable 610 may be seated into the second channel 596 of the second inner cable clamp 570. When the first inner cable clamp 540 is brought into abutment with the second inner cable clamp 570, the weld power cable 600 is captured within the first conduit 598(1) formed by the first channels 564, 594 of the first and second inner cable clamps 540, 570. Similarly, the communication signal cable 610 may be captured within the second conduit 598(2) formed by the second channels 566, 596 of the first and second inner cable clamps 540, 570. Once the first and second inner cable clamps 540, 570 are placed in abutment with one another, fasteners 650 may be used to secure the first and second inner cable clamps 540, 570 to one another. Moreover, a portion of the shielding gas cable 620 may be seated within the central passageway 592 of the second inner cable clamp 570, while portions of the cooling water supply and return cables 630, 640 may be seated within the central passageway 562 of the first inner cable clamp 540, or vice versa. Once the cables 600, 610, 620, 630, 640 have been properly seated within their respective locations on the first and second inner cable clamps 540, 570, the sheathing of the interconnection cable 60 may be slid over the second portions 552, 582 of the first and second inner cable clamps 540, 570. In some embodiments, the sheathing may be secured to the second portions 552, 582 of the first and second inner cable clamps 540, 570 with cable ties or zip ties. The ribs 554, 584 may serve to lock or retain the cable ties and the sheathing of the interconnection cable 60 onto the second portions 552, 582 by the cable ties being disposed between the ribs 554, 584.

Once the interconnection cable 60, and associated inner cables 600, 610, 620, 630, 640, have been coupled to the first and second inner cable clamps 540, 570, the ends of the inner cables 600, 610, 620, 630, 640 may be inserted through the opening 506 of the housing adapter 500 mounted on the rear side 102 of the wire feeder 40. The ends of the inner cables 600, 610, 620, 630, 640 may then be connected to their respective connectors 352, 354(1), 354(2), 356, 358 of the connector panel 350 disposed within the interior cavity 300 of the wire feeder 40. As best illustrated in FIG. 8C, the first and second inner cable clamps 540, 570 may then be inserted into the opening 506 of the housing adapter 500. As the first and second inner cable clamps 540, 570 are inserted into the opening 506, the protuberances 560, 590 of the first and second inner cable clamps 540, 570, respectively, may be inserted into the slots 514 of the housing adapter 500 that are disposed between the protrusions 512. The protrusions 512 of the housing adapter 500 may be shaped to guide the protuberances 560, 590 of the first and second inner cable clamps 540, 570 into the slots 514. The intermeshing of the protuberances 560, 590 of the first and second inner cable clamps 540, 570 with the slots 514 and protrusions 512 of the housing adapter 500 prevent the first and second inner cable clamps 540, 570, and thus, the inner cables 600, 610, 620, 630, 640, from being rotated with respect to the housing adapter 500 and the wire feeder 40 itself.

Once the first and second inner cable clamps 540, 570 have been inserted into the opening 506 of the housing adapter 500, the locking nut may be removably coupled to the exterior side 502 of the housing adapter 500 to secure the first and second inner cable clamps 540, 570 to the housing adapter 500 and within the conduit 530 of the locking nut 520. As previously explained, the tabs 534 of the locking nut 520 are configured to be received by the channels 508 of the housing adapter 500. The first end 522 and the flange 532 of the locking nut 520 may be brought into abutment with the exterior side 502 of the housing adapter 500 with the tabs 534 of the locking nut 520 being offset or misaligned with the channels 508 of the housing adapter 500. Once in abutment with one another, the locking nut 520 may be rotated in a first direction to slide the tabs 534 of the locking nut 520 into the channels 508 of the housing adapter 500, which secures the locking nut 520 to the housing adapter 500. In some embodiments, the channels 508 may contain a protrusion that is configured to be received by a recess in the tabs 534 when the tabs 534 of the locking nut 520 are slid far enough into the channels 508. This enables the locking nut 520 to further secure the locking nut 520 to the housing adapter 500 while also providing haptic feedback indicating to the operator of the welding device 40 when the locking nut 520 is successfully secured to the housing adapter 500. When the locking nut 520 is secured to the housing adapter 500, the first and second inner cable clamps 540, 570 are captured between the housing adapter 500 and the second end 524 of the locking nut 520, as the second opening 529 is smaller in diameter than that of the combination of the second ends 544, 574 of the first and second inner cable clamps 540, 570.

Because the strain relief device 140 as described and illustrated in FIGS. 8A, 8B, 8C, 8D, 8E, and 8F clamps to at least some of the inner cables 600, 610, 620, 630, 640 of the interconnection cable 60 proximate to the ends or connectors of the inner cables 600, 610, 620, 630, 640, the strain relief device 140 retains the connectors of the inner cables 600, 610, 620, 630, 640 in a spaced relationship with the strain relief device. Thus, by clamping at least some of the inner cables 600, 610, 620, 630, 640 and the sheathing of the interconnection cable 60 to the strain relief device 140, and then coupling the strain relief device 140 to the rear side 102 of the housing 120 of the wire feeder 40, strain is relieved at the connection of the inner cables 600, 610, 620, 630, 640 with their relative connectors 352, 354(1), 354(2), 356, 358. The strain relief device 140 as described above prevents movement imparted onto the interconnection cable 60 (i.e., resulting from movement of the interconnection cable 60 itself, movement of the wire feeder 40, movement of the power source 20, etc.) from pulling and straining the connection of the inner cables 600, 610, 620, 630, 640 with their relative connectors 352, 354(1), 354(2), 356, 358. Thus, the strain relief device 140 prevents inadvertent damage to the connectors 352, 354(1), 354(2), 356, 358 and/or disconnection of the inner cables 600, 610, 620, 630, 640 from their relative connectors 352, 354(1), 354(2), 356, 358 when the interconnection cable 60 is moved with respect to the wire feeder 40.

Figure 9A:
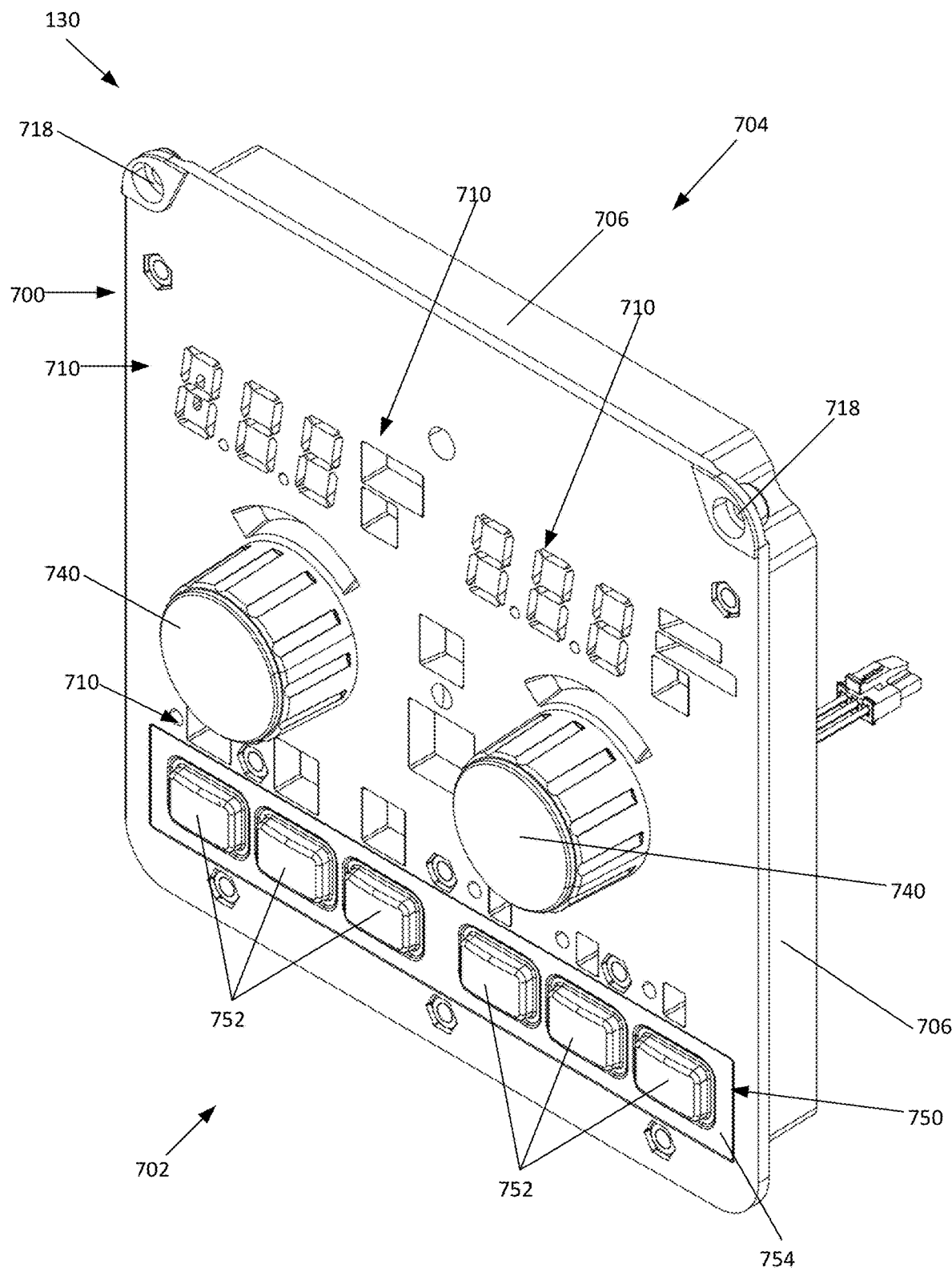
FIG. 9A illustrates a perspective view of the control panel of the front side of the wire feeder illustrated in FIG. 2A.
Figure 9B:
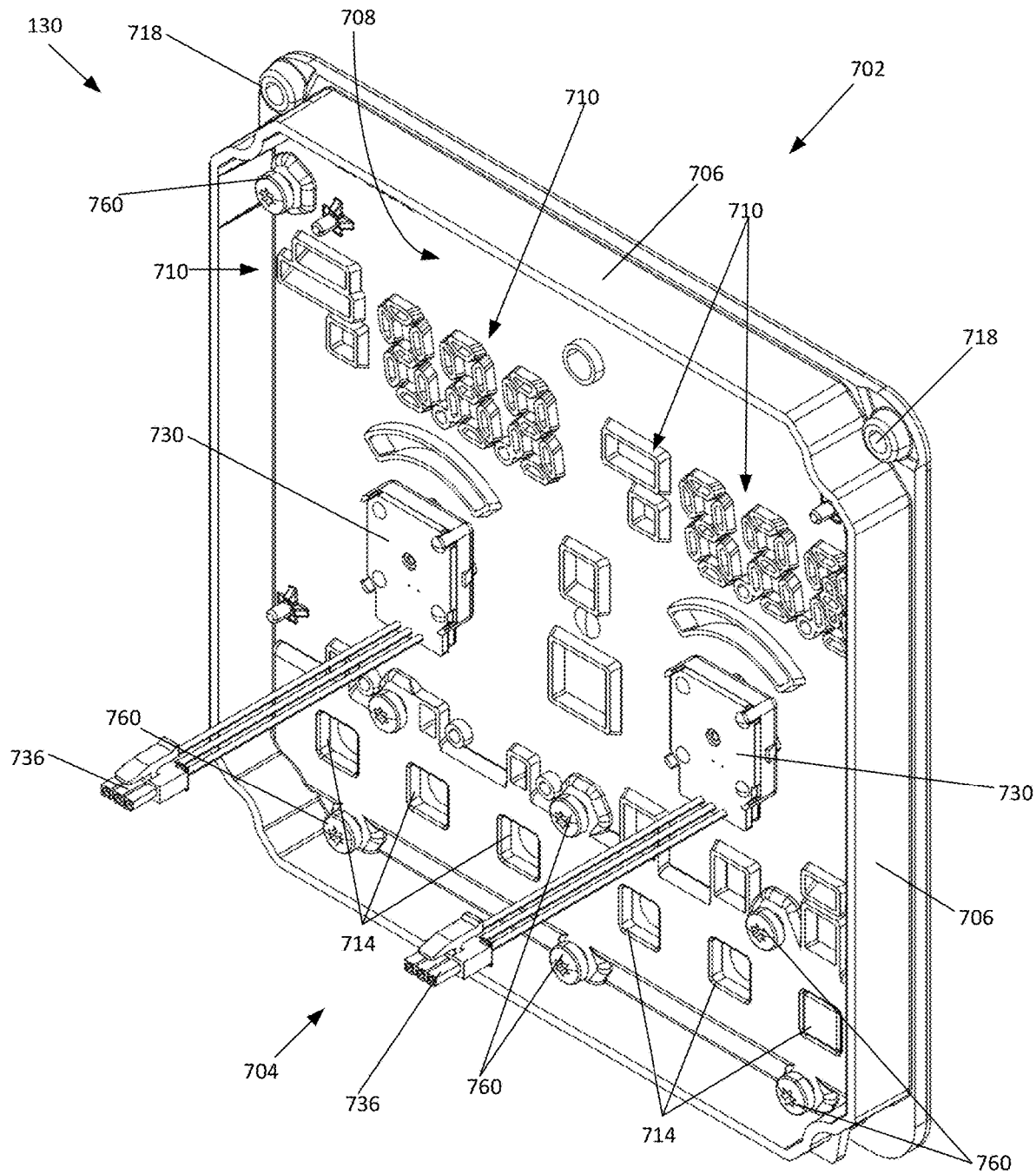
FIG. 9B illustrates rear perspective view of the substrate member of the control panel illustrated in FIG. 9A.
Figure 9C:
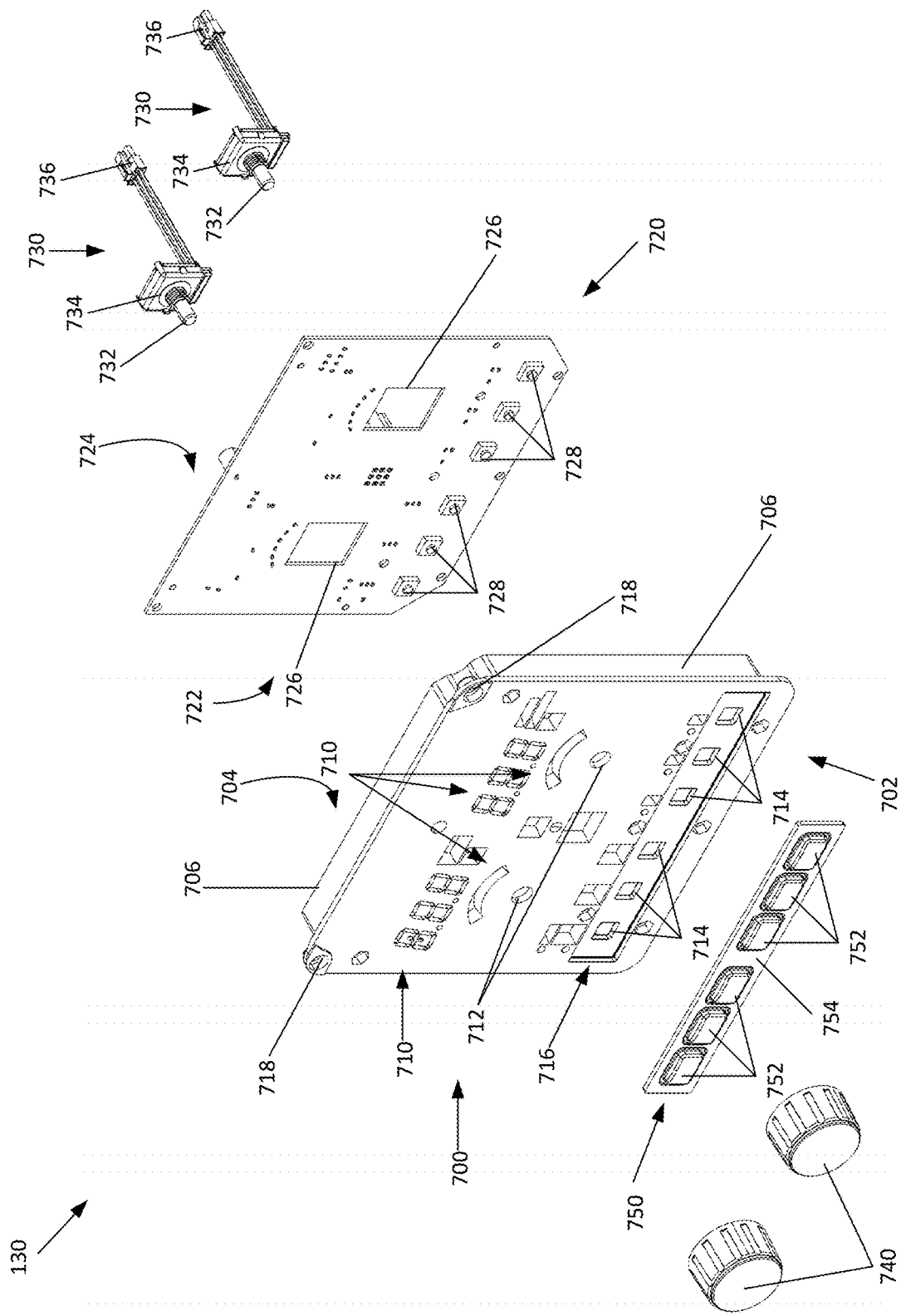
FIG. 9C illustrates an exploded view of the components of the control panel illustrated in FIG. 9A.

Turning to FIGS. 9A, 9B, and 9C, illustrated is an embodiment of the control panel 130 of the wire feeder 40. As previously explained, the control panel 130 may be mounted on the front side 100 of the housing 120 of the wire feeder 40. As best illustrated in the exploded view of FIG. 9C, the control panel 130 is constructed from an outer substrate member 700, a rigid printed circuit board (PCB) 720, a pair of encoders 730, a set of dials 740, and a series of buttons 750. As best illustrated in FIGS. 9A and 9B, the substrate member 700 is substantially rectangular with an exterior side 702 and an opposite interior side 704. The substrate member 700 may be constructed of variety of materials including, but not limited to, thermoplastic polymers. As illustrated in FIG. 9B, the substrate member 700 includes a plurality of sidewalls 706 that extend from the interior side 704, where the plurality of sidewalls 706 define a cavity 708.

Turning to FIG. 9C, a plurality of openings 710, 712, 714 are disposed along the substrate member 700 such that the plurality of openings 710, 712, 714 extend through the substrate member 700 between the exterior side 702 and the interior side 704. The first set of openings are display openings 710, where the openings may be oriented in specific positions on the substrate member 700 to display numerical values, error codes, warnings, etc., as further detailed below. The dial openings 712 are disposed on the substrate member 700 and configured to receive a portion of the encoders 730 that are connected to the interior side 704 of the substrate member 700 such that a shaft portion 732 of the encoders 730 extends through the dial openings 712 to the exterior side 702 of the substrate member 700. The dials 740 may be coupled to the shaft portion 732 of the encoders 730 on the exterior side 702 of the substrate member 700. The button openings 714 may be disposed in a lateral arrangement across the substrate member 700, where the button openings 714 are oriented in an elongated depression or recess 716 in surface of the exterior side 702 of the substrate member 700. As further illustrated, the substrate member 700 also includes a set of attachment openings 718 disposed proximate to the upper corners of the substrate member 700. As further detailed below, these attachment openings 718 may be used to secure the control panel 130 to the housing 120 of the wire feeder 40.

As best illustrated in FIG. 9C, the rigid PCB 720 includes a first side 722 and an opposite second side 724. Like the substrate member 700, the rigid PCB 720 is substantially rectangular, and may be sized to fit within the cavity 708 of the substrate member 700. When disposed within the cavity 708, the first side 722 of the rigid PCB 720 is disposed against the interior side 704 of the substrate member 700. The rigid PCB 720 may be secured to the interior side 704 of the substrate member 700 via a set of fasteners 760 (e.g., screws), which are illustrated in FIG. 9B. Returning to FIG. 9C, the rigid PCB 720 further includes a pair of centralized openings 726 and a series of push button switches 728. The centralized openings 726 are positioned on the rigid PCB 720 such that, when the rigid PCB is secured to the interior side 704 of the substrate member 700, the centralized openings 726 are aligned with the dial openings 712 of the substrate member 700. The centralized openings 726 are sized to at least partially receive the base 734 of the encoders 730 when both the rigid PCB 720 and the encoders 730 are secured to the interior side 704 of the substrate member 700. FIG. 9C further illustrates that the series of button switches 728 of the rigid PCB 720 are disposed on the first side 722 of the rigid PCB 720 in a horizontal arrangement. The button switches 728 are sized to fit within the button openings 714 of the substrate member 700 such that the button switches 728 may at least partially extend from the button openings 714 of the substrate member 700. While not illustrated, the rigid PCB 720 may be further equipped with LED lights that are disposed on the first side 722 of the rigid PCB 720. The LED lights may be aligned with the display openings 710 when the rigid PCB 720 is secured within the cavity 708 to the interior side 704 of the substrate member 700. Thus, the LED lights may be configured to illuminate through the display openings 710 to display numerical values, error codes, warnings, etc. For example, the display openings 710 and the LED lights may be arranged such that a set number of LED lights may be illuminated with respect to the display openings 710 to display a numerical values of a welding operating parameters.

As illustrated in FIG. 9B, the encoders 730 are mounted to the interior side 704 of the substrate member 700 and within the cavity 708. More specifically, the base 734 of each of the encoders 730 is coupled to the interior side 704 of the substrate member 700 proximate to a dial opening 712, where the rotational shaft 732 of the encoder 730 extends through the dial opening 712 to extend perpendicular from the surface of the exterior side 702 of the substrate member 700. The rotational shaft 732 is configured to be received by, and coupled to, a dial 740. The encoders 730 further includes a connector 736 that extends rearwardly from the base 734. The connectors 736 of the encoders 730 may be connected to the rigid PCB 720. The encoders 730 may be configured to translate the rotational position of the dials 740 and the rotational shafts 732 into a control command or input for the wire feeder 40.

As illustrated in FIG. 9C, a set of buttons 750 may be coupled to the exterior side 702 of the substrate member 700. More specifically, the set of buttons 750 are a series of raised actuators 752 disposed on a rectangular base 754. The rectangular base 754 may be sized to fit within the recess 716 in the exterior side 702 of the substrate member 700, while the actuators 752 align with the button openings 714, and ultimately the switches 728 of the rigid PCB 720 disposed within the button openings 714. The set of buttons 750 may be constructed from a resilient and flexible material (e.g., rubber), such that depression of one of the actuators 752 actuates its corresponding switch 728 of the rigid PCB 720.

Figure 9D:
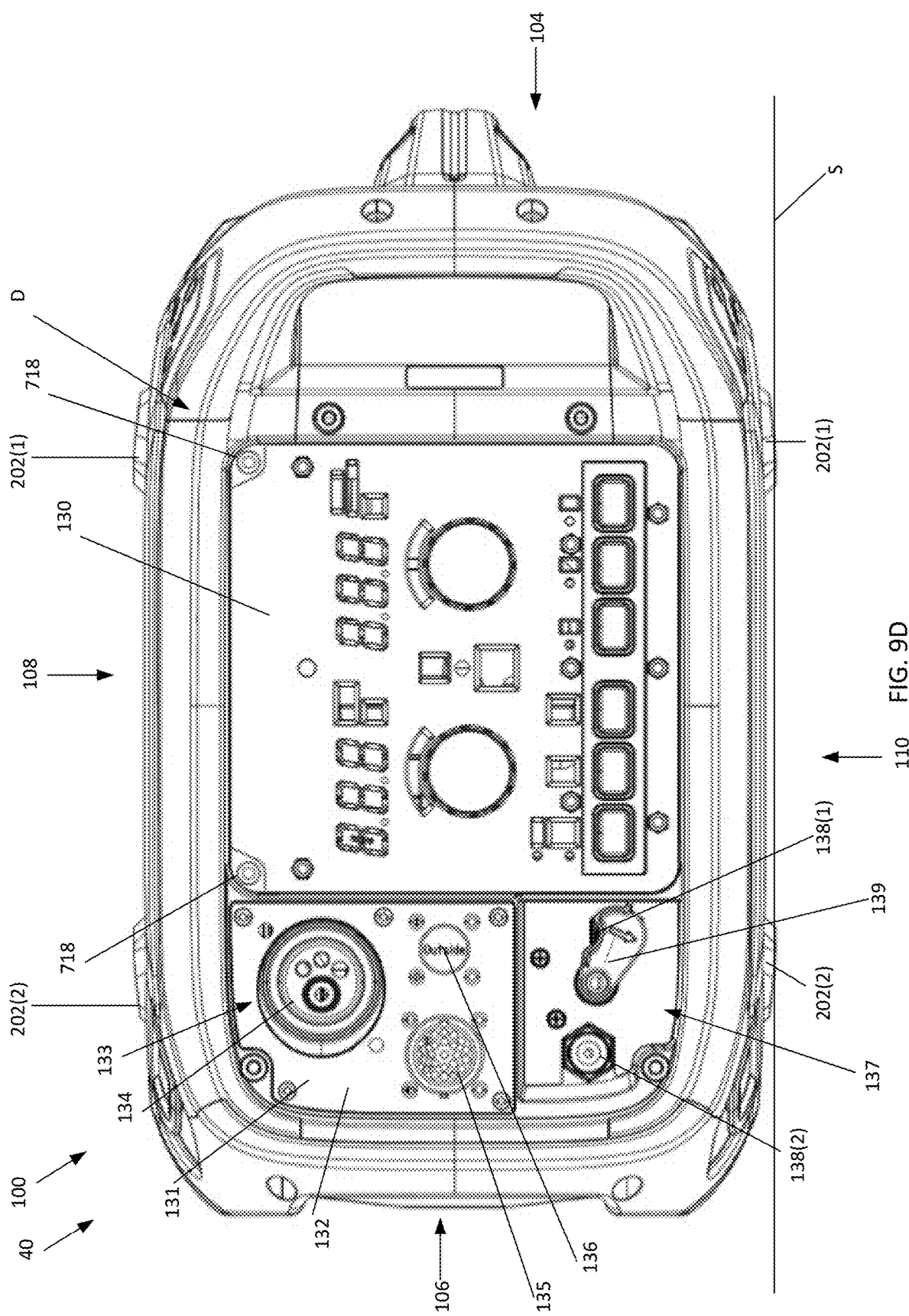
FIG. 9D illustrates the control panel illustrated in FIG. 9A being mounted on the front side of the wire feeder illustrated in FIG. 2A in different configuration.

As illustrated in FIGS. 3A and 9D, the control panel 130 may be mounted on the front side 100 of the housing 120 of the wire feeder 40 in multiple orientations. In FIG. 3A, the wire feeder 40 is oriented in an upright position, where the bottom side 106 of the wire feeder 40 is disposed on a support surface. In this wire feeder orientation, the control panel 130 is mounted in a first configuration C, where the attachment openings 718 are disposed more proximate to the top side 104 than the bottom side 106 of the wire feeder 40. However, as previously explained, the wire feeder 40 may be utilized in a horizontal orientation, where the first side 108 or the second side 110 of the wire feeder 40 serve as the bottom of the wire feeder 40. In this orientation, the control panel 130 may be dismounted from the wire feeder 40, rotated 90 degrees either clockwise (when the first side 108 serves as the bottom of the wire feeder 40) or counter clockwise (when the second side 110 serves as the bottom of the wire feeder 40) and then remounted in this second configuration D. In the second configuration D, both attachment openings 718 are disposed proximate to the second side 110 (when the first side 108 serves as the bottom of the wire feeder 40) or the first side 108 (when the second side 110 serves as the bottom of the wire feeder 40).

While not illustrated in FIGS. 9A, 9B, and 9C, some embodiments of the control panel 130 may contain a substantially planar and translucent panel disposed against the exterior side 702 of the substrate member 700.

Figure 10B:
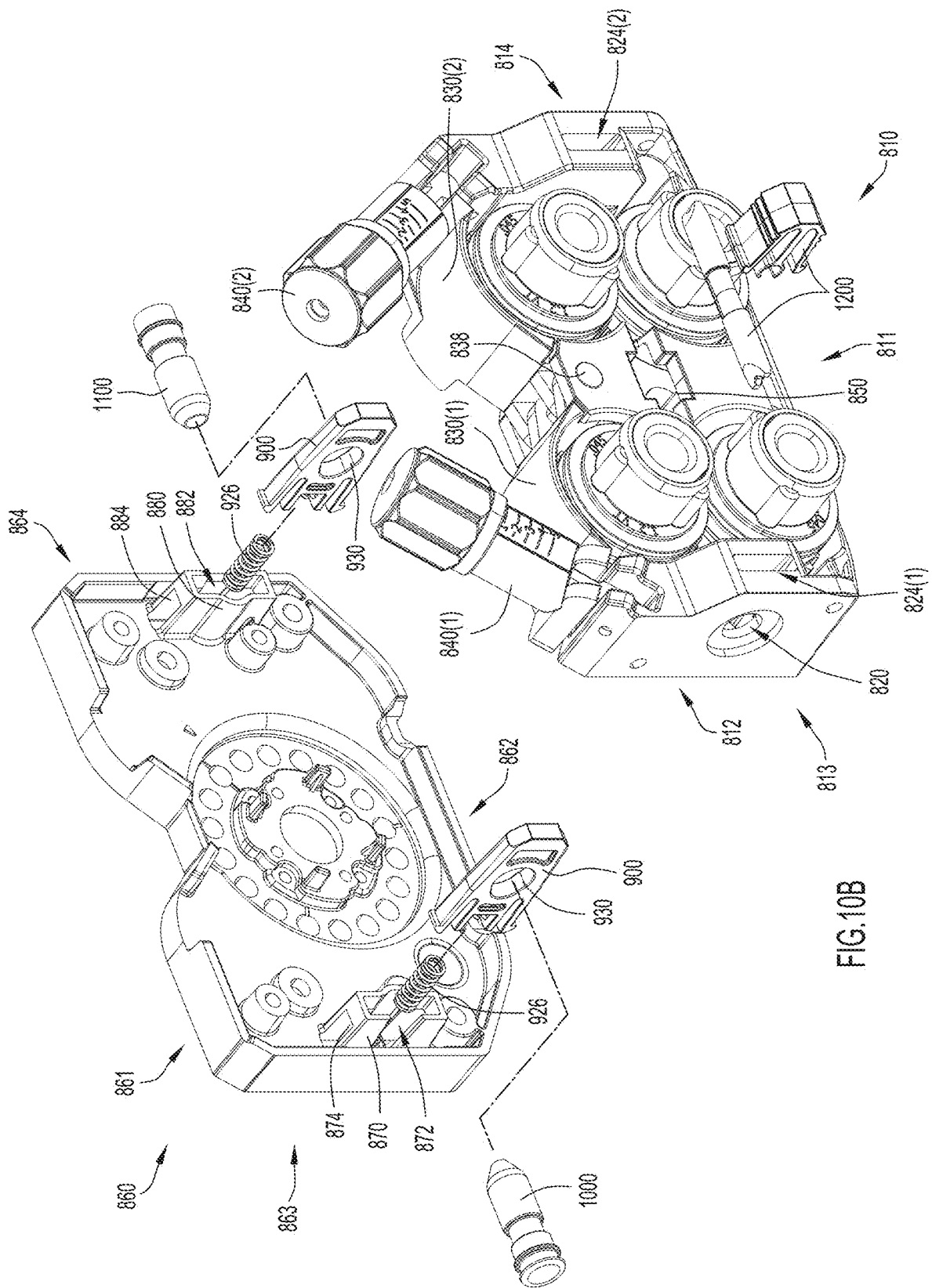
FIG. 10B illustrates an exploded view of the front side of the wire feeder mechanism illustrated in FIG. 10A.
Figure 10C:
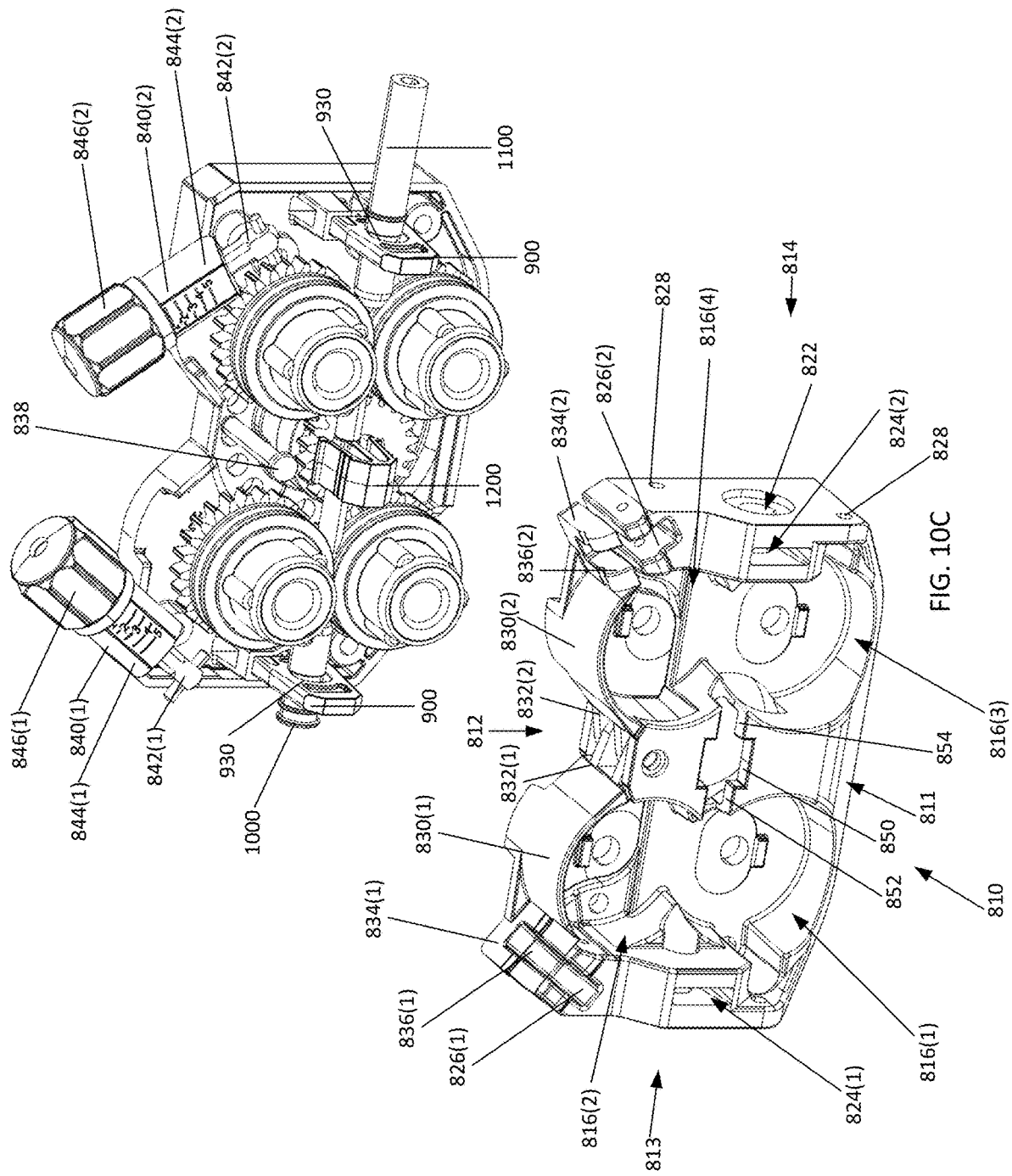
FIG. 10C illustrates a perspective view of the front side of the wire feeder mechanism illustrated in FIG. 10A where the first housing portion of the wire feeder mechanism is spaced from the second housing portion of the wire feeder mechanism.

Turning to FIGS. 10A, 10B, and 10C, illustrated is the wire feeder mechanism 310 of the wire feeder 40. The wire feeder mechanism 310 includes a front side 800, a rear side 802 opposite the front side 800, an inlet side 804 spanning between the front side 800 and the rear side 802, and an outlet side 806 opposite the inlet side 804. The wire feeder mechanism 310 also includes a top side 808, which spans between the front and rear sides 800, 802, and the inlet and outlet sides 804, 806, and a bottom side 809 opposite the top side 808. The wire feeder mechanism 310 is constructed of a first housing portion 810, a second housing portion 860, a drive motor 312, and a gearbox 314 (see FIG. 7C). The first housing portion 810 may be disposed on the front side 800 of the wire feeder mechanism 310, while the second housing portion 860 may be disposed on the rear side 802 of the wire feeder mechanism 310. Moreover, the drive motor 312 may be coupled to the gearbox 314, which may be coupled to the second housing portion 860 on the rear side 802 of the wire feeder mechanism 310. As previously explained, the wire feeder mechanism 310 is configured to receive welding wire from the spool 320 and propel the welding wire along the torch cable 62 to the welding torch 50 in order to enable the welding torch 50 to perform a welding operation.

As best illustrated in FIG. 10C, the first housing portion 810 includes an exterior side 811, which primarily forms the front side 800 of the wire feeder mechanism 310, an interior side 812, which couples to the second housing portion 860, a first side 813, which forms a section of the inlet side 804 of the wire feeder mechanism 310, and a second side 814, which forms a section of the outlet side 806 of the wire feeder mechanism 310.

Disposed on the exterior side 811 of the first housing portion 810 are four drive wheel openings 816(1), 816(2), 816(3), 816(4). A first pair of drive wheel openings 816(1), 816(2) is disposed on the first housing portion 810 proximate the first side 813, and a second pair of drive wheel openings 816(3), 816(4) is disposed on the first housing portion 810 proximate the second side 814. The first pair of drive wheel openings 816(1), 816(2) may be oriented with respect to one another such that the second drive wheel opening 816(2) is stacked vertically above the first drive wheel opening 816(1). The first and second drive wheels openings 816(1), 816(2) may be in fluid communication with one another, and in fluid communication with the inlet 820 (see FIG. 10B). Similarly, the second pair of drive wheel openings 816(3), 816(4) may be oriented with respect to one another such that the fourth drive wheel opening 816(4) is stacked vertically above the third drive wheel opening 816(3). The third and fourth drive wheels openings 816(3), 816(4) may also be in fluid communication with one another, and in fluid communication with the outlet 822. As illustrated in FIGS. 10A, 10B, and 10C, an inlet 820 is disposed on the first housing portion 810 on the first side 813, while an outlet 822 is disposed on the first housing portion 810 on the second side 814. Also disposed on the second side 814 of the first housing portion 810 are fastener openings 828.

Disposed within the drive wheel openings 816(1), 816(2), 816(3), 816(4) are drive wheels 818(1), 818(2), 818(2), 818(3), 818(4) (see FIG. 10A). The first drive wheel pair 818(1), 818(2) may be disposed within the first pair of drive wheel openings 816(1), 816(2), while the second drive wheel pair 818(3), 818(4) may be disposed within the second pair of drive wheel openings 816(3), 816(4). The drive wheels 818(1), 818(2), 818(2), 818(3), 818(4) may be driven to rotate by the drive motor 312, the gearbox 314, and a series of gears operatively coupled to the drive wheels 818(1), 818(2), 818(3), 818(4) and the gearbox 314. The first drive wheel 818(1) of the first drive wheel pair may be configured to rotate about a first direction, while the second drive wheel 818(2) of the first drive wheel pair may be configured to rotate about a second direction that is opposite of the first direction. More specifically, the first drive wheel 818(1) may be rotated in a clockwise direction, while the second drive wheel 818(2) may be configured to rotate in a counterclockwise direction. Similarly, the third and fourth drive wheels 818(3), 818(4) of the second drive wheel pair are configured to rotate in opposite directions to one another. The third drive wheel 818(3) may be rotated in a clockwise direction, while the fourth drive wheel 818(4) may be configured to rotate in a counterclockwise direction. This counter rotation of the first pair of drive wheels 818(1), 818(2) acts on a welding wire disposed between the first pair of drive wheels 818(1), 818(2) to propel the welding wire toward the second pair of drive wheels 818(3), 818(4). Similarly, the counter rotation of the second pair of drive wheels 818(3), 818(4) acts on a welding wire disposed between the second pair of drive wheels 818(3), 818(4) to propel the welding wire out of the outlet 822.

The first housing portion 810 also includes a pair of actuator openings 824(1), 824(2). The first actuator opening 824(1) is disposed between the first side 813 and the first pair of drive wheel openings 816(1), 816(2), where the first actuator opening 824(1) extends through the first housing portion 810 between the exterior side 811 and the interior side 812. The first actuator opening 824(1) may be in fluid communication with the inlet 820. The second actuator opening 824(2) is disposed between the second side 814 and the second pair of drive wheel openings 816(3), 816(4), and, like the first actuator opening 824(1), extends through the first housing portion 810 between the exterior side 811 and the interior side 812. The second actuator opening 824(2) may be in fluid communication with the outlet 822. A central aperture 850 is disposed in the exterior side 811 of the first housing portion 810 between the first pair of drive wheel openings 816(1), 816(2) and the second pair of drive wheel openings 816(3), 816(4). The central aperture 850 includes a first passageway 852, which extends from the central aperture 850 toward the first side 813 and to the first pair of drive wheel openings 816(1), 816(2), and a second passageway 854, which extends from the central aperture 850 toward the second side 814 and to the second pair of drive wheel openings 816(3), 816(4). Thus, the central aperture 850 is in fluid communication with the first and second drive wheel openings 816(1) 816(2) via the first passageway 852 and is in fluid communication with the third and fourth drive wheel openings 816(3), 816(4) via the second passageway 854.

Also disposed in the first housing portion 810 is a pair of tensioner slots 826(1), 826(2). The first tensioner slot 826(1) extends into the exterior side 811 of the first housing portion 810 proximate to the first side 813 and vertically spaced above the first actuator opening 824(1). The second tensioner slot 826(2) extends into the exterior side 811 of the first housing portion 810 proximate to the second side 814 and vertically spaced above the second actuator opening 824(2).

The top side of the first housing portion 810 may be formed from a pair clamp arms 830(1), 830(2) that are rotatably coupled to the same axle 838. The axle 838 may be disposed equidistance from the first side 813 and the second side 814 of the first housing portion 810. The first ends 832(1), 832(2) may be coupled to the axle 838. The second end 834(1) of the first clamp arm 830(1) may be disposed proximate to the first side 813 of the first housing portion 810, while the second end 834(2) of the second clamp arm 830(2) may be disposed proximate to the second side 814 of the first housing portion 810. As further illustrated, the second ends 834(1), 834(2), of the clamp arms 830(1), 830(2), respectively, include slots 836(1), 836(2), respectively. The slots 836(1), 836(2) of the clamp arms 830(1), 830(2) may be substantially aligned with the tensioner slots 826(1), 826(2).

The wire feeder mechanism 310 further includes a pair of tensioners 840(1), 840(2) disposed on the first housing portion 810. Both tensioners 840(1), 840(2) include an elongated member 842, a force imparting portion 844, and a dial portion 846. The first tensioner 840(1) is rotatably coupled to the first tensioner slot 826(1) with the elongated member 842(1) being at least partially disposed within the first tensioner slot 826(1), while the second tensioner 840(2) is rotatably coupled to the second tensioner slot 826(2) with the elongated member 842(2) being at least partially disposed within the second tensioner slot 826(2). When the first tensioner 840(1) is in the closed position, as illustrated, the elongated member 842(1) of the first tensioner 840(1) is at least partially disposed within the slot 836(1) of the first clamp arm 830(1) while the force imparting member 844(1) is in abutment with the second end 834(1) of the first clamp arm 830(1). Similarly, when the second tensioner 840(2) is in the closed position, the elongated member 842(2) of the second tensioner 840(2) is at least partially disposed within the slot 836(2) of the second clamp arm 830(2) while the force imparting member 844(2) is in abutment with the second end 834(2) of the second clamp arm 830(2). The tensioners 840(1), 840(2) may be rotated about the ends of the elongated members 842(1), 842(2) to open positions (not illustrated), where the elongated members 842(1), 842(2) are no longer disposed within the slots 836(1), 836(20 of the clamp arms 830(1), 830(2), respectively.

The dial portions 844(1), 844(2) of the tensioners 840(1), 840(2) may be rotated to cause the force imparting member 842(1), 842(2) to either increase or decrease the amount of force applied to the second ends 834(1), 834(2) of the clamp arms 830(1), 830(2), respectively. Increasing the force applied to the second end 834(1) of the first clamp arm 830(1) rotates the second drive wheel 818(2) closer to the first drive wheel 818(1), which increases a clamping force applied by the two drive wheels 818(1), 818(2) on a welding wire disposed between the two drive wheels 818(1), 818(2). Similarly, increasing the force applied to the second end 834(2) of the second clamp arm 830(2) rotates the fourth drive wheel 818(4) closer to the third drive wheel 818(3), which increases a clamping force applied by the two drive wheels 818(3), 818(4) on a welding wire disposed between the two drive wheels 818(3), 818(4). This positioning of the second drive wheel 818(2) with respect to the first drive wheel 818(1), and the fourth drive wheel 818(4) with respect to the third drive wheel 818(4) enables a user to adjust the spacing between the drive wheels 818(1), 818(2), 818(3), 818(4) based on the gauge of the welding wire and the amount of wear on the drive wheels 818(1), 818(2), 818(3), and 818(4).

As best illustrated in FIG. 10B, the second housing portion 860 includes an exterior side 861, which primarily forms the rear side 802 of the wire feeder mechanism 310, an interior side 862, which couples to the interior side 812 of the first housing portion 810, a first side 863, which collectively forms the inlet side 804 of the wire feeder mechanism 310 with the first side 813 of the first housing portion 810, and a second side 864, which collectively forms the outlet side 806 of the wire feeder mechanism 310 with the second side 814 of the first housing portion 810.

The interior side 862 of the second housing portion 860 includes an inlet actuator channel 870 and an outlet actuator channel 880. The inlet actuator channel 870 may be disposed on the interior side 862 of the second housing portion 860 proximate to the first side 863 of the second housing portion 860, while the outlet actuator channel 880 may be disposed on the interior side 862 of the second housing portion 860 proximate to the second side 864 of the second housing portion 860. Moreover, when the first and second housing portions 810, 860 are coupled to one another, the inlet actuator channel 870 may be aligned with the first actuator opening 824(1), while the outlet actuator channel 880 may be aligned with the second actuator opening 824(2). The inlet actuator channel 870 may include a central passage 872 and a pair of slots 874 disposed on the upper and lower sides of the inlet actuator channel 870. Similar to the inlet actuator channel 870, the outlet actuator channel 880 may include a central passage 882 and a pair of slots 884 disposed on the upper and lower sides of the outlet actuator channel 880. These channels 870, 880, along with the first and second actuator openings 824(1), 824(2), are configured to receive sliding actuators 900.

Figure 11:
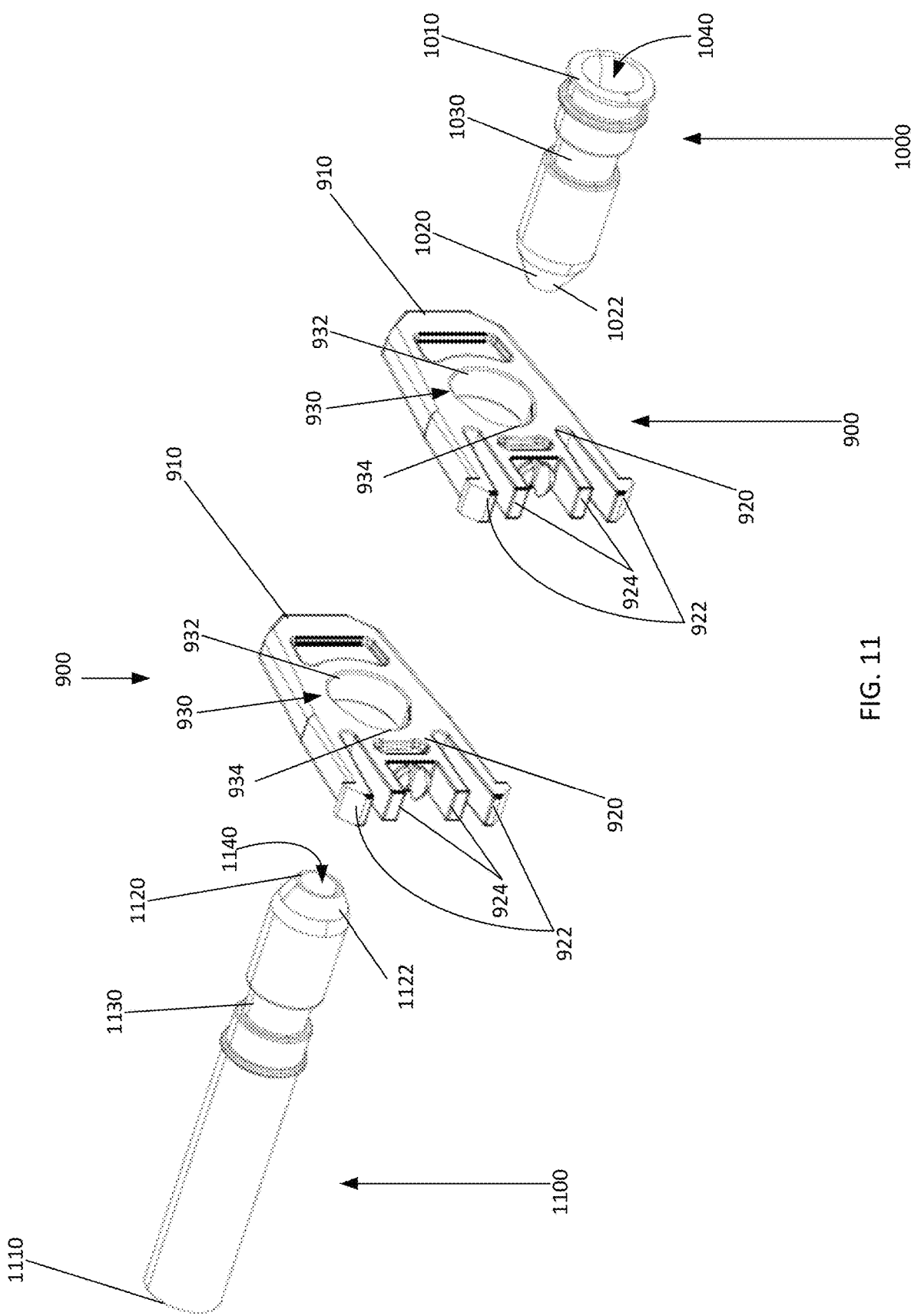
FIG. 11 illustrates a perspective view of the sliding actuators and the inlet and outlet guides of the wire feeder mechanism illustrated in FIG. 10A.

As best illustrated in FIGS. 10A, 10B and 11, the sliding actuators 900 contain a first end 910 and an opposite second end 920. The sliding actuators 900 may be slidingly captured within the inlet and outlet actuator channels 870, 880 and configured to slide between an unactuated position and an actuated position. The sliding actuators 900 are capable of sliding through the channels 870, 880, but the second ends 920 of the sliding actuators 900 remain disposed in the channels 870, 880 regardless of the position in which the sliding actuators 900 are placed.

As best illustrated in FIG. 11, the second ends 920 of the bush button actuators 900 contain upper and lower retention hook 922 that are configured to be engaged with the upper and lower slots 874, 884 of the inlet and outlet actuator channels 870, 880, respectively. The interaction of the retention hooks 922 with the upper and lower slots 874, 884 of the inlet and outlet actuator channels 870, 880, respectively, retains the sliding actuators 900 within the inlet and outlet actuator channels 870, 880 while still enabling the sliding actuators 900 to slide along the inlet and outlet actuator channels 870, 880. Disposed on the second end 920 of the sliding actuators 900 between the retention hooks 922 are guide projections 924. Guide projections 924 are configured to receive a resilient member 926 (e.g., a spring), which may be disposed within the inlet actuator channel 870 and the outlet actuator channel 880. The resilient member 926 may be configured to bias the sliding actuators 900 to an unactuated state, where the first end 910 of the sliding actuators 900 extend outwardly from the first and second actuator openings 824(1), 824(2). When the sliding actuators 900 are depressed (i.e., applying a force to the first ends 910 of the sliding actuators 900 to cause the first ends 910 to slide into the first housing portion 810) to their actuated state, the sliding actuators 900 slide along the inlet and outlet actuator channels 870, 880 toward the rear side 802 of the wire feeder mechanism 310 to compress the resilient member 926. When the force depressing the sliding actuators 900 is no longer applied to the first ends 910, the resilient members 926 return the sliding actuators 900 to their unactuated state.

As best illustrated in FIG. 11, each push button actuator 900 includes an opening 930 disposed between the first end 910 and the second end 920. The opening 930 may be oblong having a first side 932 that is wider than a second side 934, where the first side 932 of the opening 930 may be disposed more proximate to the first end 910 of the push button actuator 900 than the second side 934 of the opening 930. This oblong shape of the opening 930 enables the opening 930 of the push button actuator 900 to capture an inlet or outlet guide 1000, 1100 when the push button actuator 900 is in the unactuated state as biased by the resilient member 926.

As illustrated in FIG. 11, the inlet guide 1000 is substantially cylindrical with a first end 1010 and a second end 1020. The inlet guide 1000 further includes a recessed segment 1030 disposed on the surface of the inlet guide 1000 between the first end 1010 and the second end 1020. The second end 1020 may further include a tapered segment 1022 that is configured to be disposed proximate to the first and second drive wheels 818(1), 818(2) when the inlet guide 1000 is disposed within the inlet 820. The inlet guide 1000 also includes a conduit 1040 that extends through the inlet guide 1000 from the first end 1010 to the second end 1020. The conduit 1040 of the inlet guide 1000 may be configured and sized to receive a welding wire.

FIG. 11 also illustrates that the outlet guide 1100 is substantially cylindrical with a first end 1110 and a second end 1120. The outlet guide 1100 may be longer in length than the inlet guide 1000. Like the inlet guide 1000, the outlet guide 1100 includes a recessed segment 1130 disposed on the surface of the outlet guide 1100 between the first end 1110 and the second end 1120. While the recessed segment 1030 of the inlet guide 1000 may be disposed at a location on the inlet guide 1000 so that the recessed segment 1030 is equidistant from the first and second ends 1010, 1020, the recessed segment 1130 of the outlet guide 1100 is disposed more proximate to the second end 1120 than the first end 1110. Furthermore, the second end 1120 may further include a tapered segment 1122 that is configured to be disposed proximate to the third and fourth drive wheels 818(3), 818(4) when the outlet guide 1100 is disposed within the outlet 822. The outlet guide 1100 also includes a conduit 1140 that extends through the outlet guide 1100 from the first end 1110 to the second end 1120. The conduit 1140 of the outlet guide 1100 may be configured and sized to receive a welding wire.

Returning to FIGS. 10A, 10B, and 10C, the inlet guide 1000 may be inserted through the inlet 820 of the first housing portion 810 so that the second end 1020 is disposed proximate to the first and second drive wheels 818(1), 818(2). When the inlet guide 1000 is disposed within the inlet 820, the inlet guide 1000 is captured and secured within the inlet 820 by the push button actuator 900. More specifically, when the inlet guide 1000 is fully disposed within the inlet 820, the recessed segment 1030 of the inlet guide 1000 may be aligned with the first actuator opening 824(1). The second side 934 of the opening 930 of the push button actuator 900 disposed within the first actuator opening 824(1) engages with the recessed segment 1030 of the inlet guide 1000 when the push button actuator 900 is in the unactuated state to secure the inlet guide 1000 within the inlet 820. To remove the inlet guide 1000 from the inlet 820, a welding operator may depress the push button actuator 900 to translate the wider first side 932 of the opening 930 of the push button actuator 900 toward the inlet guide 1000, and to translate the second side 934 of the opening 930 of the push button actuator 900 out of engagement with the recessed segment 1030 of the inlet guide 1000. The disengagement of the second side 934 of the opening 930 of the push button actuator 900 from the recessed segment 1030 while the push button actuator 900 is depressed allows a welding operator to pull the inlet guide 1000 out from the inlet 820 without use of a tool.

Similar to the inlet guide 1000, the outlet guide 1100 may be inserted through the outlet 822 of the first housing portion 810 so that the second end 1120 is disposed proximate to the third and fourth drive wheels 818(3), 818(4). When the outlet guide 1100 is disposed within the outlet 822, the outlet guide 1100 is captured and secured within the outlet 822 by the push button actuator 900. More specifically, when the outlet guide 1100 is fully disposed within the outlet 822, the recessed segment 1130 of the outlet guide 1100 may be aligned with the second actuator opening 824(2). The second side 934 of the opening 930 of the push button actuator 900 disposed within the second actuator opening 824(2) engages with the recessed segment 1130 of the outlet guide 1100 when the push button actuator 900 is in the unactuated state to secure the outlet guide 1100 within the outlet 822. As best illustrated in FIG. 10A, because of the outlet guide 1100 is longer than the inlet guide 1000, when the outlet guide 1100 is disposed within the outlet 820, the outlet guide 820 extends significantly from the outlet side 806 of the wire feeder mechanism 310. To remove the outlet guide 1100 from the outlet 820, a welding operator may depress the push button actuator 900 to translate the wider first side 932 of the opening 930 of the push button actuator 900 toward the outlet guide 1100, and to translate the second side 934 of the opening 930 of the push button actuator 900 out of engagement with the recessed segment 1130 of the outlet guide 1100. The disengagement of the second side 934 of the opening 930 of the push button actuator 900 from the recessed segment 1130 while the push button actuator 900 is depressed allows a welding operator to pull the outlet guide 1100 out from the outlet 822 without use of a tool.

Figure 12A:
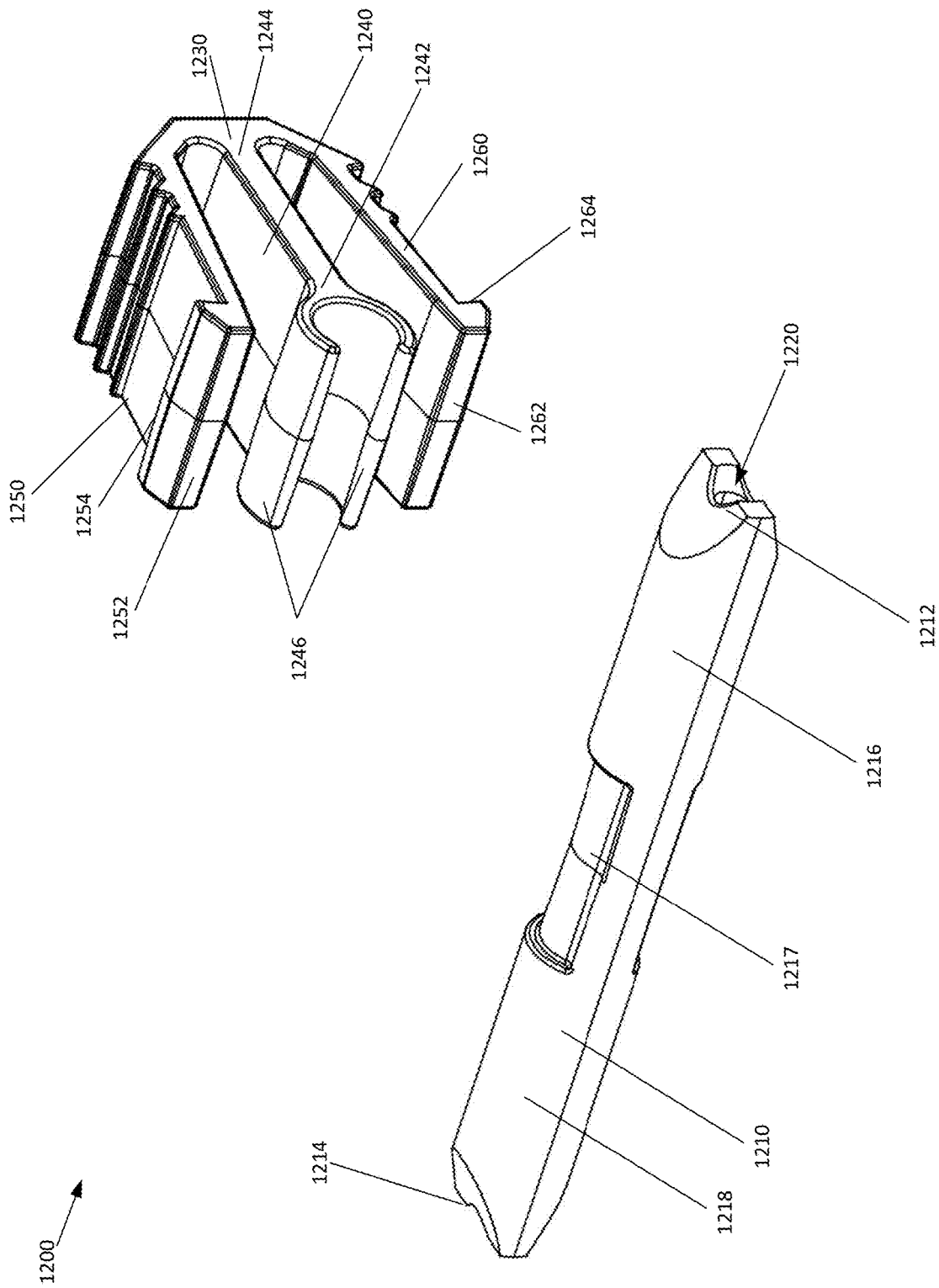
FIG. 12A illustrates an exploded view of the first side of the intermediate wire guide of the wire feeder mechanism illustrated in FIG. 10A.
Figure 12B:
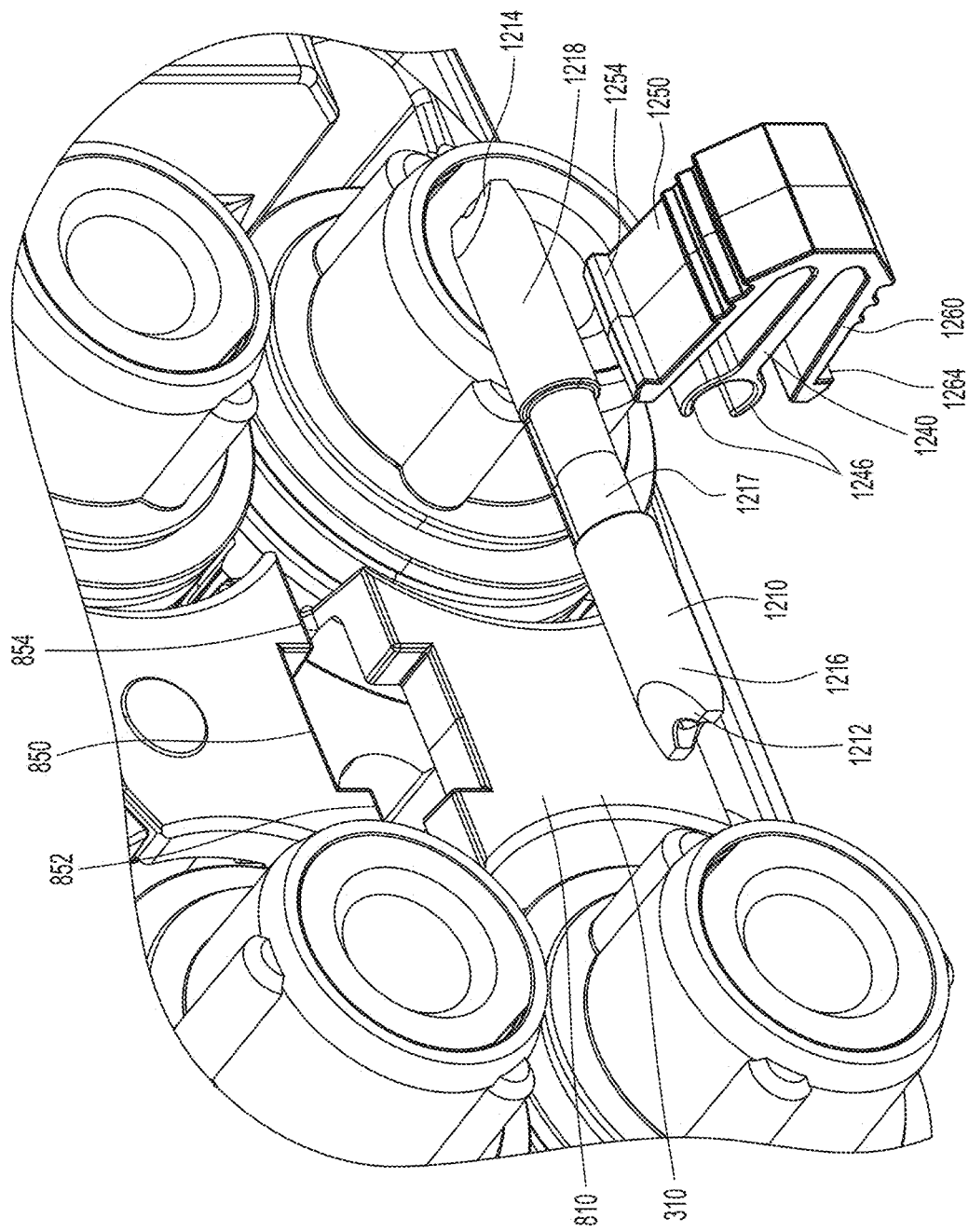
FIG. 12B illustrates an exploded perspective view of the second side of the intermediate wire guide illustrated in FIG. 12A being inserted into the wire feeder mechanism illustrated in FIG. 10A.

As illustrated in FIGS. 12A, and 12B, the intermediate wire guide 1200 includes a cylindrical member 1210 and an actuator clip 1230. The cylindrical member 1210 includes a first end 1212 and an opposite second end 1214. In the embodiment illustrated, the ends 1212, 1214 of the cylindrical member 1210 may be tapered to be disposed proximate to the drive wheels 818(1), 818(2), 818(3), 818(4) when disposed within the central aperture 850 of the first housing portion 810 of the wire feeder mechanism 310. The embodiment of the intermediate wire guide 1200 illustrated in FIGS. 12A and 12B includes three segments 1216, 1217, and 1218. The first segment 1216 is disposed proximate to the first end 1212, the third segment 1218 is disposed proximate to the second end 1214, and the second segment 1217 is disposed between the first and third segments 1216, 1218. The second segment 1217 may be a recess disposed in the surface of the cylindrical member 1210, where the recess extends only partially around the cylindrical member 1210 (i.e., the recess does not extend a full 360 degrees around the cylindrical member 1210).

The actuator clip 1230 may contain a central member 1240, an upper arm 1250, and a lower arm 1260. The central member 1240 contains a distal end 1242 and an opposite proximal end 1244. Disposed on the distal end 1242 of the central member 1240 are clasping members 1246 that are configured to engage the recess of the second segment 1217 to secure the actuator clip 1230 to the cylindrical member 1210. Extending upward and forward from the proximal end 1244 of the central member 1240 toward the distal end 1242 of the central member 1240 is an upper arm 1250. The upper arm 1250 may include an end 1252, and a tab 1254 disposed proximate to the end 1252 of the upper arm 1250. Similarly, extending downward and forward from the proximal end 1244 of the central member 1240 toward the distal end 1242 of the central member 1240 is a lower arm 1260. The lower arm 1260 may include an end 1262, and a tab 1264 disposed proximate to the end 1262 of the lower arm 1260. The upper and lower arms 1250, 1260 may contain a degree of resiliency such that the upper and lower arms 1250, 1260 operate as living hinges with respect to the central member 1240.

As best illustrated in FIG. 12B, the intermediate wire guide 1200 may be removably coupled to the first housing portion 810 via the central aperture 850. When the cylindrical member 1210 is coupled to the attachment clip 1230, the second segment 1217 of the cylindrical member 1210 and the attachment clip 1230 may be inserted into the central aperture 850, while the first segment 1216 of the cylindrical member 1210 is simultaneously inserted into the first passageway 852 and the second segment 1218 of the cylindrical member 1210 is inserted into the second passageway 854. When inserted into the central aperture 850, the tabs 1254, 1264 of the attachment clip 1230 engage the sidewalls of the central aperture 850 to retain the attachment clip 1230 within the central aperture 850. Because the attachment clip 1230 is coupled to the cylindrical member 1210, the engagement of the tabs 1254, 1264 with the sidewalls of the central aperture 850 also retains the cylindrical member 1210 within the central aperture 850, the first passageway 852, and the second passageway 854. When the intermediate wire guide 1200 is coupled to the central aperture 850 of the first housing portion 810 of the wire feeder mechanism 310, the first end 1212 of the cylindrical member 1210 of the intermediate wire guide 1200 is disposed proximate to the first and second drive wheels 818(1), 818(2), while the second end 1214 of the cylindrical member 1210 is disposed proximate to the third and fourth drive wheels 818(3), 818(4).

Figure 12C:
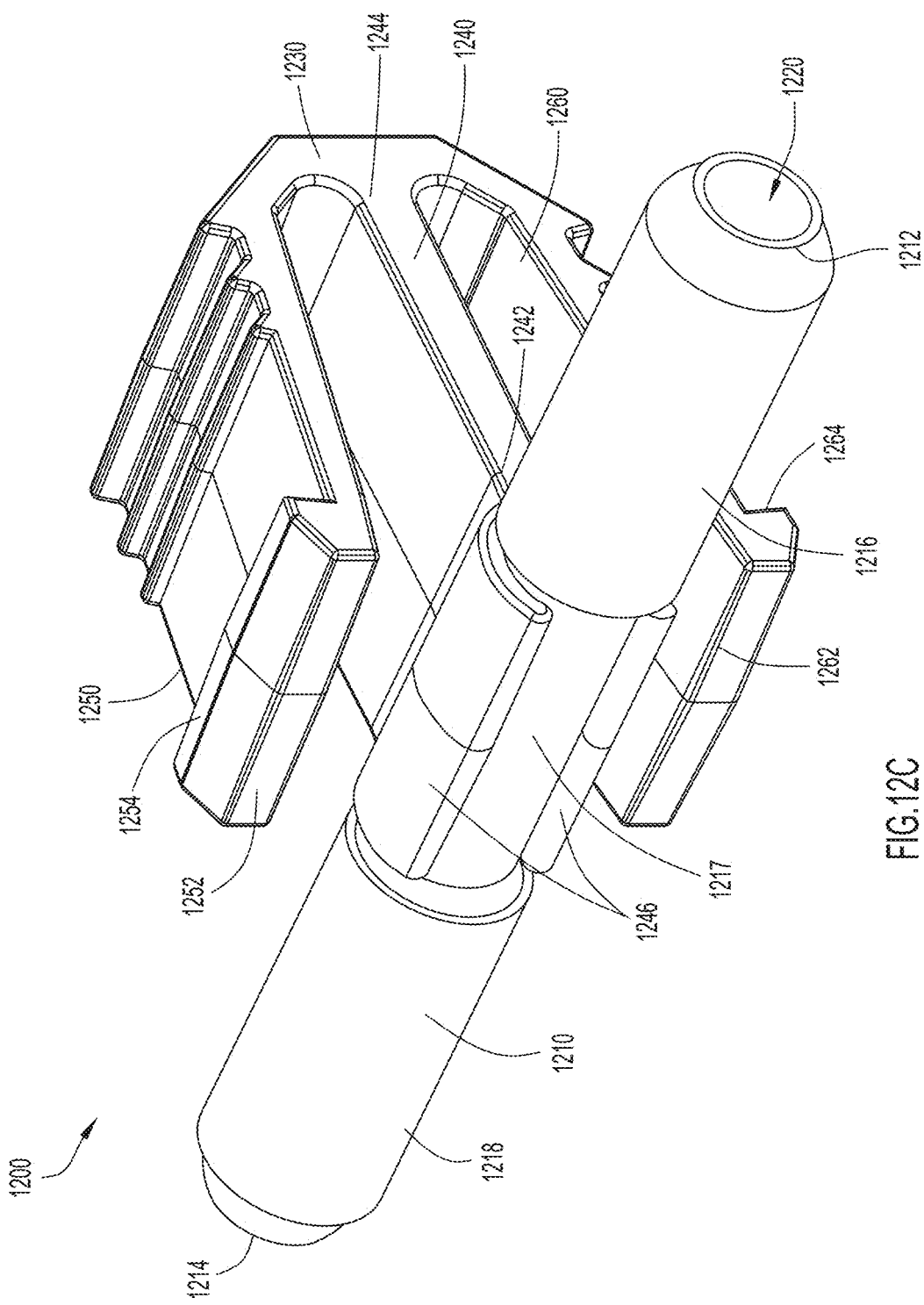
FIG. 12C illustrates a perspective view of second embodiment of the intermediate wire guide.
Figure 12D:
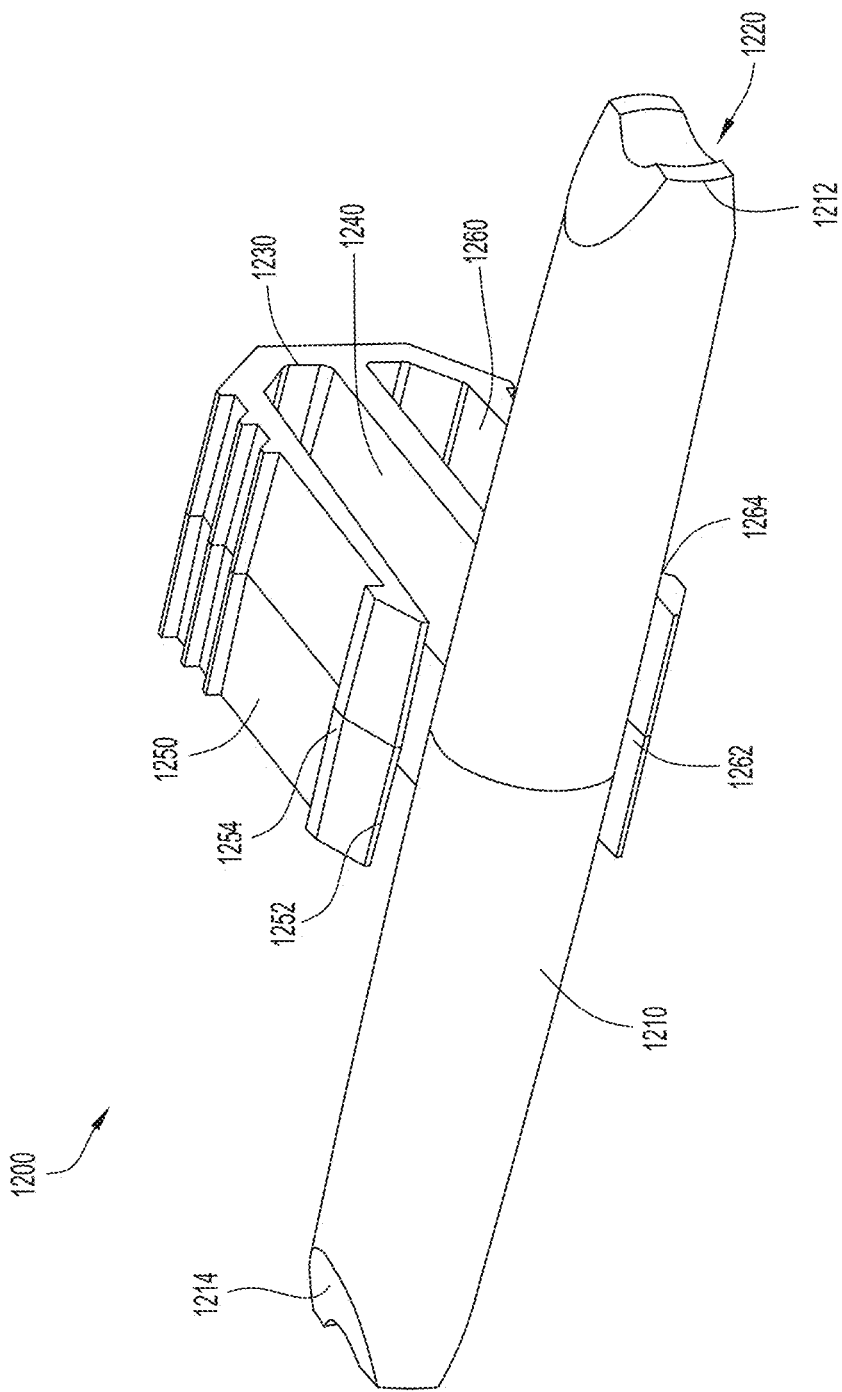
FIG. 12D illustrates a perspective view of a third embodiment of the intermediate wire guide.

Illustrated in FIGS. 12C and 12D are other embodiments of the intermediate wire guide 1200. As illustrated in FIG. 12C, the recess of the second segment 1217 of the cylindrical member 1210 extends fully around the surface of the cylindrical member 1210. This enables the cylindrical member 1210 to rotate with respect to the attachment clip 1230 when the cylindrical member 1210 is secured within the clasping members 1246. As illustrated in FIG. 12D, the cylindrical member 1210 and the attachment clip 1230 are uniformly formed such that the intermediate wire guide 1200 is constructed as a single element.

Figure 13A:
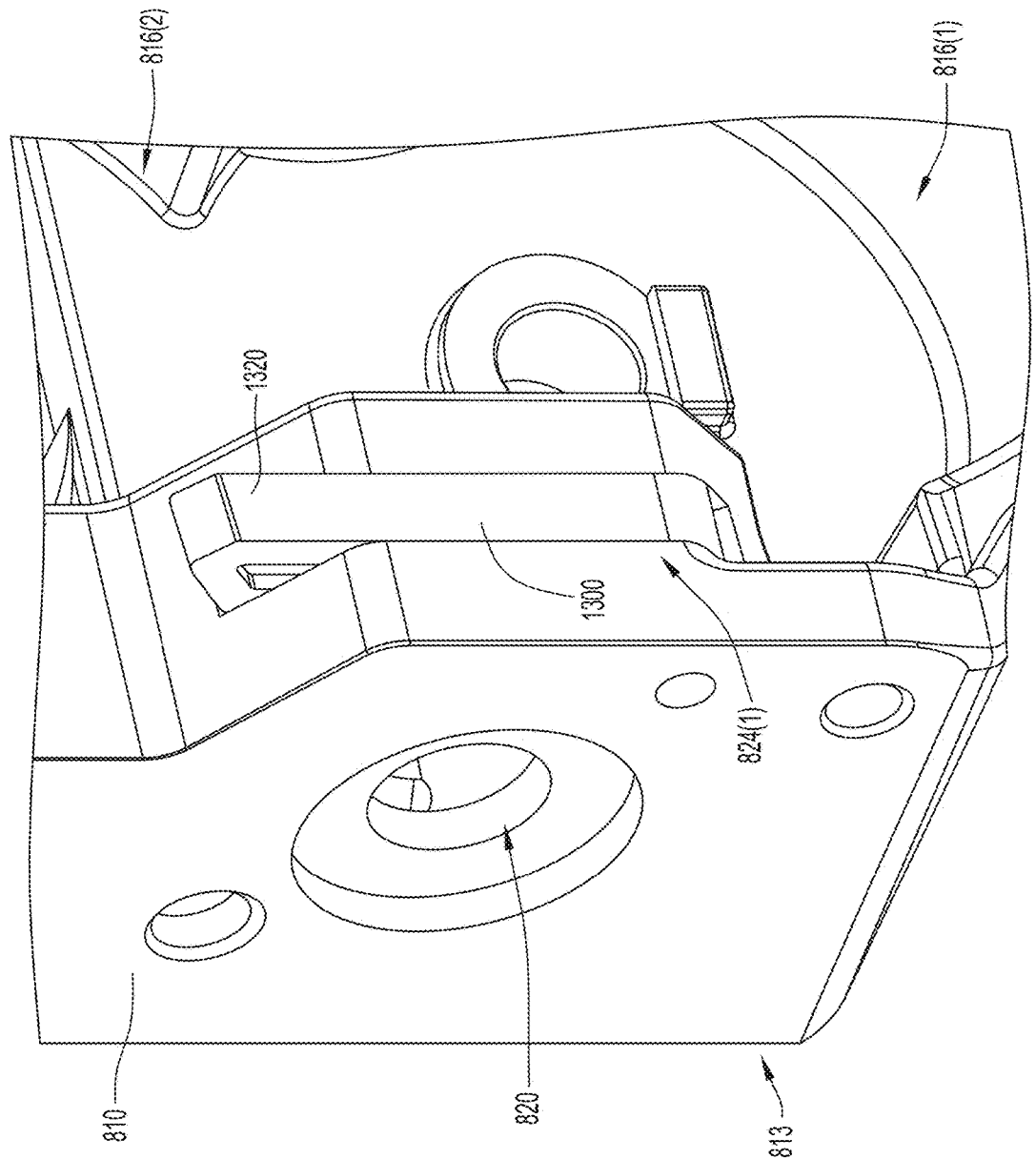
FIG. 13A illustrates a perspective view of a second embodiment of a guide locking mechanism in relation to the wire feeder mechanism illustrated in FIG. 10A, the latch being in the locked position.
Figure 13B:
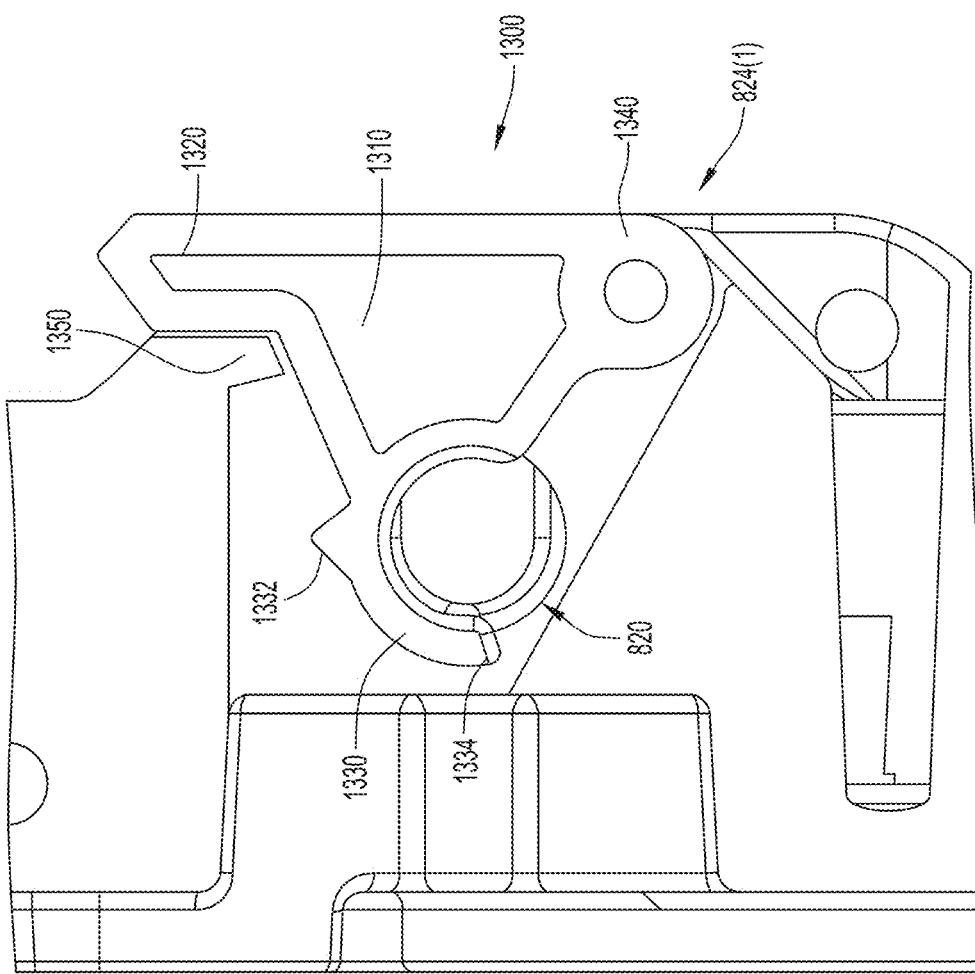
FIG. 13B illustrates a cross-sectional view of the second embodiment of the guide locking mechanism illustrated in FIG. 13A, where the latch is in the locked position.
Figure 13C:
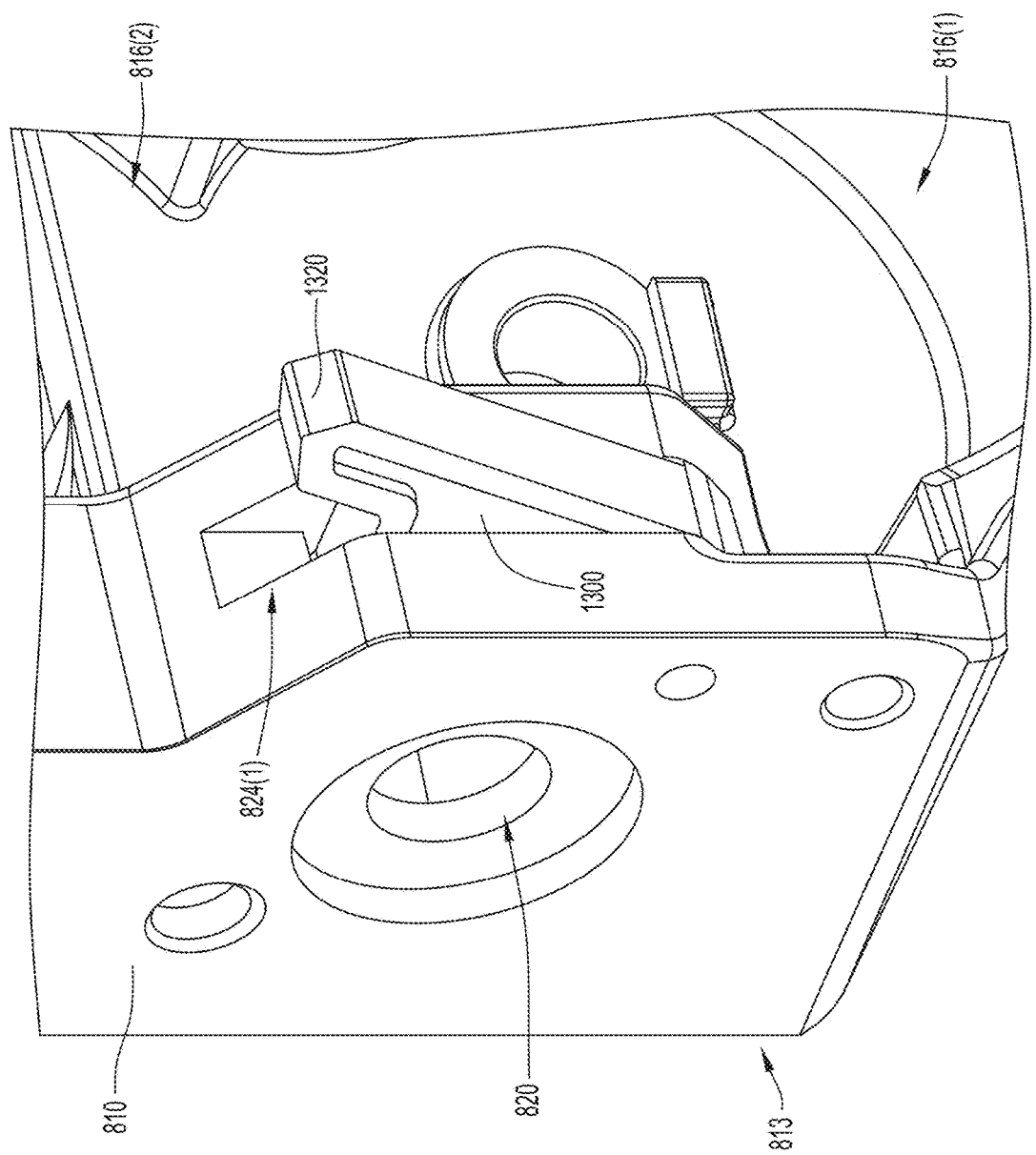
FIG. 13C illustrates a perspective view of the second embodiment of the guide locking mechanism illustrated in FIG. 13A, the latch being in the unlocked position.
Figure 13D:
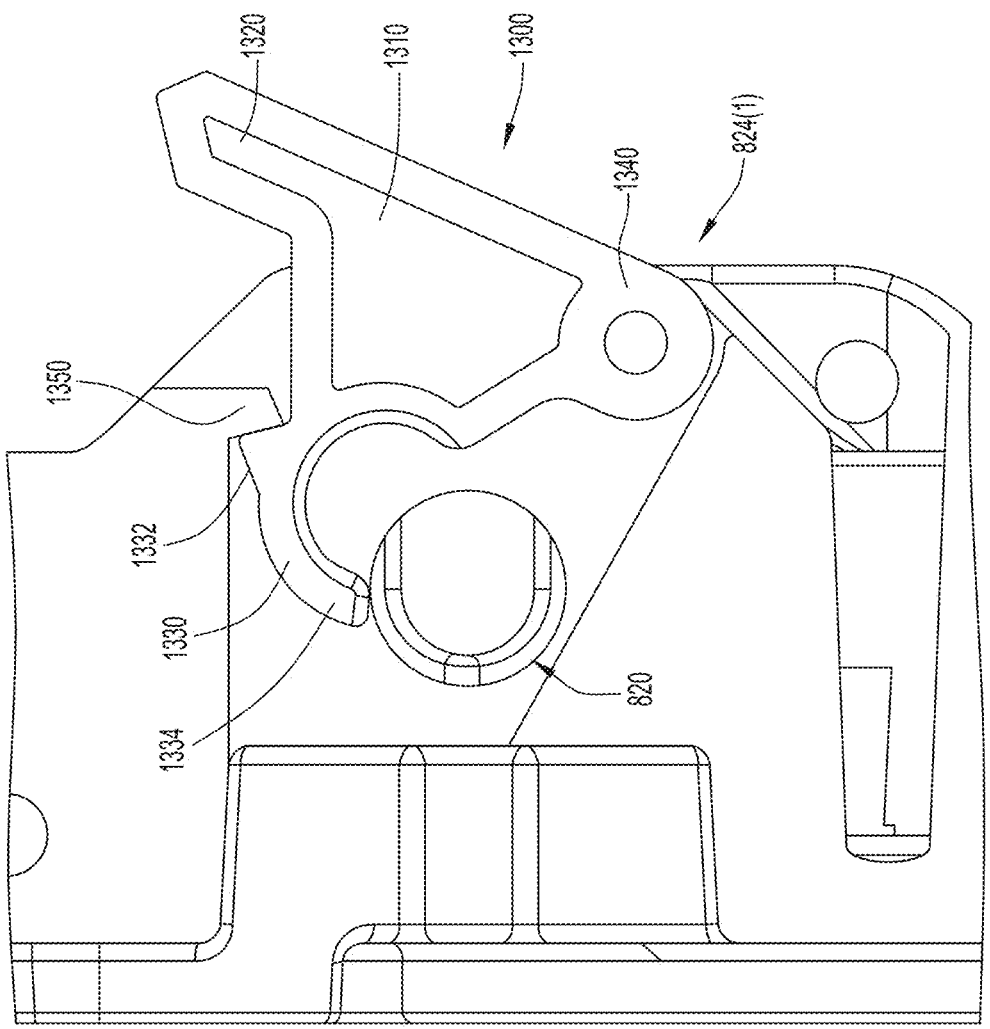
FIG. 13D illustrates a cross-sectional view of the second embodiment of the guide locking mechanism illustrated in FIG. 13C, where the latch is in the unlocked position.

Turning to FIGS. 13A, 13B, 13C, and 13D, illustrated is an additional embodiment for retaining the inlet guide 1000 within the inlet 820 and the outlet guide 1100 within the outlet 822, where the additional embodiment is a latch 1300. While FIGS. 13A, 13B, 13C, and 13D illustrate only the inlet side 804 of the first housing portion 810 and the interaction of the latch 1300 with the inlet side 804 of the first housing portion 810, the discussion of FIGS. 13A, 13B, 13C, and 13D also applies to the outlet side 806 of the first housing portion 810, the outlet 822, the second actuator opening 824(2), and the outlet guide 1100. In the embodiment illustrated in FIGS. 13A, 13B, 13C, and 13D, the latch 1300 may be configured to retain the inlet guide 1000 within the inlet 820 instead of a push button actuator 900. FIGS. 13A and 13B illustrate the latch 1300 in the locked position with respect to the first housing portion 810, while FIGS. 13C and 13D illustrate the latch 1300 in the unlocked position with respect to the first housing portion 810. As illustrated, the latch 1300 is pivotally coupled within the first actuator opening 824(1) of the first housing portion 810, and is configured to rotate or pivot between the unlocked and locked positions.

The latch 1300 may have a body 1310 that contains a lever portion 1310, a hook portion 1330, and a pivot portion 1340. As further illustrated in FIGS. 13B and 13D, the hook portion 1330 includes a stop member 1332 that is configured to engage or abut a projection 1350 of the first actuator opening 824(1) and an end 1334. As illustrated in FIGS. 13A, 13B, 13C, 13D, in both the unlocked and locked positions, the lever portion 1310 of the latch 1310 extends outward from the first actuator opening 824(1) such that the lever portion 1310 may be engaged by a welding operator. When the latch 1300 is in the locked position (FIGS. 13A and 13B), the lever portion 1310 may be pulled downward and outward by the welding operator to pivot the latch 1300 about the pivot portion 1340 to the unlocked position (FIGS. 13C and 13D). As illustrated in FIG. 13D, the latch 1300 may be pivoted out of the first actuator opening 824(1) until the stop member 1332 on the hook portion 1330 comes into contact with the projection 1350 of the first actuator opening 824(1). When the latch 1300 is in the unlocked position (FIGS. 13C and 13D), the lever portion 1310 may be pushed upward and toward the first housing portion 810 to pivot the latch 1310 about the pivot portion 1340 and into the first actuator opening 824(1) until the lever portion 1310 contacts the projection 1350 of the first actuator opening 824(1).

As previously explained above with regard to FIGS. 10A, 10B, and 10C, the first actuator opening 824(1) extends through the inlet 820. When the latch 1300 is in the unlocked position, the inlet guide 1000 may be inserted into the inlet 820 of the first housing portion 810 so that the second end 1020 is disposed proximate to the first and second drive wheels 818(1), 818(2). Furthermore, when the inlet guide 1000 is fully disposed within the inlet 820, the recessed segment 1030 of the inlet guide 1000 may be aligned with the first actuator opening 824(1). Once the inlet guide 1000 is fully disposed within the inlet 820, the latch 1300 may be pivoted from the unlocked position to the locked position. This causes the end 1334 of the hook portion 1330 to slide over the inlet guide 1000 until the entire hook portion 1330 engages the recessed segment 1030 of the inlet guide 1000. The hook portion 1330 may be configured to slightly deform to enable the end 1334 of the hook portion 1330 to slide over the inlet guide 1000. When the hook portion 1000 is engaged with the recessed portion 1030 of the inlet guide 1000, the inlet 1000 is secured within the inlet 820.

To remove the inlet guide 1000 from the inlet 820, a welding operator may pivot the latch 1300 from the locked position to the unlocked position, as previously explained. Pivoting the latch 1300 to the unlocked position causes the hook portion 1330 of the latch 1300 to become disengaged from the recessed segment 1030 of the inlet guide 1000 and the end 1334 of the hook portion 1330 is slid over the inlet guide 1000. The hook portion 1330 may be configured to slightly deform to enable the end 1334 of the hook portion 1330 to slide over the inlet guide 1000 when pivoting the latch 1300 to the unlocked position. Once the latch 1300 is in the unlocked position, the inlet guide 1000 may be slid out of the inlet 820 without the use of a tool.

While not illustrated, another embodiment of the mechanism for retaining the inlet and outlet guides 1000, 1100 within the inlet 820 and outlet 822, respectively, may be pull actuators. The pull actuators may be substantially similar to the sliding actuators 900, but the spring 926 may contain a different spring constant that biases the pull actuators toward the rear side 802 of the wire feeder mechanism 310 to secure the inlet and outlet guides 1000, 1100. In this embodiment, the welding operator would need to pull the pull actuators out from the actuator openings 824(1), 824(2) to release the engagement of the pull actuators on the inlet and outlet guides 1000, 1100. When the pull actuators are pulled out of the actuators openings 824(1), 824(2), the inlet and outlet guides 1000, 1100 may then be slid out of the inlet 820 and outlet 820, respectively, without the use of a tool.

Figure 14A:
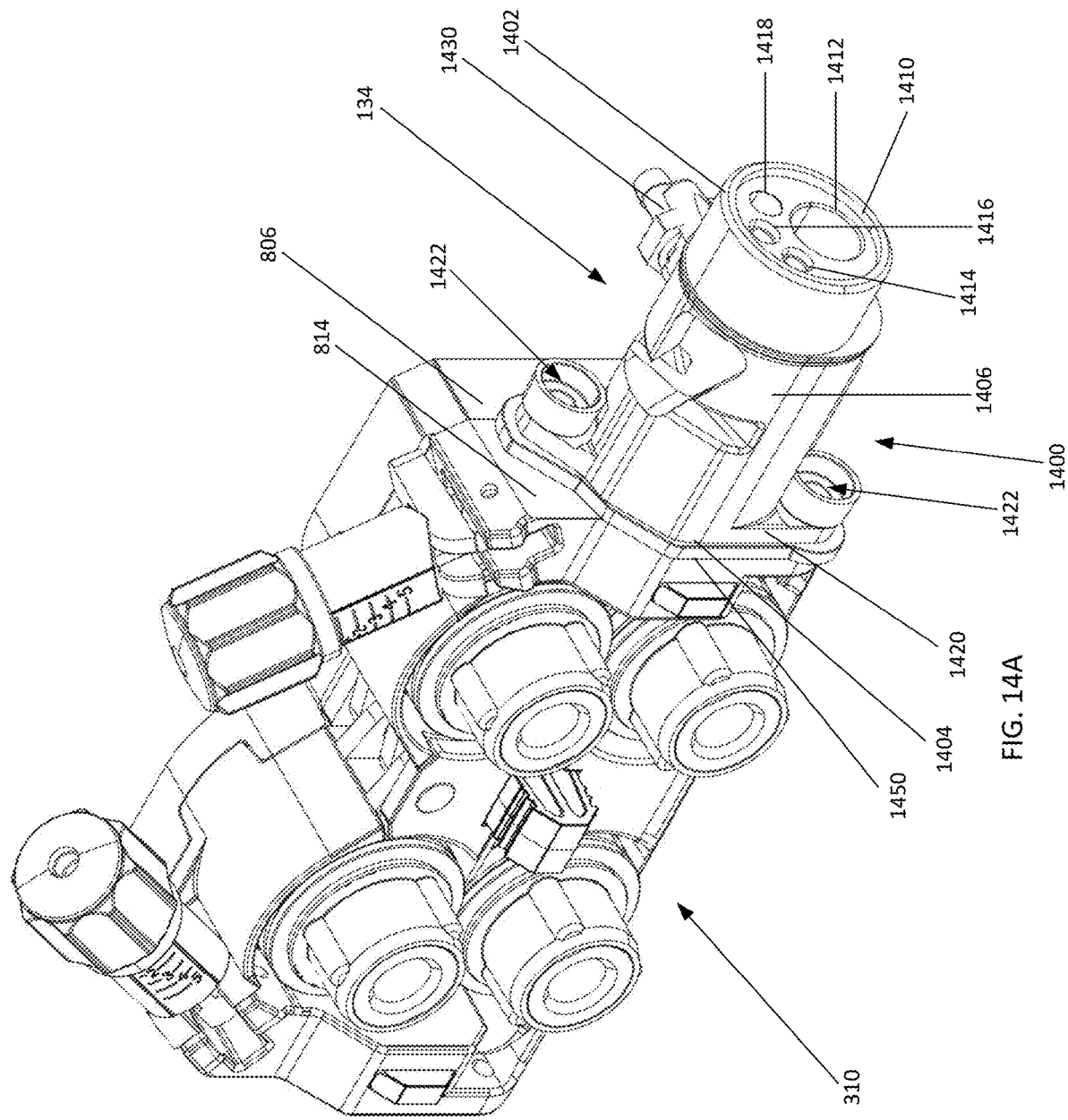
FIG. 14A illustrates a perspective view of the front side of the wire feeder mechanism illustrated in FIG. 10A where an interchangeable cable connector is coupled to the outlet side of the wire feeder mechanism.
Figure 14B:
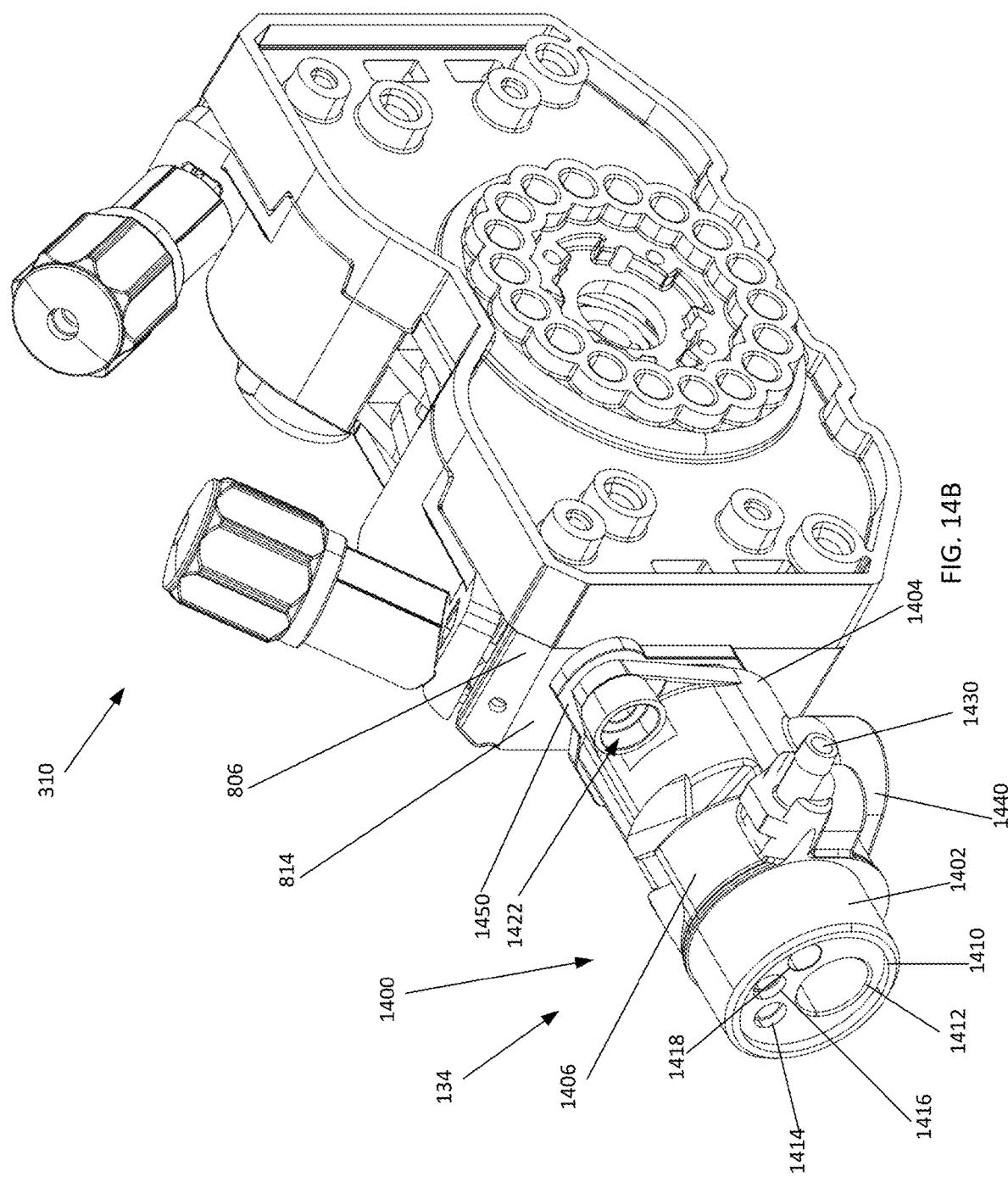
FIG. 14B illustrates a perspective view of the rear side of the wire feeder mechanism illustrated in FIG. 10A where the interchangeable cable connector of FIG. 14A is coupled to the outlet side of the wire feeder mechanism.

Turning to FIGS. 14A, 14B, 14C, 14D, 14E, and 14F, illustrated is interchangeable cable connector 134 and the steps for replacing a first interchangeable cable connector 134 (e.g., a Euro cable connector) with a second interchangeable cable connector 134' (e.g., a TWECO cable connector). While FIGS. 14A and 14B illustrate a first interchangeable cable connector 134, the discussion of the first interchangeable cable connector 134 applies to the second interchangeable cable connector 134', as the two cable connectors 134, 134' are structurally similar to one another.

As best illustrated in FIGS. 14A, 14B, 14C, and 14D, the interchangeable cable connector 134 is configured to be coupled to the outlet side 806 of the wire feeder mechanism 310. While not illustrated, the first end 1110 of the outlet guide 1100, which extends from the outlet side 806 of the wire feeder mechanism 310, may be at least partially received by the interchangeable cable connector 134 when the interchangeable cable connector 134 is connected to the wire feeder mechanism 310. The interchangeable cable connector 134 may be constructed from an electrically conductive materials.

As best illustrated in FIGS. 14A and 14B, the interchangeable cable connector 134 contains a generally cylindrical body 1400 that includes a first end 1402, an opposite second end 1404, and a sidewall 1406 extending from the first end 1402 to the second end 1404. The first end 1402 of the interchangeable cable connector 134 may serve as the connection end 1410, and may contain four openings 1412, 1414, 1416, 1418. The first outlet opening 1412 of the connection end 1410 of the interchangeable cable connector 134 may be larger in diameter than the other three openings 1414, 1416, 1418, where the first outlet opening 1412 may extend through the interchangeable cable connector 134 from the first end 1402 to the second end 1404. The first outlet opening 1412 may be configured to transmit the welding wire through the interchangeable cable connector 134 and into a torch cable 62 (not shown) coupled to the connection end 1410. The second and third outlet openings 1414, 1416 may be electrical outlets that are configured to transmit electrical signals (e.g., trigger signals) into and from the torch cable 62 (not shown). The fourth outlet opening 1418 may be a gas outlet that is configured to permit the flow of shielding gas to the torch cable 62 (not shown). Unlike the first embodiment of the interchangeable cable connector 134, as illustrated in FIG. 14F, the second embodiment of the interchangeable cable connector 134', illustrated in FIG. 14E, contains a single opening 1419 that may be configured to transmit the welding wire, the electrical signals, and the shielding gas to the torch cable 62 (not shown).

Figure 14C:
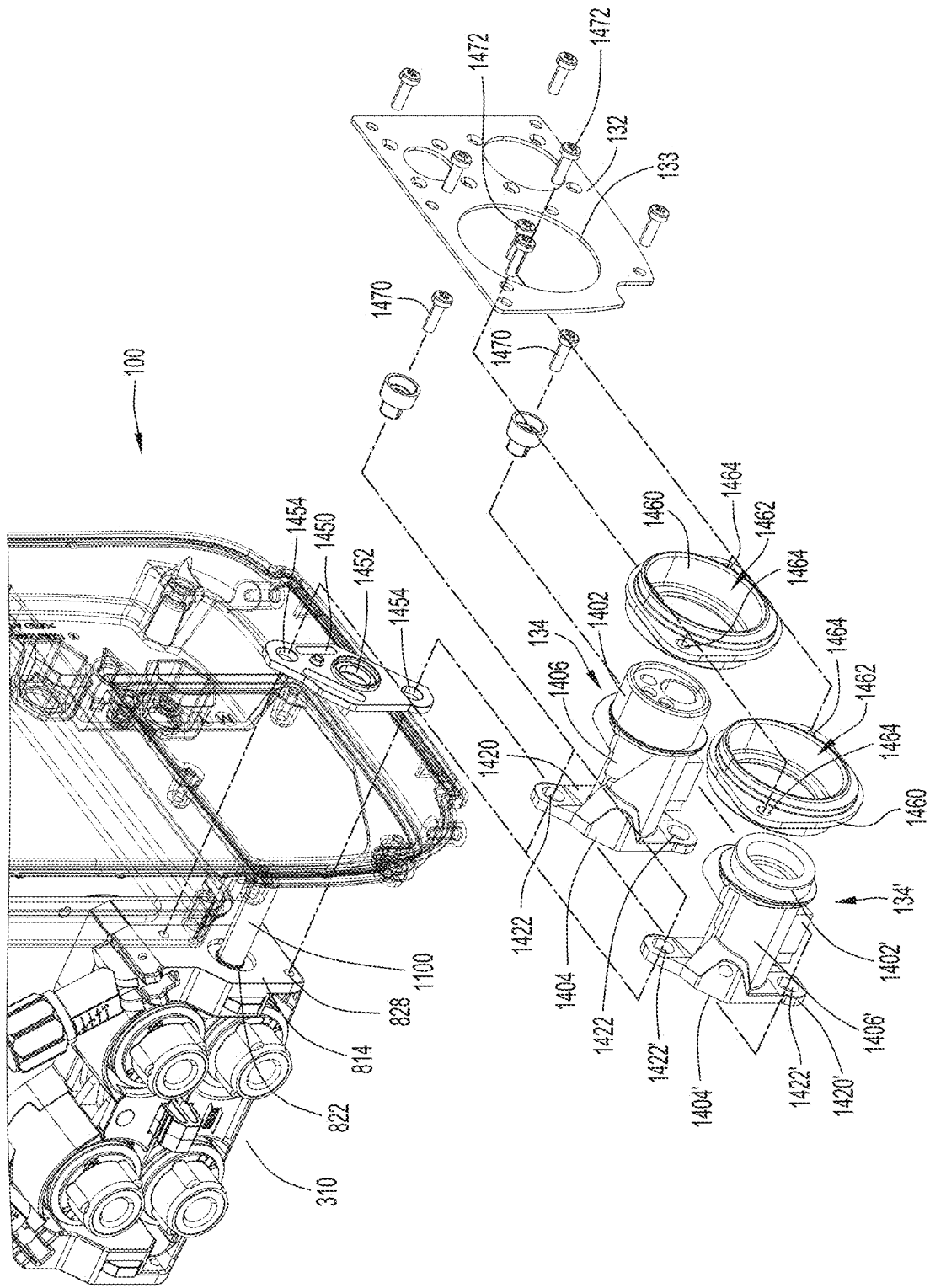
FIG. 14C illustrates an exploded view the assembly of two types of interchangeable cable connectors and their coupling to outlet side of the wire feeder mechanism illustrated in FIG. 10A.

As best illustrated in FIGS. 14A, 14B, and 14C, the second end 1404 of the interchangeable cable connector 134 may contain a flange 1420 that includes two fastener openings 1422. These fastener openings 1422 may align with the fastener openings 828 disposed on the second side 806 of the first housing portion 810 of the wire feeder mechanism 310. The fastener openings 1422 may be configured to receive fasteners 1470 that couple the interchangeable cable connector 134 to the wire feeder mechanism 310.

As further illustrated in FIGS. 14A and 14B, extending outward from the sidewall 1416 at a location disposed between the first and second ends 1402, 1404 of the interchangeable cable connector 134 is a gas inlet connection 1430. A gas cable (not shown) internal to the wire feeder 40 may be connected to both the gas inlet connection 1430 and the gas connector 356 of the connector panel 350. Shielding gas received by the gas inlet connection 1430 may flow through the interchangeable cable connector 134 to the gas outlet 1418. As best illustrated in FIG. 14B, extending outward from the sidewall 1416 of the interchangeable cable connector 134 between the first and second ends 1402, 1404, but offset from the gas inlet connection 1430, is an electrical connector 1440. The electrical connector 1440 of the interchangeable cable connector 134 is configured to be coupled to the lower current bar 342 (as illustrated in FIG. 7D) such that the interchangeable cable connector 134 receives welding power from the lower current bar 342. The interchangeable cable connector 134 may be configured to transmit the received welding power to the torch cable 62 (not shown) through contact of the connection end 1410 of the interchangeable cable connector 134 with a mating contact of the torch cable 62.

When the interchangeable cable connector 134 is coupled to the outlet side 806 of the wire feeder mechanism 310, an insulator 1450 may be disposed between the wire feeder mechanism 310 and the interchangeable cable connector 134. As best illustrated in FIG. 14C, the insulator 1450 includes a central opening 1452 and a pair of fastener openings 1454. When coupled to the wire feeder mechanism 310, the central opening 1452 may be aligned with the outlet 822 of the wire feeder mechanism 310, while the fastener openings 1452 may be aligned with the fastener openings 828 of the wire feeder mechanism 310. Moreover, the central opening 1452 may be also be aligned with first outlet opening 1412 of the interchangeable connector, while the fastener openings 1452 may be aligned with the fastener openings 1422 of the flange 1420 of the second end 1404 of the interchangeable cable connector 134. Fasteners 1470 may be inserted through the fastener openings 1422 of the interchangeable cable connector 134 and the fastener openings 1454 of the insulator 1450 to removably secure both the interchangeable cable connector 134 and the insulator 1450 to the wire feeder mechanism 310. Thus, the insulator 1450 may be sandwiched between the wire feeder mechanism 310 and the interchangeable cable connector 134, and may be configured to insulate the wire feeder mechanism 310 from the heat and/or electrical charge carried by the interchangeable cable connector 134.

Figure 14D:
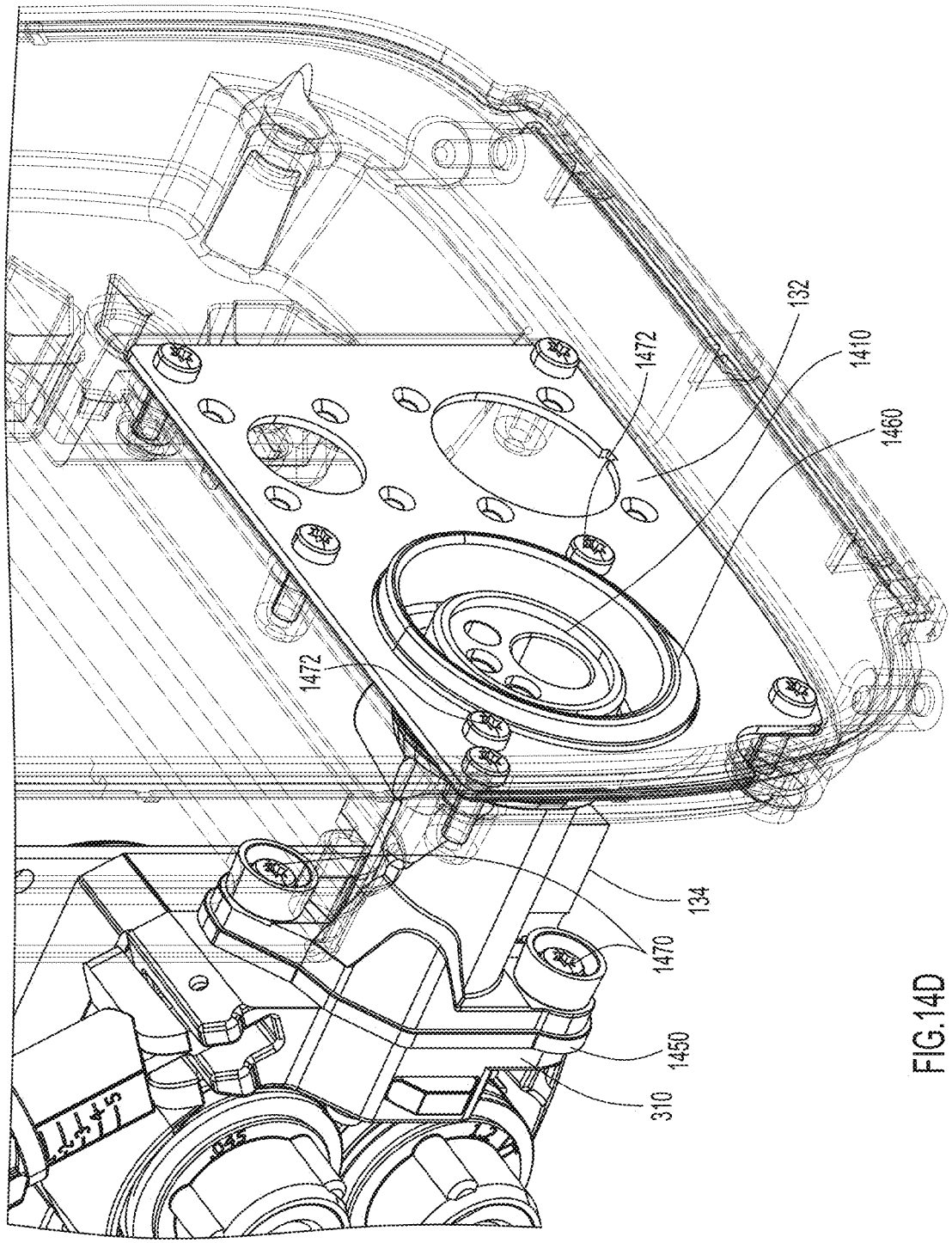
FIG. 14D illustrates a perspective view of the front side of the wire feeder illustrated in FIG. 2A where one of the interchangeable cable connectors is at least partially accessible through a connection panel on the front side of the wire feeder.
Figure 14F:
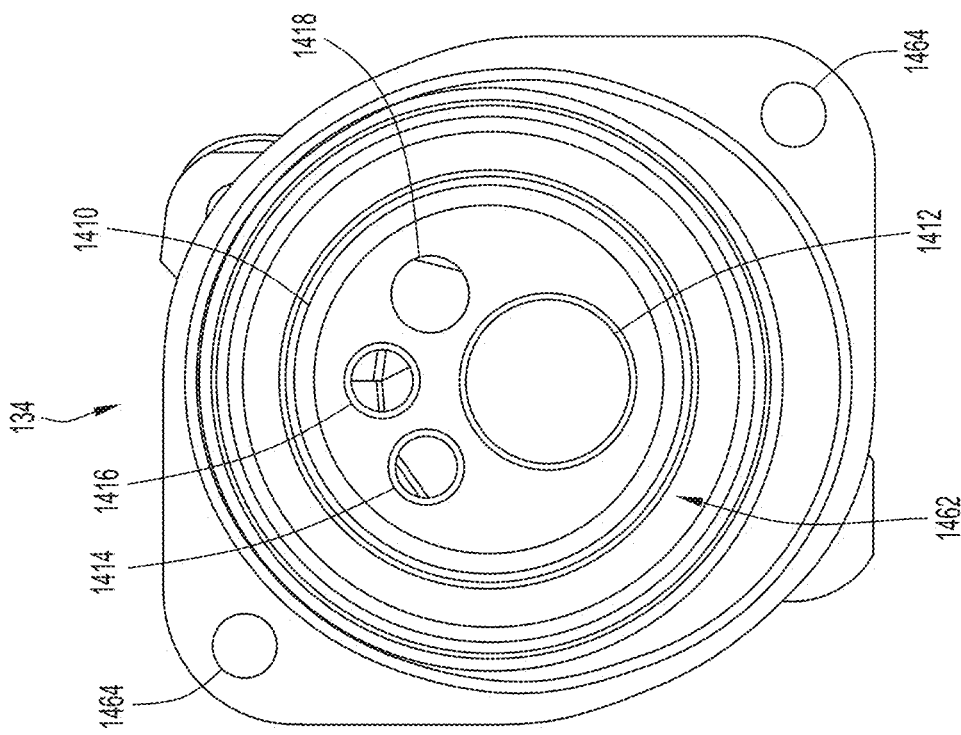
FIGS. 14E and 14F illustrate front views of the two types of interchangeable cable connectors and the orientation of the torch connector seat with respect to the interchangeable cable connectors.

As best illustrated in FIGS. 14C and 14D, when the interchangeable cable connector 134 is coupled to the wire feeder mechanism 310, the first end 1402 of the interchangeable cable connector 134 extends through the opening 133 of the removable cover panel 132 of the first connection panel 131 that is disposed on the front side 100 of the wire feeder 40. A torch connector seat 1460 may also be disposed within the opening 133 of the removable cover panel 132 that surrounds the first end 1402 of the interchangeable cable connector 134. The torch connector seat 1460 may be constructed from a resilient, flexible, and insulative material, such as rubber. The torch connector seat 1460 may be configured to at least partially receive the connector of the torch cable 62 (not shown) when coupled to the interchangeable cable connector 134. The torch connector seat 1460 may contain a central opening 1462 that is configured to receive and surround the first end 1402 of the interchangeable cable connector 134. The torch connector seat 1460 may also contain fastener openings 1464 that may be configured to align with fastener openings on the removable cover panel 132. The fastener openings 1464 may be configured to receive fasteners 1472 to removably secure the torch connector seat 1460 to the removable cover panel 132.

Figure 14E:
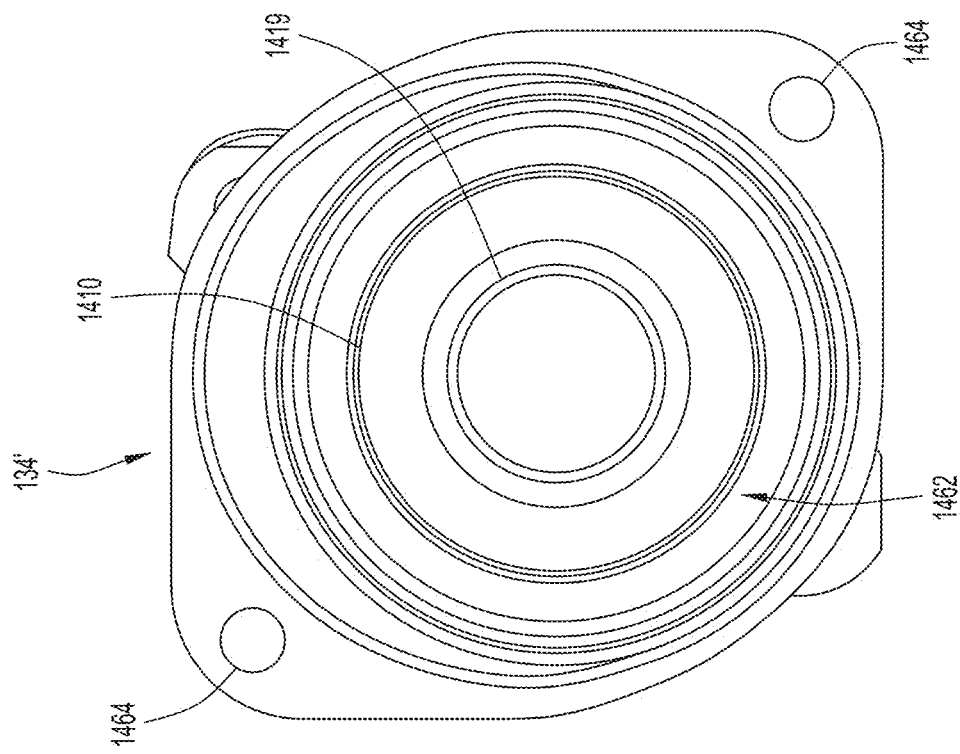

In order to replace or swap the first embodiment of the interchangeable cable connector 134 for the second embodiment of the interchangeable cable connector 134', or vice versa, the removable cover panel 132 is removed from the first connection panel 131, and the torch connector seat 1460 is removed from the removable cover panel 132. The lower current bar 342 and the internal gas cable may then be uncoupled from the electrical connector 1440 and the gas inlet connector 1430, respectively. The fasteners 1470 may then be removed from the fastener openings 1422, 1454 of the interchangeable cable connector 134 and insulator 1450, respectively. The second embodiment of the interchangeable cable connector 134' (i.e., the TWECO connector) may then be fastened to the insulator 1450 and the wire feeder mechanism 310 via the fasteners 1470. An internal gas cable may then be coupled to the gas inlet connector 1430', while the lower current bar 342 may be coupled to the electrical connector 1440'. Prior to attaching the removable cover panel 132 to the first connection panel 132, the torch connector seat 1460 may be rotated 180 degrees so that the torch connector seat 1460 is capable of receiving the torch connector of the torch cable 62 that is compatible with the second embodiment of the interchangeable cable connector 134' (as shown in FIGS. 14E and 14F). Once the torch connector seat 1460 is rotated and attached to the removable cover panel 132 via fasteners 1472, the removable cover panel 132 is then coupled to the first connection panel 131 such that the torch connector seat 1460 surrounds the first end 1402' of the second embodiment of the interchangeable cable connector 134'. In some embodiments, the detachment of the torch connector seat 1460 from the removable cover panel may be the first step performed, while the reattachment of the torch connector seat 1460 may also be the last step performed. In some configurations, when the second embodiment of the interchangeable cable connector 134' is installed on the wire feeder 40, the supplemental connector 136 of the first connection panel 131 may need to be utilized since the second embodiment of the interchangeable cable connector 134' does not contain as many outlets as the first embodiment 134.

Figure 15A:
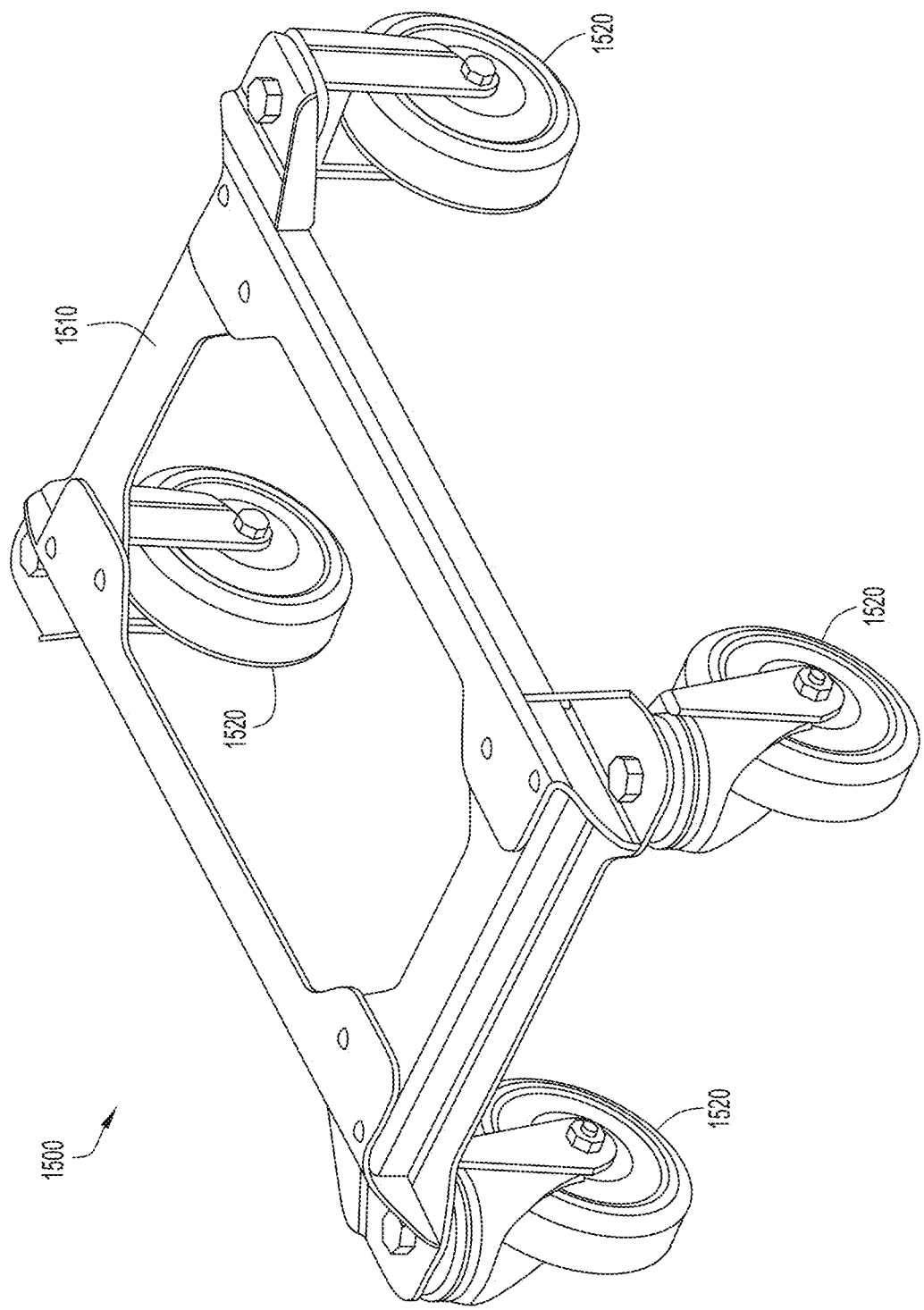
FIG. 15A illustrates a perspective view a cart that is capable of being coupled to either of the access doors of the wire feeder illustrated in FIG. 2A.
Figure 15B:
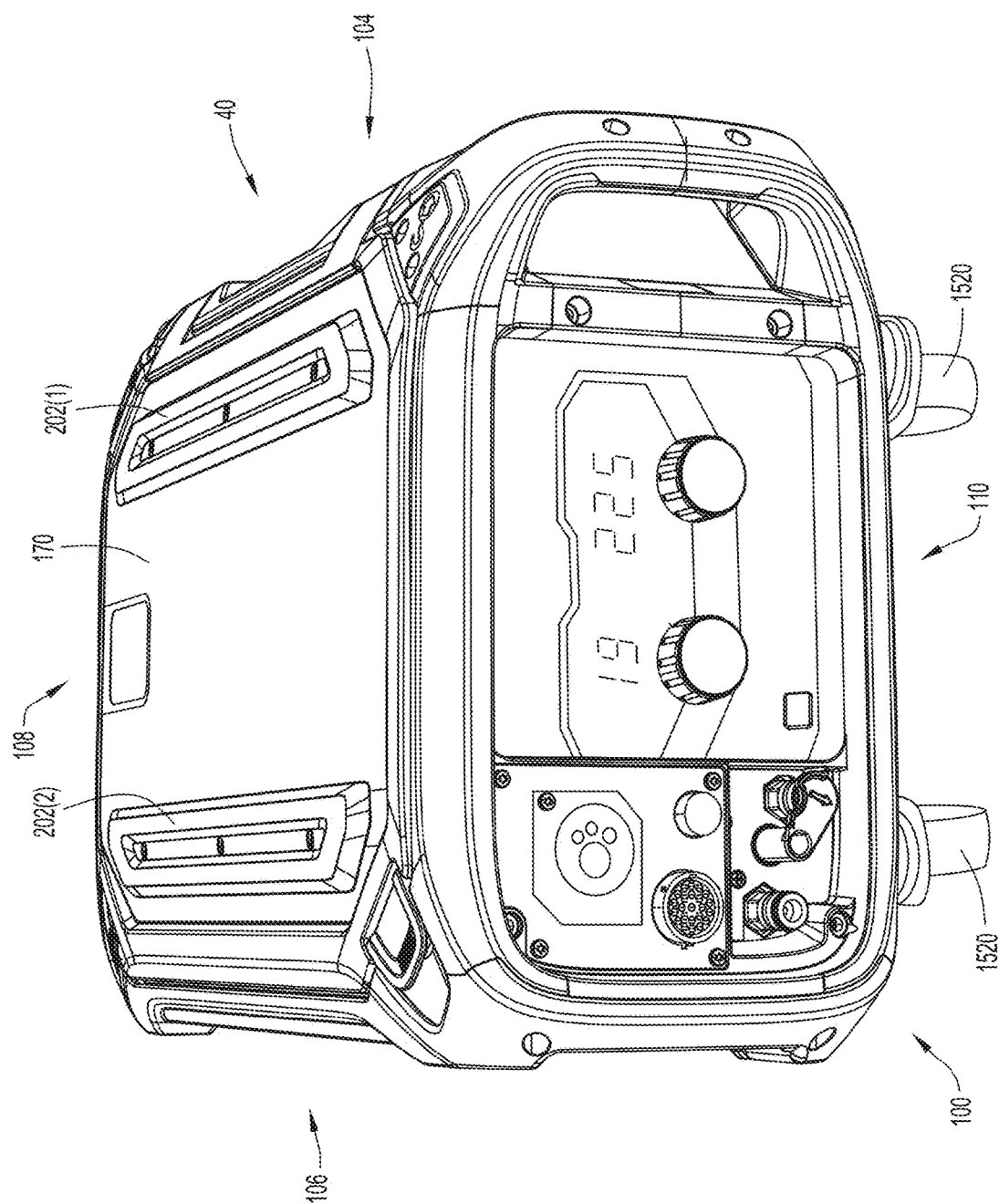
FIG. 15B illustrates a front perspective view of the wire feeder illustrated in FIG. 2A with the cart illustrated in FIG. 15A being coupled to the second access door.

Turning to FIGS. 15A and 15B, illustrated is a wheeled cart 1500. The wheeled cart 1500 may include a structural frame 1510 and a set of wheels 1520 coupled to the structural frame 1510. The set of wheels 1520 may support the structural frame 1510 above a support surface. The wheeled cart 1500 may be coupled to one of the access doors 170, 180. As previously explained above with respect to FIG. 6B, when the wear plates 202(1), 202(2) are removed from an access door 170, 180, a set of attachment openings 208 are revealed. The structural frame 1510 of the wheeled cart 1500 may be coupled to one of the access doors 170, 180 via the attachment openings 208. As illustrated in FIG. 15B, the wheeled cart 1500 may be coupled to the second access door 180 such that the wire feeder 40 may be positioned horizontally on the second side 110, where the wheel cart 1500 supports the wire feeder 40 above a support surface.

In the preceding detailed description, reference is made to the accompanying figures which form a part hereof wherein like numerals designate like parts throughout, and in which is shown, by way of illustration, some of the embodiments that may be practiced. It is to be understood that other embodiments may be utilized, and structural or logical changes may be made without departing from the scope of the present disclosure. Therefore, the preceding detailed description is not to be taken in a limiting sense, and the scope of embodiments is defined by the appended claims and their equivalents.

Aspects of the disclosure are disclosed in the description herein. Alternate embodiments of the present disclosure and their equivalents may be devised without parting from the spirit or scope of the present disclosure. It should be noted that any discussion herein regarding "one embodiment", "an embodiment", "an exemplary embodiment", and the like indicate that the embodiment described may include a particular feature, structure, or characteristic, and that such particular feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the particular features, structures, or characteristics of the given embodiments may be utilized in connection or combination with those of any other embodiment discussed herein.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The terms "comprising," "including," "having," and the like, as used with respect to embodiments of the present disclosure, are synonymous.

It is to be understood that terms such as "left," "right," "top," "bottom," "front," "rear," "side," "height," "length," "width," "upper," "lower," "interior," "exterior," "inner," "outer" and the like as may be used herein, merely describe points or portions of reference and do not limit the present invention to any particular orientation or configuration. Further, the term "exemplary" is used herein to describe an example or illustration. Any embodiment described herein as exemplary is not to be construed as a preferred or advantageous embodiment, but rather as one example or illustration of a possible embodiment of the invention.

Although the disclosed inventions are illustrated and described herein as embodied in one or more specific examples, it is nevertheless not intended to be limited to the details shown, since various modifications and structural changes may be made therein without departing from the scope of the inventions and within the scope and range of equivalents of the claims. In addition, various features from one of the embodiments may be incorporated into another of the embodiments. Accordingly, it is appropriate that the appended claims be construed broadly and in a manner consistent with the scope of the disclosure as set forth in the following claims.

What is claimed is:

1. A welding-related device comprising:
   an exterior housing portion having at least a front side, a top side, a rear side, and a bottom side, the exterior housing portion defining a cavity; and
   an interior housing portion disposed within the cavity of the exterior housing portion such that an interstitial space is disposed between the exterior housing portion and the interior housing portion, the interior housing portion having at least a front side, a top side, a rear side, and a bottom side, the interior housing portion defining an interior cavity in which wire feeder components of the welding-related device are disposed.

2. The welding-related device according to claim 1, wherein the top side of the interior housing portion includes a first opening, and the bottom side of the interior housing portion includes a second opening.

3. The welding-related device according to claim 2, wherein the interstitial space, the first opening, and second opening provide a closed loop air flow path for circulating air from the interior cavity of the interior housing portion, through the interstitial space, and back into the interior cavity of the interior housing portion.

4. The welding-related device according to claim 3, wherein heat of air flowing through the interstitial space is dissipated through the exterior housing portion.

5. The welding-related device according to claim 1, wherein the exterior housing portion has a first structural rigidity and the interior housing portion has a second structural rigidity, the first rigidity being less than the second rigidity.

6. The welding-related device according to claim 1, further comprising:
   a current bar, adapted to carry electrical current, with a first portion extending through the interstitial space and a second portion extending into the interior cavity of the interior housing portion through an opening disposed in the bottom side of the interior housing portion, the current bar having a first end and a second end, the first end being disposed within the interior cavity, the second end being disposed within the interstitial space.

7. The welding-related device according to claim 6, further comprising:
   a cable connector disposed through the front side of the exterior housing portion and coupled to the second end of the current bar.

8. The welding-related device according to claim 6, wherein the current bar is a first current bar and the opening disposed in the bottom side of the interior housing portion is a first opening, the welding-related device further comprising:
   a second opening disposed in the top side of the interior housing portion; and
   a second current bar with a first portion extending through the interstitial space and a second portion extending into the interior cavity of the interior housing portion through the second opening, the second current bar having a first end and a second end, the first end of the second current bar being disposed within the interior cavity proximate to the first end of the first current bar, the second end of the second current bar being disposed within the interstitial space proximate to the rear side of the exterior housing portion.

9. The welding-related device according to claim 8, wherein the second end of the second current bar is coupled to an accessory connector disposed through the rear side of the exterior housing portion.

10. The welding-related device according to claim 6, wherein the first end of the second current bar is coupled to a power connector that is coupled to a power cable and configured to receive weld power from a power source.

11. A welding-related device housing comprising:
    an exterior framing forming at least a portion of an exterior surface of the welding device housing; and
    an access door movably coupled to the exterior framing, the access door comprising:
      an exterior side;
      an interior side having at least one opening; and
      a storage compartment disposed between the exterior side and the interior side, wherein the at least one opening provides access to the storage compartment.

12. The welding-related device housing according to claim 11, wherein the storage compartment is configured to store replacement components for a wire feeder mechanism disposed within the welding-related device housing or consumable parts of a welding apparatus.

13. The welding-related device housing according to claim 12, wherein the storage compartment includes a storage organizer having a series of slots and cutouts that are sized and shaped to retain the replacement components or the consumable parts within the storage compartment.

14. The welding-related device housing according to claim 13, wherein the storage organizer is constructed from a foam or foam-like material.

15. The welding-related device housing according to claim 11, wherein the exterior side of the access door forms at least a portion of the exterior surface of the welding-related device housing with the exterior framing, and wherein the access door is movable between a closed position and an open position, where the access door, in the open position, enables a user to access an interior of the welding-related device housing.

* * * * *

UNITED STATES PATENT AND TRADEMARK OFFICE
CERTIFICATE OF CORRECTION

PATENT NO. : 12,151,321 B2
APPLICATION NO. : 17/244161
DATED : November 26, 2024
INVENTOR(S) : Jeroen Dekker et al.

Page 1 of 1

It is certified that error appears in the above-identified patent and that said Letters Patent is hereby corrected as shown below:

In the Specification

Cross-Reference To Related Application:
Column 1, Line 6, please change "This application continuation of International al Application" to
--This application is a continuation of International Application--

Signed and Sealed this
Twenty-first Day of January, 2025

Coke Morgan Stewart
*Acting Director of the United States Patent and Trademark Office*